United States Patent
Mortensen et al.

(10) Patent No.: US 12,403,445 B2
(45) Date of Patent: Sep. 2, 2025

(54) STRUCTURED CATALYST

(71) Applicant: TOPSOE A/S, Kgs. Lyngby (DK)

(72) Inventors: Peter Mølgaard Mortensen, Roskilde (DK); Sebastian Thor Wismann, Allerød (DK); Kasper Emil Larsen, Humlebæk (DK); Anders Helbo Hansen, Espergærde (DK)

(73) Assignee: TOPSOE A/S, Kgs. Lyngby (DK)

( * ) Notice: Subject to any disclaimer, the term of this patent is extended or adjusted under 35 U.S.C. 154(b) by 512 days.

(21) Appl. No.: 18/001,274

(22) PCT Filed: Jul. 15, 2021

(86) PCT No.: PCT/EP2021/069716
§ 371 (c)(1),
(2) Date: Dec. 9, 2022

(87) PCT Pub. No.: WO2022/017900
PCT Pub. Date: Jan. 27, 2022

(65) Prior Publication Data
US 2023/0226516 A1    Jul. 20, 2023

(30) Foreign Application Priority Data

Jul. 23, 2020  (EP) .................................. 20187305
Jun. 28, 2021  (EP) .................................. 21182132

(51) Int. Cl.
*B01J 19/24*    (2006.01)
*B01J 15/00*    (2006.01)
(Continued)

(52) U.S. Cl.
CPC ......... *B01J 19/2485* (2013.01); *B01J 15/005* (2013.01); *B01J 19/249* (2013.01); *B01J 35/33* (2024.01); *B01J 35/56* (2024.01); *B01J 2219/00135* (2013.01); *B01J 2219/2416* (2013.01); *B01J 2219/2428* (2013.01);
(Continued)

(58) Field of Classification Search
CPC ...... B01J 19/2485; B01J 19/249; B01J 35/33; B01J 35/56; B01J 15/005; B01J 2219/2416; B01J 2219/2428; B01J 2219/2434; B01J 2219/2438; B01J 2219/2495; B01J 2219/00135
See application file for complete search history.

(56) References Cited

U.S. PATENT DOCUMENTS

2003/0044331 A1    3/2003    Debellis et al.
2010/0111781 A1    5/2010    Takahashi et al.
(Continued)

FOREIGN PATENT DOCUMENTS

AU    698930 B2    11/1998
EP    0450872 A1   10/1991
(Continued)

OTHER PUBLICATIONS

EP Communication dated Nov. 25, 2020 and EP Search Report dated Nov. 3, 2020 issued in corresponding European Patent Application No. 20187305.6. (5 pages).
(Continued)

*Primary Examiner* — Lessanework Seifu
(74) *Attorney, Agent, or Firm* — Boone IP Law

(57) ABSTRACT

A structured catalyst for catalyzing an endothermic reaction of a feed gas to convert it to a product gas is provided.

20 Claims, 35 Drawing Sheets

(51) Int. Cl.
*B01J 35/33* (2024.01)
*B01J 35/56* (2024.01)

(52) U.S. Cl.
CPC .................. *B01J 2219/2434* (2013.01); *B01J 2219/2438* (2013.01)

(56) References Cited

U.S. PATENT DOCUMENTS

| | | |
|---|---|---|
| 2010/0158769 A1 | 6/2010 | Lee et al. |
| 2018/0093886 A1 | 4/2018 | Kado et al. |
| 2021/0113983 A1 | 4/2021 | Mortensen et al. |

FOREIGN PATENT DOCUMENTS

| | | |
|---|---|---|
| EP | 2181755 A2 | 5/2010 |
| WO | 2019/110267 A1 | 6/2019 |
| WO | 2019228795 A1 | 12/2019 |
| WO | 2019228798 A1 | 12/2019 |
| WO | 2021/110810 A1 | 6/2021 |
| WO | 2021/110826 A1 | 6/2021 |

OTHER PUBLICATIONS

International Search Report (PCT/ISA/210) and Written Opinion (PCT/ISA/237) mailed on Aug. 30, 2021, by the European Patent Office as the International Searching Authority for International Application No. PCT/EP2021/069716. (12 pages).

European Search Report mailed on Nov. 29, 2021, by the European Patent Office for European Application No. EP21182136.

European Search Report mailed on Dec. 20, 2021, by the European Patent Office for European Application No. 21182135.0, 6 pages.

Intention to grant received for European Application No. 21745761.3, mailed on Nov. 21, 2023, 6 pages.

International Preliminary Report on Patentability received for PCT Patent Application No. PCT/EP21/069716, mailed on Feb. 2, 2023, 7 pages.

International Search Report and Written Opinion mailed on Dec. 10, 2022 by the European Patent Office for International Application No. PCT/EP2022/067534.

International Search Report and Written Opinion mailed on Oct. 7, 2022, by the European Patent Office for International Application No. PCT/EP2022/067532, 13 pages.

Kee Robert J et al: "Process intensification in the catalytic conversion of natural gas to fuels and chemicals", Proceedings of the Combustion Institute, vol. 36, No. 1, Jun. 16, 2016, pp. 51-76.

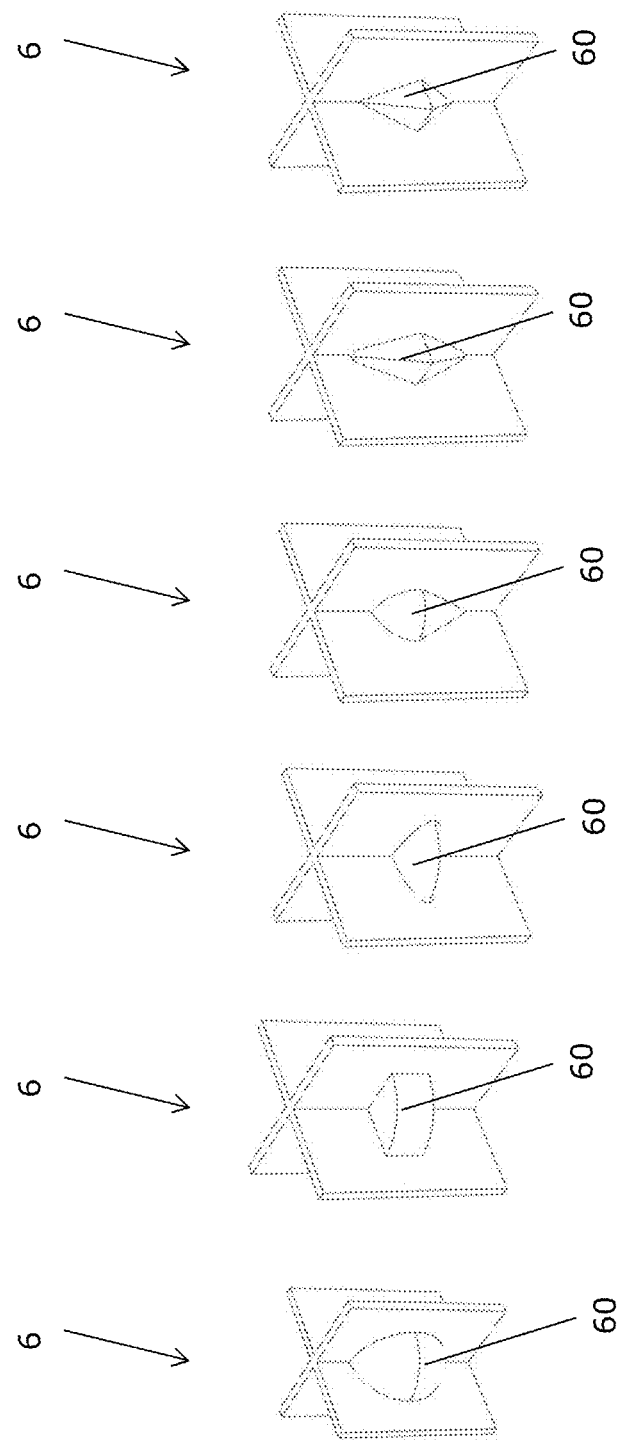

US 12,403,445 B2

STRUCTURED CATALYST

TECHNICAL FIELD

A structured catalyst, a reactor system and a process for carrying out an endothermic reaction of a feed gas are provided, where heat for the endothermic reaction is provided by resistance heating.

BACKGROUND

Synthesis gas production typically takes place in large chemical plants, due to the energy intensive reactions needed to facilitate the production. This makes small scale production difficult. The toxicity of the synthesis gas (especially due to the content of carbon monoxide), additionally, makes storage of the synthesis gas difficult and imposes a significant risk.

There is the need for on-demand synthesis gas production in smaller plants.

SUMMARY

In a first aspect, a structured catalyst for catalyzing an endothermic reaction of a feed gas to convert it to a product gas is provided, said structured catalyst comprising at least one macroscopic structure extending in a longitudinal direction from a first end to a second end, where said first end forms an inlet to said macroscopic structure for said feed gas and said second end forms an outlet for said product gas, said macroscopic structure comprising a three-dimensional network structure, wherein the network structure forms flow paths allowing the feed gas to flow from said first end to said second end, wherein the network structure is formed by a metallic material being electrically conductive and at least partly support a ceramic coating, the ceramic coating supporting a catalytically active material, wherein the network structure in a cross-section transverse to the longitudinal direction constitutes a fraction of a cross section of the macroscopic structure, the fraction being in the range of 4-75%, and wherein the network structure in at least three different cross-sections in the longitudinal direction constitute different fractions.

In a further aspect, a reactor system for carrying out an endothermic reaction of a feed gas is provided, said reactor system comprising:
 a) a structured catalyst according to the first aspect;
 b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
 c) a heat insulation layer between said structured catalyst and said pressure shell.

The term 'an endothermic reaction of a feed gas' should be understood as a reaction scheme wherein conversion of the feed gas to the product gas requires supply of energy from its surroundings to proceed.

In a further aspect, use of the structured catalyst according to the first aspect or the reactor according to the second aspect is provided, wherein the endothermic reaction(s) is(are) selected from the group consisting of steam methane reforming, hydrogen cyanide formation, methanol cracking, ammonia cracking, reverse water gas shift and dehydrogenation.

Additional aspects of the present technology are set out in the following detailed description, the figures, and the appended claims.

LEGENDS TO THE FIGURES

FIGS. 3a-3f illustrate different embodiments of cut-outs of a network structure;

FIG. 19b illustrates a cross-section through the embodiment of a structured catalyst illustrated in FIG. 19a.

FIG. 22b illustrates a cross-section through the embodiments of a structured catalyst illustrated in FIG. 22a.

DETAILED DISCLOSURE

Figure 1A:
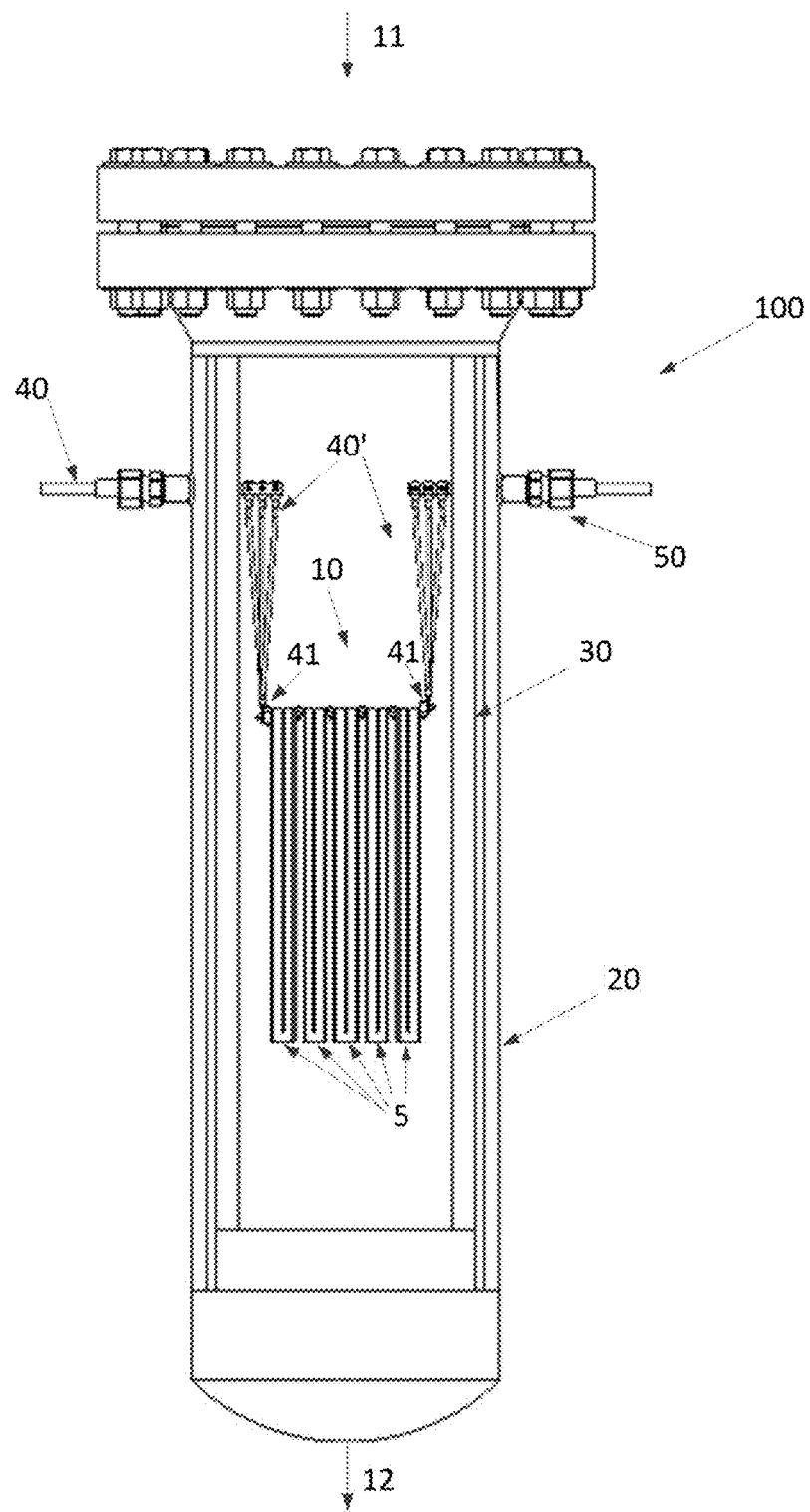
FIG. 1a illustrates a cross section through an embodiment of the inventive reactor system with a structured catalyst comprising an array of macroscopic structures, in a cross section.

Electrically heated reactors offer the possibility of making very compact chemical reactors as the heat for the reaction is delivered directly to the catalyst zone.

A compact electric reactor using monolithic catalyst can easily be operated and use easy start-up principles to produce gas when needed. This gives a relative inexpensive plant where gas can be produced in only the required amounts and little to no gas storage is needed, while transport of gas also is reduced or completely eliminated. Simple reactor equipment and simple operation of the process makes gas production attractive in delocalized plants which reduce risks of gas handling.

An embodiment of a compact electric reactor comprises a structured catalyst comprising a macroscopic structure comprising a three-dimensional network structure, where the network structure forms flow paths allowing a feed gas to flow from a first end to a second end of the macroscopic structure. By providing a network structure with an alternating cross-section along the longitudinal direction of the macroscopic structure, the electrical resistance along the longitudinal direction can be controlled and the electrical resistance optimized according to the application, thereby enabling operation at increased heat flux or lower current. It may additionally improve mixing of the gas during the gas flow from the first end to the second end, thereby improving mass transfer performance.

A structured catalyst for catalysing an endothermic reaction of a feed gas to convert it to a product gas, is thus provided, said structured catalyst comprising at least one macroscopic structure extending in a longitudinal direction from a first end to a second end, where said first end forms an inlet to said macroscopic structure for said feed gas and said second end forms an outlet for said product gas, said macroscopic structure comprising a three-dimensional network structure, wherein the network structure forms flow paths allowing the feed gas to flow from said first end to said second end, wherein the network structure is formed by a metallic material being electrically conductive and at least partly support a ceramic coating, the ceramic coating supporting a catalytically active material, wherein the network structure in a cross-section transverse to the longitudinal direction constitutes a fraction of a cross section of the macroscopic structure, the fraction being in the range of 4-75%, and wherein the network structure in at least three different cross-sections in the longitudinal direction constitute different fractions.

The network structure constitutes in a cross-section transverse to the longitudinal direction a fraction of a cross section of the macroscopic structure. Thus, the network structure constitutes one part of a cross-section, whereas as openings constitute another part of the same cross-section. It should be understood, that the opening may be filled, at least partly, with a material different from the metallic material of which the network structure is formed.

The fraction is in the range of 4-75%. In each cross-section along the longitudinal direction of the macroscopic structure, the network structure may constitute a fraction of the cross section of the macroscopic structure being in the range of 4-75%. Preferably the fraction is in the range from 4-50%, and even more preferably in the range from 4-30%.

The macroscopic structures is formed such that the network structure in at least three different cross-sections in the longitudinal direction constitute different fractions, whereby the network structure forms at least three different fractions along the longitudinal direction of the macroscopic structure.

As an example, the macroscopic structure may comprise a network structure which in one cross-section constitute a fraction of 5%, in another cross-section constitute a fraction of 15%, and in a third cross-section forms a cross-section of 25%.

Another macroscopic structure may comprise a network structure which in one cross-section constitute a fraction of 7%, in another cross-section constitute a fraction of 30%, and in a third cross-section forms a cross-section of 48%.

It should be understood, that the above-mentioned macroscopic structures are example of macroscopic structures, and that other macroscopic structures may comprise a network structure which another set of fractions.

It should further be understood that the network structure in a fourth cross-section may constitute a fraction being identical to the fraction of one of the first, second, or third cross-section. As an example, the network structure of the first mentioned embodiment may in a fourth cross-section constitute a fraction of 15% like in the second cross-section.

However, in another embodiment the network structure of the first mentioned embodiment may in a fourth cross-section constitute a fraction of 28%; i.e. a fraction being different from the fraction of the first, second, and third cross-section.

In different embodiments, the cross-section of the network structure may constitute at least 4, preferably 5, more preferably 6, more preferably 7, more preferably 8, more preferably 9, more preferably 10, more preferably 11, and most preferably 12 fractions in the longitudinal direction. The number of fractions may thus vary from embodiment comprising three fraction to embodiments comprise several fractions, such as 12 fractions or even more.

When decreasing the fraction in a cross-section, the electrical resistance per volume will be increase thereby enabling operation at increased heat flux or lower current.

The heat flux may be tailored towards the activity of the chemical reaction, by steadily decreasing the cross-section, in analogy to an increasing temperature in the structure and thereby increasing reaction rate of the catalyzed reaction. Also, the concept allows producing compact arrays, where as an increased resistance means that heat flux can be balanced to the chemical reaction according to available surface area. Overall, this means that overall minimum material use can be achieved for a given array design, without risking unwanted hotspots or run-away reactions.

Furthermore, a change in the fraction may be used to disrupt the gas flow, and in this way improve mixing of the gas flow for better mass transfer performance, as openings in the network structure enables mixing of gas flowing from the first end of the macroscopic structure to the second end.

As exemplified by the above-mentioned embodiments, the fractions may vary in number and size, thereby enabling local variation in the current density, and consequently heat flux. It is a goal of the invention to make such changes in a controlled manner to not make unwanted hotspots in the structure due to abrupt changes in the fractions.

The macroscopic structure comprising a network structure with cross-sections forming different fractions may enable a higher electrical resistance at some areas, without making high current densities in localized areas. Consequently, performance for a given volume of the macroscopic structure may be maximized, without risking hotspot generation leading to unwanted side-reactions or potential mechanical failure.

In an embodiment of the invention, the fractions are controlled in such a way so the electrical resistance, and therefore also local heat flux, is maximum in the middle section of the macroscopic structure in the longitudinal direction, while being lower in the first end and the second end. It can be advantageous to have a lower heat flux in the first end, where the reactant gas is far from equilibrium and unwanted side reactions can be a problem. Also, electrical connection parts (such as wires, connectors, busbars, and similar) that are temperature sensitive can be more easily used in the first section if the heat flux is lower. It can be advantageous to have a lower heat flux in the second end to allow the chemical reaction to achieve a conversion closer to the chemical equilibrium, and thereby avoid unnecessary overheating of the product gas. It can also be advantageous to have a lower heat flux in the second end due to controlling the current path and avoiding excessive heating of the material in this end where the temperature already is high.

The macroscopic structure may have an electrical resistance of more than 20%, preferably 50%, more preferably 100%, and even more preferably 300% higher than a similar macroscopic structure without a network structure. Dependent on the size and layout of the macroscopic structure, the electrical resistance may be even higher.

The network structure is formed by a metallic material. The metallic material may be an alloy comprising one or more substances selected from the group consisting of Fe, Cr, Al, Co, Ni, Zr, Cu, Ti, Mn, and Si.

The macroscopic structure supports a catalytically active material which may be provided at least partly on the exposed surface area of the macroscopic structure.

The close proximity between the catalytically active material and the macroscopic structure enables efficient heating of the catalytically active material by solid material heat conduction from the resistance heated macroscopic structure. An important feature of the resistance heating process is thus that the energy is supplied inside the object itself, instead of being supplied from an external heat source via heat conduction, convection and/or radiation. Moreover, the hottest part of the reactor system comprising the structured catalyst will be within the pressure shell of the reactor system. Preferably, the electrical power supply and the structured catalyst are dimensioned so that at least part of the structured catalyst reaches a temperature of 850° C., preferably 900° C., more preferably 1000° C. or even more preferably 1100° C. The amount and composition of the catalytically active material can be tailored to the endothermic reaction at the given operating conditions. The surface area of the macroscopic structure, the fraction of the macroscopic structure coated with a ceramic coating, the type and structure of the ceramic coating, and the amount and composition of the catalytically active catalyst material may be tailored to the endothermic reaction at the given operating conditions. However, it should be noted, that advantageously substantially all the surface of the macroscopic structure is coated with a ceramic coating and preferably all or most of the ceramic coating supports the catalytically active material. Preferably, only the parts of the macroscopic structure which are connected to conductors, are not provided with the ceramic coating.

As used herein, the term "macroscopic structure" is meant to denote a structure which is large enough to be visible with the naked eye, without magnifying devices. The dimensions of the macroscopic structure are typically in the range of tens of centimetres or of meters. Dimensions of the macroscopic structure are advantageously made to correspond at least partly to the inner dimensions of the pressure shell housing the structured catalyst, saving room for the heat insulation layer and conductors. Two or more macroscopic structures may be connected in order to provide an array of macroscopic structures having at least one of the outer dimensions in the range of meters, such as 0.5 m, 1 m, 2 m or 5 m. Such two or more macroscopic structures may be denoted "an array of macroscopic structures". In this case the dimensions of an array of macroscopic structures are advantageously made to correspond at least partly to the inner dimension of the pressure shell housing the structured catalyst (saving room for the heat insulation layer). A conceivable array of macroscopic structures could take up a volume of 0.01 to 10 $m^3$ or even larger. A "structured catalyst" may comprise a single macroscopic structure or an array of macroscopic structures, where the macroscopic structure(s) may support a ceramic coating supporting and a catalytically active material. If the structured catalyst comprises an array of macroscopic structures, the macroscopic structures may be electrically connected to each other; however, alternatively, the macroscopic structures are not electrically connected to each other. Thus, the structured catalyst may comprise two or more macroscopic structures positioned adjacent to each other, or two or more arrays positioned adjacent to each other.

The physical dimensions of the macroscopic structure may be any appropriate dimensions; thus, the height may be smaller than the width of the macroscopic structure or vice versa.

The term "first end of the macroscopic structure" is meant to denote the end of the macroscopic structure where the feed gas enters the macroscopic structure, and the term "second end of the macroscopic structure" is meant to denote the end of the macroscopic structure from which the product gas exits the macroscopic structure.

The macroscopic structure may support a ceramic coating, where the ceramic coating may support the catalytically active material. The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to conductors do not have a coating thereon. The coating may be a ceramic material with pores in the structure which allows for supporting catalytically active material on and inside the coating. Advantageously, the catalytically active material comprises catalytically active particles having a size in the range from about 5 nm to about 250 nm.

The macroscopic structured may advantageously be produced by 3D printing. The manufacturing of the macroscopic structure may also include sintering of the 3D printed element. A ceramic coating, which may contain the catalytically active material, may be provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure a high heat conductivity between the electrically heated macroscopic structure and the catalytically active material supported by the ceramic coating may be achieved, offering close and nearly direct contact between the heat source and the catalytically active material of the structured catalyst. Due to close proximity between the heat source and the catalytically active material the heat transfer is effective, so that the structured catalyst can be very efficiently heated. A compact reactor system in terms of gas processing per reactor system volume is thus possible, and therefore the reactor system housing the structured catalyst may be compact.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes which do not require subsequent sintering, such as powder bed fusion or direct energy deposition processes. Examples of such powder bed fusion or direct energy deposition processes are laser beam, electron beam or plasma 3D printing processes.

The electrically conductive material comprises Fe, Ni, Cu, Co, Cr, Al, Si or an alloy thereof. Such an alloy may comprise further elements, such as Mn, Y, Zr, C, Co, Mo or combinations thereof. Preferably, the electrically conductive material comprises Fe, Cr, Al or an alloy thereof. Such an alloy may comprise further elements, such as Si, Mn, Y, Zr, C, Co, Mo or combinations thereof. Preferably, the catalytically active material is particles having a size from 2 nm to 250 nm. Preferably, the conductors and the electrically conductive material are made of different materials than the electrically conductive material. The conductors may for example be of iron, nickel, aluminium, copper, silver or an alloy thereof. The ceramic coating is an electrically insulating material and will typically have a thickness in the range of around 100 µm, say 10-500 µm.

The electrically conductive material for the macroscopic structure is advantageously a coherent or consistently intra-connected material in order to achieve electrical conductivity throughout the electrically conductive material, and thereby achieve thermal conductivity throughout the structured catalyst and in particular providing heating of the catalyst material. By the coherent or consistently intra-connected material it is possible to ensure uniform distribution of current within the electrically conductive material and thus uniform distribution of heat within the structured catalyst. Throughout this text, the term "coherent" is meant to be synonymous to cohesive and thus refer to a material that is consistently intra-connected or consistently coupled. The effect of the structured catalyst being a coherent or consistently intra-connected material is that a control over the connectivity within the material of the structured catalyst and thus the conductivity of the electrically conductive material is obtained. It is to be noted that even if further modifications of the electrically conductive material are carried out, such as provision of cut-out spaces within parts of the electrically conductive material, the electrically conductive material is still denoted a coherent or consistently intra-connected material.

In general, when the macroscopic structure 3D printed, the pressure drop from the inlet to the outlet of the reactor system may be reduced considerably compared to a reactor where the catalyst material is in the form of pellets.

In an alternative embodiment, the macroscopic structure (s) may be produced by bending, cutting and/or welding sheet metal. It should be understood, that a structured catalyst may comprise a 3D printed macroscopic structure and a macroscopic structure being produced by other methods, such as bending, cutting, or welding.

The macroscopic structure may further comprise a circumferential wall forming an internal space. The circumferential wall may be formed by a metallic material being electrically conductive. In an alternative embodiment, the circumferential wall may be formed by a non-conductive material. The network structure may be arranged in the internal space. In a preferred embodiment, the macroscopic structure is substantially square-shaped in a cross-section perpendicular to the longitudinal direction. It should, however, be understood, that the at least one macroscopic structure may also have other cross-sectional shapes, such as triangular, circular, oval, pentagon, hexagon, other polygons, etc. The circumferential wall may thus be substantially, square-shape, triangular, circular, etc., dependent on the outer shape of the macroscopic structure.

In one embodiment, the circumferential wall does not comprise openings transverse to the longitudinal direction, thereby providing a closed sidewall arranged circumferential around the network structure. This is advantageous to ensure controlled gas flow paths through the macroscopic structure.

The cross-section of the network structure may be continuously non-constant over a combined distance of at least 10%, preferably 20%, more preferably 30%, more preferably 40%, more preferably 50%, more preferably 60%, more preferably 70%, more preferably 80%, and most preferably 90% of the length of the macroscopic structure in the longitudinal direction. By continuously non-constant should be understood that the fraction changes continuously over a combined distance of at least 10%, where the fraction change is non-constant. Or in other words, that the first derivative of the fraction relative to the longitudinal direction is a non-constant and continuous function. By combined distance should be understood, a distance which may be composed of two or more discrete distances with a continuously non-constant fraction, which is interrupted by intermediate distances, wherein the fraction is not continuously non-constant, e.g. is constant.

A change of the fraction may be less than 500% per mm in the longitudinal direction, preferably less than 100% per mm, and even more preferably less than 50% per mm. Smaller changes result in smaller disruptions in the current densities in the structure and consequently in less tendency for local hotspot formation.

It should be understood, that the cross-section of the network structure may alternatively or additionally be continuously non-constant over a combined distance of at least 10%, preferably 20%, more preferably 30%, more preferably 40%, more preferably 50%, more preferably 60%, more preferably 70%, more preferably 80%, and most preferably 90% of the length of the macroscopic structure in a direction transverse to the longitudinal direction.

When providing the network structure with at least three different cross-sections with different fractions, it may be achieved that a resistance gradient in at least one region along the longitudinal direction is substantially higher than an average resistance gradient along the longitudinal direction.

It may additionally and/or alternatively be achieved that the resistance gradient in at least one region along the longitudinal direction is substantially lower than the average resistance gradient along the longitudinal direction.

The network structure may comprise a plurality of cut-outs, wherein the cut-outs may be filled with a cut-out material having a lower conductivity than that of the metallic material. The cut-out may be formed as a part of a 3D printing process which may be used to form the network structure.

In one embodiment, the cut-out material is a void. I.e. the cut-outs may be empty to thereby provide openings through which the gas may pass when flowing from the first end to the second end. These cut-outs may increase mixing of the gas passing through the macroscopic structure.

In an alternative embodiment, the cut-out material is a solid cut-out material. Consequently, the cut-outs may be closed whereby mixing of gas flowing from the first end to the second end through these cut-out may be prevented. The network structure may comprise cut-outs filled with different materials, whereby a first cut-out may be filled with a first cut-out material, whereas a second cut-out may be filled with a second cut-out material. In an embodiment, the solid cut-out material at least partly supports a ceramic coating with a catalytically active material similar to that on the metallic material. In this embodiment, increased catalytic activity is achieved in parallel to the control of the resistance of the material.

The solid cut-out material may have thermo-mechanical properties being substantially equivalent to thermo-mechanical properties of the metallic material forming the network structure. The thermos-mechanical properties may be the thermal expansion coefficient to thereby achieve substantial equal expansion of the network structure and the solid cut-out material arranged in the cut-outs during use of the catalyst. Alternatively, or additionally, the thermos-mechanical properties may be tensile strength.

The network structure may in one embodiment comprise one or more cut-outs being voids and one or more cut-outs filled with a solid cut-out material. Thus, the network structure may comprise a first subgroup of cut-outs being voids, and may comprise a second sub-group of cut-outs is filled with a solid cut-out material. It should be understood, that a sub-group may comprise only a single cut-out. It should further be understood that the cut-outs of the second sub-group may be filled with different materials, so that a first cut-out is filled with a first cut-out material, whereas a second cut-out is filled with a second cut-out material.

The cut-outs may have a plurality of shapes. As an example, at least one of the cut-outs has a shape selected from the group consisting of a sphere, a disc, an ellipsoid, a droplet, a spiral, and a polyhedron, such as a box, a pyramid, a diamond, and a rhombus.

In one embodiment, all cut-outs have the same shape, whereas at least some of the cut-outs in other embodiments are of a different shape. As an example, a network structure may comprise a first group of cut-outs being disc-shaped, and a second group of cut-out having the shape of a sphere. Thus, the network structure may comprise cut-out of which at least two of the cut-outs are of different form and/or shape.

A plurality of the cut-outs may be arranged equidistant along the longitudinal direction of the macroscopic structure. In an alternative embodiment, the cut-outs may be arranged with varying distance along the longitudinal direction. It should further be understood, that a network structure may comprise a plurality of cut-outs arranged equidistant along the longitudinal direction and a plurality of cut-outs arranged with varying distance along the longitudinal direction. The two sets of cut-outs may as an example be arranged in parallel to each other along the longitudinal direction.

Furthermore, a plurality of the cut-outs may be arranged equidistant transverse to the longitudinal direction.

In one embodiment, a first group of cut-outs and a second group of cut-outs are alternating positioned along the longitudinal direction. The difference between the cut-outs of the first and second group may be size and/or shape and/or the cut-out material which may fill the cut-outs.

In an embodiment, at least a part of the network structure may be formed as a three-dimensional grid structure, thereby enabling a flow of gas through the macroscopic structure from the first end to the second end along a flow path being non-linear, i.e. having non-linear streamlines.

In one embodiment at least a part of the network structure may forms a plurality of parallel flow channels.

In an embodiment, the network structure may form a plurality of internal walls which may be arranged in the internal space formed by the circumferential wall. The plurality of internal walls may form a plurality of flow channels from the first end to the second end. Thus, the network structure may have a plurality of parallel channels, a plurality of non-parallel channels and/or a plurality of labyrinthine channels, where the channels have walls defining the channels. Thereby, several different forms of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without being in contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. The walls may e.g. have a thickness of between 0.2 and 2 mm, such as about 0.5 mm, and the ceramic coating supported by the walls may have a thickness of between 10 µm and 500 µm, such as between 50 µm and 200 µm, such as 100 µm.

The macroscopic structure may comprise flow guides to ensure flow distribution of gas flowing from the inlet at the first end toward the outlet at the second end. These flow guides may be 3D printed as one piece with the macroscopic structure. The flow guide may form part of the network structure, and may be 3D printed as a part of the network structure.

The flow guides may in one embodiment be evenly distributed along the longitudinal direction of the macroscopic structure, whereas they in another embodiment may be unevenly distributed. It should further be understood that flow guide may in one embodiment be arranged along a part of the longitudinal direction, and in an alternative embodiment be arranged along the full length of the macroscopic structure in the longitudinal direction.

The flow guides may additionally serve as electrical terminals which may minimize contact resistance and thereby provide a more even current distribution.

The structured catalyst may comprise two or more macroscopic structures, wherein the at least two macroscopic structures are electrically connected, thereby forming an array comprising two or more macroscopic structures.

Two neighbouring macroscopic structures may be produced as a single piece by 3D printing to form an electrical connection between the two macroscopic structures closest to either the first or the second end of these macroscopic structures. I.e. the electrical connection may either be in the area of the first end or the second end of the macroscopic structures.

In a particular embodiment of a structured catalyst of the invention, the electrical connection between the first and second macroscopic structures is made by mechanical connection, clamping, soldering, welding or any combination of these connection methods.

In a particular embodiment of a structured catalyst of the invention, the electrical connection between the first and second macroscopic structures is in the form of a connector comprising at least two engagement means each engaging one of said first and second macroscopic structures, wherein the engagement means has an inner surface with a shape matching at least a part of the outer surface of said first and second macroscopic structures, and wherein the engagement means is attached to the outer surface of the circumferential wall by an interference fit. In the context of the present invention, 'an interference fit' (also known as a press fit or friction fit) should be understood as a fastening between two tight fitting mating parts to thereby produce a joint which is held together by friction after the parts are pushed/pressed together. The connector and the macroscopic structure(s) may be joined by applying a forced pressure, from e.g. a press, on one part to slide it over/into the other. In a particular embodiment, the connector is formed of an alloy comprising one or more substances selected from the group consisting of Fe, Cr, Al, Co, Ni, Zr, Cu, Ti, Mn, and Si.

In a particular embodiment of a structured catalyst of the invention, the electrical connection between the first and second macroscopic structures is in the form of a bridge of an electrically conductive material, wherein the bridge and the first and second macroscopic structures together form a coherent structure. Here, "coherent" means forming a continuous phase. In a particular embodiment, the bridge is formed by providing electrically conductive materials of the first macroscopic structure, the second macroscopic structure and the bridge in the form of three separate entities, and joining the separate entities together by a method comprising a step of sintering or oxidizing treatment. In a particular embodiment, the combination of the bridge and the first and second macroscopic structures is 3D printed and then sintered. In particular embodiment, the electrically conductive material of the bridge is an alloy comprising one or more substances selected from the group consisting of Fe, Cr, Al, Co, Ni, Zr, Cu, Ti, Mn, and Si. In a particular embodiment, the electrically conductive materials of the bridge and the first and the second macroscopic structures are the same.

The structured catalyst may in one embodiment comprise at least a first and a second macroscopic structure, where the second macroscopic structure may be arranged at least partly circumferentially around a first macroscopic structure. In one embodiment, the second macroscopic structure may be an elongated structure extending in the longitudinal direction and being hollow to thereby fully surround the first macroscopic structure, whereby an inner surface of the second macroscopic structure faces an outer surface of the first macroscopic structure. In an alternative embodiment, the second macroscopic structure may be arranged partly circumferentially around the first macroscopic structure, whereby a part of an inner surface of the second faces a part of an outer surface of the first macroscopic structure. As an example of the later embodiment, the first macroscopic structure may in a cross-second transverse to the longitudinal direction form a substantially circular form, whereas the second macroscopic structure in a cross-section transverse to the longitudinal direction may be substantially C-shaped to thereby partly enclose the first macroscopic structure when being arranged partly circumferentially around the first macroscopic structure.

The second macroscopic structure may be arranged circumferentially around at least 50%, such as at least 60%, such as at least 70%, such as at least 80%, such as at least 90%, such as 100% of an outer surface of the first macroscopic structure. When the second macroscopic structure is arranged circumferentially around 50% of an outer surface of the first macroscopic structure, half of the outer surface of the first macroscopic structure faces the second macroscopic structure, whereas as the other 50% of the outer surface of the first macroscopic structure does not face the second macroscopic structure.

The first and second macroscopic structures may be electrically connected at the second end, whereby the structured catalyst may be configured to direct an electrical current to run through the first macroscopic structure from the first end to said second end, then through the second macroscopic structure from the second end to the first, while the second macroscopic structure is arranged circumferentially around the first macroscopic structure.

The first and second macroscopic structures may be formed in one piece, and may in an alternative embodiment be formed as two separate elements which may subsequently be attached to each other at the second end to thereby provide electrical connection between the first and second macroscopic structures.

To facilitate arrangement of the second macroscopic structure at least partly circumferentially around the first macroscopic structure, an outer surface of the first macroscopic structure may match an inner surface of the second macroscopic structure. It should be understood, that the shapes may match, while the sizes may be different to ensure, that the first and second macroscopic structures are not arranged in contact with each other along the longitudinal direction hereof. The first and second macroscopic structures may be electrically connected at the second end to allow a current flow through the first and second macroscopic structures.

By providing the first macroscopic structure with the outer surface matching an inner surface of the second macroscopic structure the distance between the first and second macroscopic structures can be minimized.

In one embodiment, the outer surface of the first macroscopic structure in a cross-section transverse to the longitudinal direction may be substantially circular. At least a part of the outer surface the second macroscopic structure in a cross-section transverse to the longitudinal direction may likewise be substantially circular. In an alternative embodiment, the outer surface of the first macroscopic structure in a cross-section transverse to the longitudinal direction may be substantially oval, square-shaped, triangular, pentagon-shaped, hexagon-shaped, other a form a shape of another polygon. Thus, the outer surface may be of any arbitrary shape. At least a part of the inner surface of the second macroscopic structure may likewise form any of the mentioned shapes, or a section of such a shape. The latter being particularly relevant, in embodiments where the second macroscopic structure is arranged partly circumferential around the first macroscopic structure.

The first and second macroscopic structures may be arranged substantially co-axially.

It should be understood, that the structured catalyst may additionally comprise a third macroscopic structure which may be arranged at least partly circumferentially around the second macroscopic structure. The second and third macroscopic structure may be connected at the first end, whereby he structured catalyst may be configured to direct an electrical current to run through the first macroscopic structure from the first end to said second end, then through the second macroscopic structure from the second end to the first end, and subsequently through the third macroscopic structure from the first end to the second end.

The first, second, and third macroscopic structures may be arranged substantially co-axially. It should be understood that the remarks above in relation to the relative shape and size of the first and second macroscopic structure are equally applicable in relation to the second and third macroscopic structures.

It should further be understood, that the structured catalyst may comprise even more macroscopic structures, such as four, five, or even more.

Two macroscopic structures may comprise concurrent outer sections to enable a geometric joint in the longitudinal direction or in a direction being transverse to the longitudinal direction between the two macroscopic structures. As an example, the concurrent outer sections may form part of the network structure, it may form part of a circumferential wall, or it may be a separate element being attached to each of the macroscopic structure. In one embodiment, one part of the concurrent structure is a separate element attached to one of the macroscopic structures, whereas the other part of the concurrent structure forms part of the other macroscopic structure.

The two macroscopic structures may be held together by welding, soldering, or mechanical pressing. When pressed together, frictional forces may ensure that the two macroscopic structures are held together.

At least one macroscopic structure may comprise an attachment section to allow direct attachment of an electrical connection, wherein this attachment section is 3D printed in one piece with the macroscopic structure. The electrical connect may be provided to allow supply of electricity form a power supply.

A thickness of the circumferential wall in a section providing electrical connection to a second macroscopic structure may be 25%, preferably 50%, even more preferably 100%, and even more preferably 200% higher than the average thickness of the circumferential wall, where the thickness of the circumferential wall is defined as the size of the circumferential wall in a direction perpendicular to the longitudinal direction.

In one embodiment, the structured catalyst may be an array comprising a first and a second macroscopic structure, wherein:
a) the first and second macroscopic structure comprises a three-dimensional network structure;
b) the array comprises at least a first and a second conductor electrically connected to said first and second macroscopic structure, respectively, and to an electrical power supply, wherein said electrical power supply is dimensioned to heat at least part of said first and second macroscopic structure to a temperature of at least 500° C. by passing an electrical current through said macroscopic structure, and wherein the conductors are connected at positions on the array closer to said first end than to said second end,
c) said first and second macroscopic structures are electrically connected by a bridge of an electrically conductive material, and
d) the array is configured to direct an electrical current to run from the first conductor through the first macroscopic structure to said second end, then through the bridge, and then through the second macroscopic structure to the second conductor.

The array may have been produced by a process of 3D printing the first macroscopic structure, the second macroscopic structure, and the bridge as one entity.

Alternatively, the array may have been produced by a process of 3D printing the first macroscopic structure, the second macroscopic structure, the bridge, and an optional electrical connection piece as one entity.

In one embodiment, the second conductor is indirectly electrically connected to the second macroscopic structure.

The array may further comprise (i) one or more juxtaposed additional intermediate macroscopic structures and (ii) one end macroscopic structure, wherein each additional intermediate macroscopic structure is connected to at least two juxtaposed macroscopic structure by a bridge of an electrically conductive material, and wherein the end macroscopic structure is connected to at least one juxtaposed macroscopic structure, and wherein the second conductor is connected to the end macroscopic structure at a position on the end macroscopic structure closer to said first end than to said second end.

The first and second macroscopic structures may be connected by the bridge at the second end of the array.

A reactor system for carrying out an endothermic reaction of a feed gas is provided, said reactor system comprising:
a) a structured catalyst as described above;
b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
c) a heat insulation layer between said structured catalyst and said pressure shell.

It should be understood, that a skilled person would readily recognise that any feature described in combination with the structured catalyst could also be combined with the reactor system for carrying out an endothermic reaction of a feed gas, and vice versa.

The structured catalyst described above is very suitable for the reactor system for carrying out an endothermic reaction of a feed gas. The remarks set forth above in relation to the structured catalyst are therefore equally applicable in relation to the reactor system.

The layout of the reactor system allows for feeding a pressurized feed gas to the reactor system at an inlet and directing this gas into the pressure shell of the reactor system. Inside the pressure shell, a configuration of heat insulation layers and inert material is arranged to direct the feed gas through the channels of the structured catalyst where it will be in contact with the ceramic coating and the catalytically active material supported on the ceramic coatings, where the catalytically active material will facilitate the endothermic reaction. Additionally, the heating of the structured catalyst will supply the required heat for the endothermic reaction. The product gas from the structured catalyst is led to the reactor system outlet.

When the pressure shell comprises an inlet for letting in feed gas and an outlet for letting out product gas, where the inlet is positioned so that the feed gas enters the structured catalyst in a first end of the structured catalyst and the product gas exits the structured catalyst from a second end of the structured catalyst, and when the at least two conductors both are connected to the structured catalyst at a position on the structured catalyst closer to the inlet than to the outlet, the at least two conductors can be placed in the relatively colder part of the reactor system. The first end of the structured catalyst has a lower temperature than the second end of the structured catalyst due to:
- the feed gas fed led through the inlet may cool the at least two conductors before being heated by the structured catalyst further along the path of the gas through the structured catalyst;
- the feed gas inlet into the first end of the structured catalyst will have lower temperature than the product gas leaving the second end of the structured catalyst, due to the heat supplied to the structured catalyst electrically,
- The endothermic nature of the reactions absorbs heat from its surroundings,
- The structured catalyst is constructed to direct an electrical current to run from one conductor substantially to the second end of the structured catalyst and return to a second of the at least two conductors.

The temperature profile in the structured catalyst may correspond to a substantially continuously increasing temperature along the path of the feed gas through the structured catalyst.

When the reactor system of the invention is used to facilitate the steam reforming reaction it has several advantages over the more traditionally used fired tubular reformer. The reactor system of the invention does not need a furnace and this reduces the overall reactor size considerably. Moreover, it is an advantage that the amount of product gas produced in a single pressure shell is increased considerably compared to known tubular steam reformers. In a standard tubular steam reformer, the amount of product gas produced in a single tube of the tubular steam reformer is up to 500 Nm$^3$/h. In comparison, the reactor system of the invention is arranged to produce up to or more than 2000 Nm$^3$/h, e.g. even up to or more than 10000 Nm$^3$/h, within a single pressure shell. This can be done without the presence of O$_2$ in the feed gas and with less than 10% methane in the synthesis gas produced. When a single pressure shell houses catalyst for producing up to 10000 Nm$^3$/h, or more, product gas, it is no longer necessary to provide a plurality of pressure shells or means for distributing feed gas to a plurality of such separate pressure shells.

Another advantage of the reactor system is that the flow through the structured catalyst within the reactor system may be up-flow, due to the structured catalyst comprising a macroscopic structure. Alternatively, the flow through the structured catalyst could be in the horizontal direction or any other appropriate direction. This is more difficult in the case where the reactor contains pellets due to the risk of fluidization, grinding, and blowing out the pellets. Thereby, a substantial amount of piping may be avoided, thus reducing plant costs. Furthermore, the possibility of up-flow or horizontal flow increases the flexibility in plant design.

Moreover, it should be noted that the term "the at least two conductors are connected to the structured catalyst at a position on the structured catalyst closer to the first end of the structured catalyst than to the second end of the structured catalyst" is meant to denote that both/all of the at least two conductors are connected closer to the first end of the structured catalyst than to the second end. Preferably, the at least two conductors are connected to first end of the structured catalyst or within the quarter of the length of the/a macroscopic structure closest to the first end.

Use of the structured catalyst described above or the reactor described above is provided, wherein the endothermic reaction is selected from the group consisting of steam methane reforming, hydrogen cyanide formation, methanol cracking, ammonia cracking, reverse water gas shift and dehydrogenation.

The term "dehydrogenation" is meant to denote the following reaction:

$$R1\text{-}CH_2\text{—}CH_2\text{—}R2 \Leftrightarrow R1\text{-}CH=CH\text{-}R2+H_2$$

Where R1 and R2 may be any appropriate group in a hydrocarbon molecule, such as —H, —CH$_3$, —CH$_2$, or —CH.

In an embodiment, the endothermic reaction is dehydrogenation of hydrocarbons. The catalytically active material may be Pt. The maximum temperature of the reactor may be between 500-700° C. The pressure of the feed gas may be 2-5 bar.

The term "water gas shift" is meant to denote the following reactions:

$$CO+H_2O \Leftrightarrow CO_2+H_2$$

In an embodiment, the endothermic reaction is the reverse water gas shift reaction (the reverse reaction of water gas shift). The maximum temperature of the reactor may be between 600-1300° C. The pressure of the feed gas may be 2-80 bar, preferably 10-40 bar. In an embodiment said macroscopic structure is made of an alloy of Fe Cr Al, supporting a ceramic coating of a ZrO$_2$ and Al$_2$O$_3$ mixture, with Mn as catalytically active material. In another embodiment, said macroscopic structure is made of an alloy of Fe Cr Al, supporting a ceramic coating of a ZrO$_2$ and MgAl$_2$O$_4$ mixture, with Ni as catalytically active material.

The term "methanol cracking" is meant to denote the following reactions:

$$CH_3OH \Leftrightarrow CO+2H_2$$

$$CH_3OH+H_2O \Leftrightarrow CO_2+3H_2 (x)$$

Typically, methanol cracking reaction is accompanied by the water gas shift reaction.

In an embodiment, the endothermic reaction is cracking of methanol. The maximum temperature of the reactor may be between 200-300° C. The pressure of the feed gas may be 2-30 bar, preferably about 25 bar. In an embodiment said macroscopic structure is made of an alloy of Fe Cr Al, supporting a ceramic coating of a $ZrO_2$ and $Al_2O_3$ mixture, with CuZn as catalytically active material. In another embodiment, said macroscopic structure is made of an alloy of Fe Cr Al, supporting a ceramic coating of a $ZrO_2$ and $MgAl_2O_4$ mixture, with Ni as catalytically active material.

Moreover, the term "steam reforming" is meant to denote a reforming reaction according to one or more of the following reactions:

$$CH_4 + H_2O \Leftrightarrow CO + 3H_2$$

$$CH_4 + 2H_2O \Leftrightarrow CO_2 + 4H_2$$

$$CH_4 + CO_2 \Leftrightarrow 2CO + 2H_2$$

These reactions are typically coupled with the water gas shift reaction as well.

In an embodiment, the endothermic reaction is steam reforming of hydrocarbons. The maximum temperature of the reactor may be between 850-1300° C. The pressure of the feed gas may be 5-180 bar, preferably about 25 bar. The catalytically active material may be Ni, Ru, Rh, Ir, or a combination thereof, while the ceramic coating may be $Al_2O_3$, $ZrO_2$, $MgAl_2O_4$, $CaAl_2O_4$, or a combination therefore and potentially mixed with oxides such as Y, Ti, La, or Ce. In an embodiment said macroscopic structure is made of an alloy of Fe Cr Al, supporting a ceramic coating of a $ZrO_2$ and $MgAl_2O_4$ mixture, with nickel as catalytically active material.

The term "ammonia cracking" is meant to denote the following reactions:

$$2NH_3 \Leftrightarrow N_2 + 3H_2$$

In an embodiment, the endothermic reaction is ammonia cracking. The catalytically active material may be Fe or Ru. The maximum temperature of the reactor may be between 400-700° C. The pressure of the feed gas may be 2-30 bar, preferably about 25 bar.

The term "hydrogen cyanide synthesis" is meant to denote the following reactions:

$$2\ CH_4 + 2\ NH_3 + 3\ O_2 \Leftrightarrow 2\ HCN + 6\ H_2O$$

$$CH_4 + NH_3 \Leftrightarrow HCN + 3H_2$$

In an embodiment, the endothermic reaction is the hydrogen cyanide synthesis or a synthesis process for organic nitriles. The catalytically active material may be Pt, Co, or SnCo. The maximum temperature of the reactor may be between 700-1200° C. The pressure of the feed gas may be 2-30 bar, preferably about 5 bar.

In an embodiment, the reactor system further comprises a bed of a catalyst material, such as catalyst pellets, upstream the structured catalyst within the pressure shell. Here, the term "upstream" is seen from the flow direction of the feed gas. Thus, the term "upstream" is here meant to denote that the feed gas is directed through the bed of catalyst material prior to reaching the structured catalyst. Such a bed of a catalyst may perform a preconditioning of the feed mixture, by e.g. an adiabatic reaction towards a thermal equilibrium of a chemical reaction such as water-gas-shift. Additionally/alternatively, the bed of a catalyst material may be used as guard to prevent contamination of the downstream structured catalyst by impurities such as sulphur and/or chlorine. No specific heating needs to be provided to the bed of catalyst material; however, the bed of catalyst material may be heated indirectly if it is in close proximity to the structured catalyst.

In an embodiment a bed of catalyst material is placed within the pressure shell and downstream the structured catalyst. Such catalyst material may be in the form of catalyst pellets, extrudates or granulates. This provides for a situation where the fourth catalyst material can be arranged for lowering the approach to equilibrium of the gas leaving the structured catalyst by making a pseudo adiabatic equilibration of the relevant reactions.

It should be understood, that a skilled person would readily recognise that any feature described in combination with the structured catalyst and the reactor system for carrying out an endothermic reaction of a feed gas is applicable for this use. The remarks set forth above in relation to the structured catalyst and the reactor system are therefore equally applicable in relation to the use hereof.

DETAILED DESCRIPTION OF THE FIGURES

Throughout the Figures, like reference numbers denote like elements.

FIG. 1a shows a cross section through an embodiment of a reactor system 100 according to the invention. The reactor system 100 comprises a structured catalyst 10, arranged as an array of macroscopic structures 5. Each macroscopic structure 5 in the array is coated with a ceramic coating impregnated with catalytically active material. The reactor system 100 moreover comprises conductors 40, 40' connected to a power supply (not shown in the Figures) and to the structured catalyst 10, viz. the array of macroscopic structures. The conductors 40, 40' are led through the wall of a pressure shell 20 housing the structured catalyst and through insulating material 30 on the inner side of the pressure shell, via fittings 50. The conductors 40' are connected to the array of macroscopic structures 5 by conductor contact rails 41.

In an embodiment, the electrical power supply supplies a voltage of 26V and a current of 1200 A. In another embodiment, the electrical power supply supplies a voltage of 5V and a current of 240 A. The current is led through electrical conductors 40, 40' to conductor contact rails 41, and the current runs through the structured catalyst 10 from one conductor contact rail 41, e.g. from the conductor contact rail seen to the left in FIG. 1a, to the other conductor contact rail 41, e.g. the conductor contact rail seen to the right in FIG. 1a. The current can be both alternating current, and e.g. run alternating in both directions, or direct current and run in any of the two directions.

The macroscopic structures 5 are made of electrically conductive material. Especially preferred is the alloy Kanthal consisting of aluminium, iron and chrome. The ceramic coating, e.g. an oxide, coated onto the structure catalysts 5 is impregnated with catalytically active material. The conductors 40, 40' are made in materials like iron, aluminium, nickel, copper or alloys thereof.

During operating, a feed gas enters the reactor system 100 from above as indicated by the arrow 11. Product gas exits the reactor system from the bottom thereof as indicated by the arrow 12.

Figure 1B:
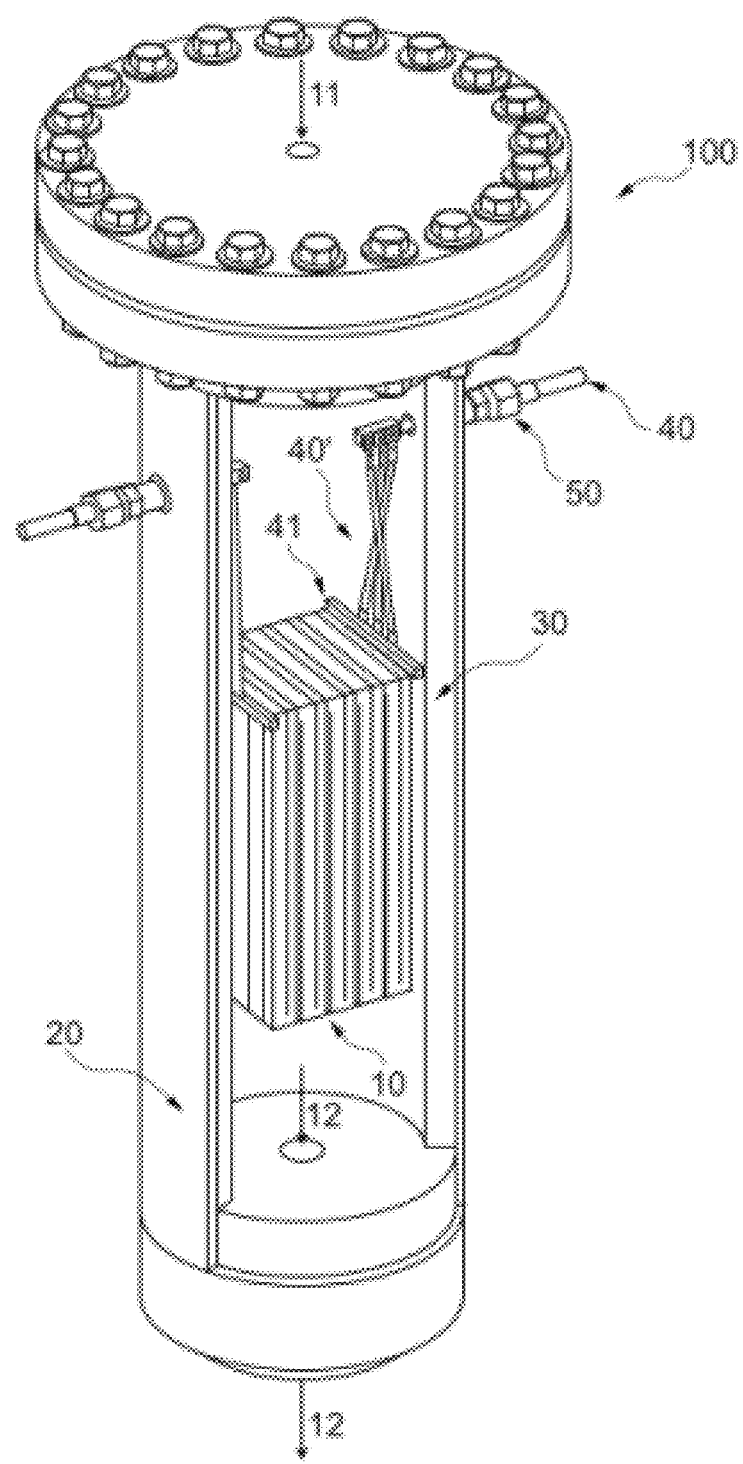
FIG. 1b illustrates the reactor system of FIG. 1a with a part of the pressure shell and heat insulation layer removed.
Figure 2:
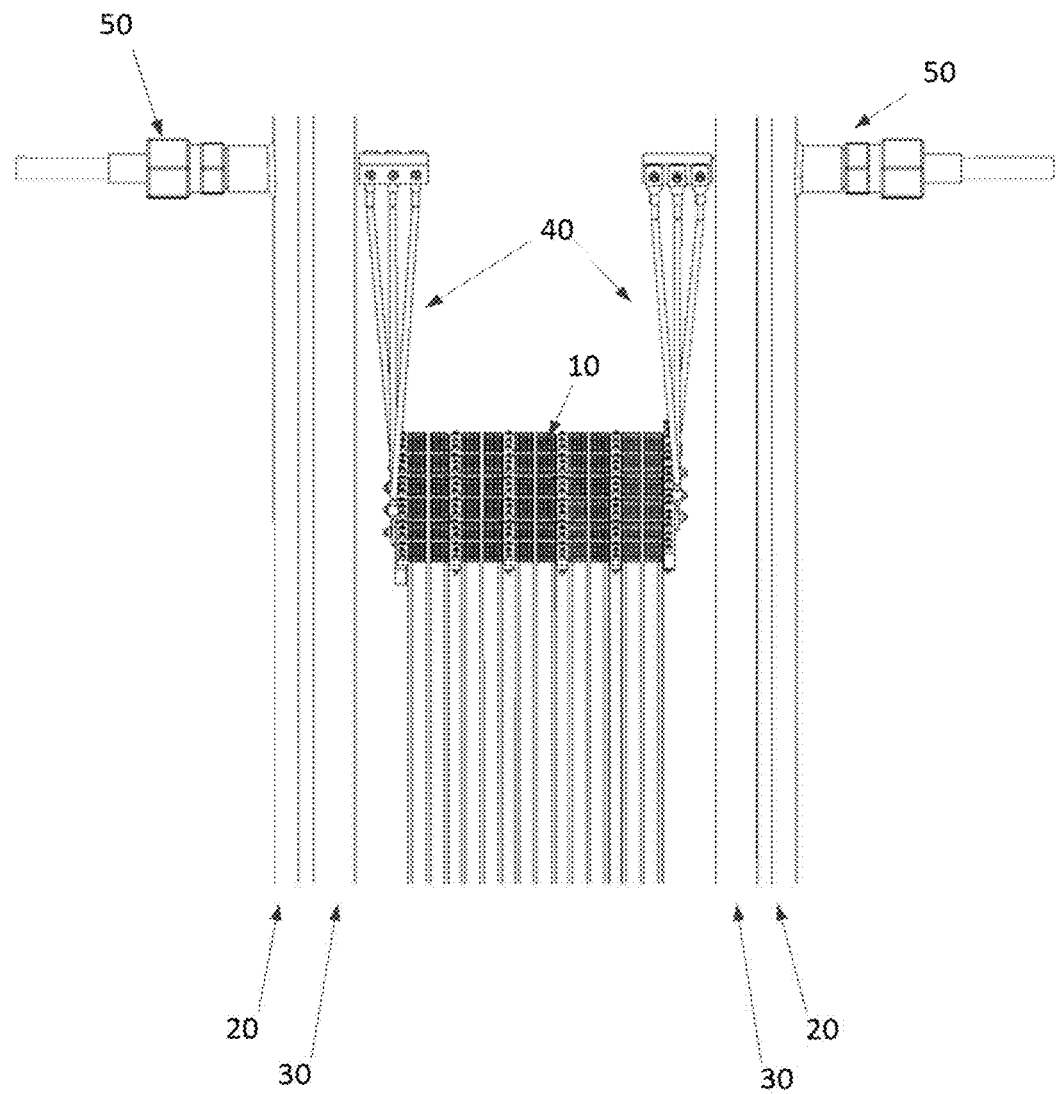
FIG. 2 is an enlarged view of a part of the reactor system.

FIG. 1b shows the reactor system 100 of FIG. 1a with a part of the pressure shell 20 and heat insulation layer 30 removed and FIG. 2 is an enlarged view of a part of the reactor system 100. In FIGS. 1b and 2, the connections between conductors 40' and conductor contact rails 41 are shown more clearly than in FIG. 1a. Moreover, it is seen that the conductors 40 are led through the walls of the pressure shell in a fitting 50, and that the one conductor 40 is split up into three conductors 40' within the pressure shell. It should be noted, that the number of conductors 40' may be any appropriate number, such as smaller than three or even larger than three.

In the reactor system shown in FIGS. 1a, 1b and 2, the conductors 40, 40' are led through the wall of a pressure shell 20 housing the structured catalyst and through insulating material 30 on the inner side of the pressure shell, via fittings 50. Feed gas for the endothermic reaction is inlet into the reactor system 100 via an inlet in the upper side of the reactor system 100 as shown by the arrow 11, and product gas exits the reactor system 100 via an outlet in the bottom of the reactor system 100 as shown by the arrow 12. Moreover, one or more additional inlets (not shown in FIGS. 1a to 2) advantageously exist close to or in combination with the fittings 50. Such additional inlets allow a cooling gas to flow over, around, close to, or inside at least one conductor within the pressure shell to reduce the heating of the fitting. The cooling gas could e.g. be hydrogen, nitrogen, methane or mixtures thereof. The temperature of the cooling gas at entry into the pressure shell may be e.g. about 100° C.

In the reactor system 100 shown in FIGS. 1a to 2, inert material (not shown in FIGS. 1a-2) is advantageously present between the lower side of the structured catalyst 10 and the bottom of the pressure shell. Moreover, inert material is advantageously present between the outer sides of the structured catalyst 10 of macroscopic structures 5 and the insulating material 30. Thus, one side of the insulating material 30 faces the inner side of the pressure shell 20 and the other side of the insulating material 30 faces the inert material. The inert materiel is e.g. ceramic material and may be in the form of pellets. The inert material assists in controlling the pressure drop across the reactor system 100 and in controlling the flow of the gas through the reactor system 100, so that the gas flows over the surfaces of the structured catalyst 10.

FIGS. 3a-3f illustrates six different network structures 6, where only a part of the network structure 6 is illustrated. The macroscopic structure 5 comprises a three-dimensional network structure 6, where the network structure 6 forms flow paths allowing the feed gas to flow from a first end 14 (see FIG. 5) to a second end 15 (see FIG. 5) of the macroscopic structure 5. The network structure 6 is formed by a metallic material being electrically conductive and which at least partly supports a ceramic coating, where the ceramic coating supports a catalytically active material. The six different parts of a network structure 6 each comprises a different embodiment of a cut-out 60 in the network structure.

The current distribution in an element is governed by ohm's law, which for a simple conductor with DC current is defined as:

$$U = R \cdot I$$

Where U is the potential [V], R the resistance [Si], and I the current [A]. For a three-dimensional geometry, that can be written as:

$$E = \rho_{res} \cdot J$$

Where E is the electric field vector [V/m], $\rho_{res}$ the resistivity [Ω·m], and the current density vector [A/m²]. The resistance, R, is inherently dependent on the geometry, where the resistivity a material specific parameter derived from the cross-sectional resistance per length.

$$\rho_{res} = R \cdot \frac{A}{L}$$

The thermal resistance losses are defined as the product of the current and potential drop across the element, which can be rewritten based on Ohm's law, depending on potential or current control.

$$P = U \cdot I = \frac{U^2}{R} = R \cdot I^2$$

As the resistance, R, is a geometry dependent parameter, the power supplied to a region can be tuned by alteration of the cross-section area.

FIGS. 3a-3f illustrate six different way of altering the cross-section of the network structure 6 by six different examples of cut-outs 60. FIG. 3a illustrates a cut-out 60 in the form of a sphere, FIG. 3b illustrates a disc-shaped cut-out 60, FIG. 3c an ellipsoid cut-out 60, FIG. 3d a droplet cut-out 60, FIG. 3e a diamond-shaped cut-out 60, and FIG. 3f a rhombic cut-out 60.

The cut-outs 60 are filled with a cut-out material having a lower conductivity than the conductivity of the metallic material of which the network structure 6 is formed. The cut-out material may be a void (i.e. by be empty) or may be a solid cut-out material.

Figures 4A, 4B, 4C:
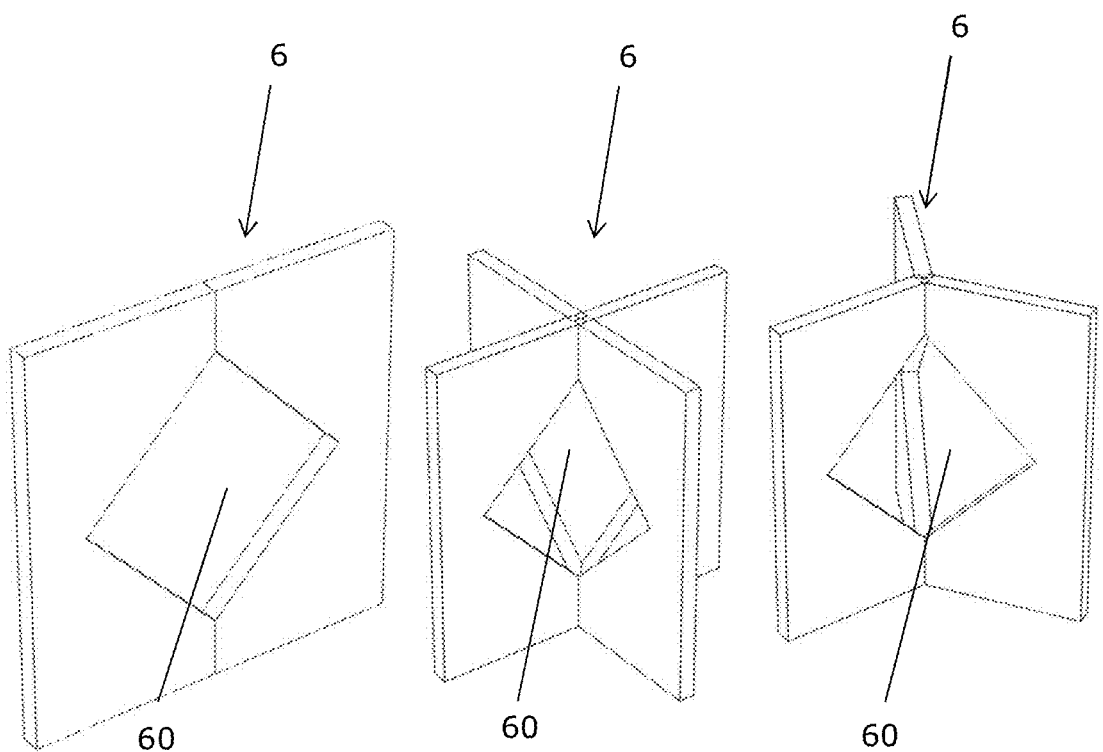
FIGS. 4a-4c illustrate different embodiments of cut-outs of a network structure.

FIGS. 4a-4b illustrate different embodiments of cut-outs 60 of a network structure 6. Only a part of the network structure 6 is illustrated. In FIG. 4a, the cut-out 60 is formed in a single plane of the network structure 6, whereas the cut-out 6 illustrated in FIG. 4b intersects two planes, and the cut-out 6 illustrated in FIG. 4c intersects three planes.

The network structure 6 constitutes in a cross-section transverse to the longitudinal direction a fraction of the cross section of the macroscopic structure 5. The fraction is in the range of 4-75%. The network structure constitutes in at least three different cross-sections in the longitudinal direction constitute different fractions.

The following figures illustrate different embodiments of macroscopic structures 5 with different network structures 5. The geometry of each of embodiments is illustrated in a separate figure; i.e. FIGS. 5, 7, 9, 11, and 13.

The network structure 6 constitutes in a cross-section transverse to the longitudinal direction a fraction of the cross section of the macroscopic structure 5. The fraction is for each embodiment illustrated in a separate graph in FIGS. 6a, 8a, 10a, 12a, and 14a, respectively. In these figures the fractions is specified as the relative metallic cross-section.

For each of the embodiments, the FIGS. 6b, 8b, 10b, 12b, and 14b, illustrate the relative change in cross section area of the network structure per unit length, where a unit is a single macroscopic structure. The cross section is roughly analogous to the current density distribution as defined by Ohm's law. This is in addition shown for some of the structures as Comsol simulations in separate figures; see FIGS. 6c, 8c, 10c, 12c, and 14c.

Figure 5:
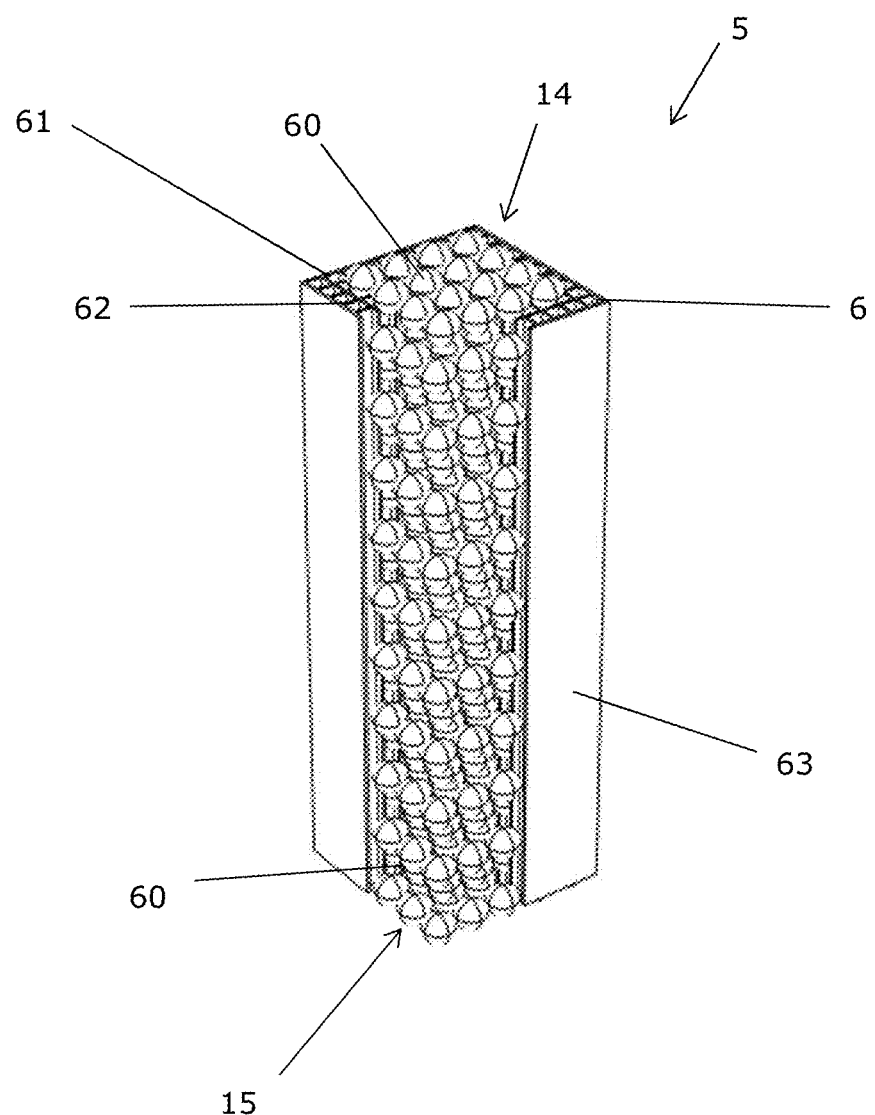
FIG. 5 illustrates an embodiment of a macroscopic structure.

FIG. 5 illustrates an embodiment of a macroscopic structure 5 in which the network structure 6 comprises a plurality of cut-outs 60. The cut-outs 60 are all sphere-shaped and filled with a cut-out material being solid. The cut-outs 60 intersect the internal walls 61 of the network structure 6. The internal walls 61 form a plurality of flow channels 62 from the first end 14 to the second end 15. In the illustrated embodiment, the network structure forms a plurality of parallel channels 62. The plurality of internal walls 61 are arranged in the internal space formed by a circumferential wall 63. In the illustrated embodiment, the circumferential wall does not comprise cut-outs.

The resistance of the illustrated macroscopic structure 5 is 220% compared to a macroscopic structure with parallel flow channels without the sphere-shaped cut-outs 60. Calculations have shown that 51% of the total volume of the macroscopic structure exceeds 5% of the average current density, while 32% is below. At the point with peak current, the current density exceeds the total average by 173%.

Figure 6A:
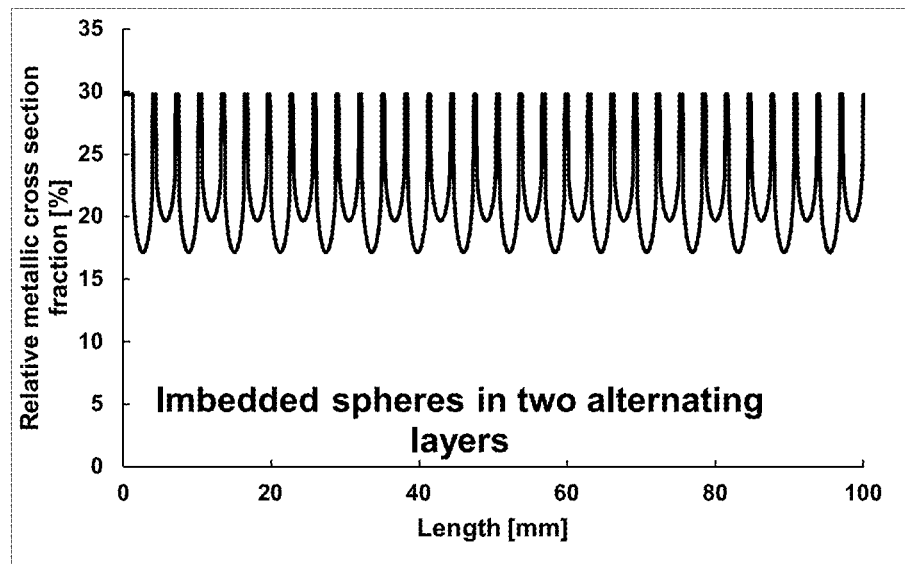
FIG. 6a illustrates the relative metallic cross-section of the embodiment illustrated in FIG. 5.

FIG. 6a illustrates the relative metallic cross-section of the embodiment of a macroscopic structure 5 illustrated in FIG. 5. As illustrated, the fraction is in the range of 17-30% for this embodiment, possessing all possible values in this range due to continuous nature of the curves. Along the structure, the fraction has a continuously non-constant behaviour in more than 90% of the longitudinal direction.

Figure 6B:
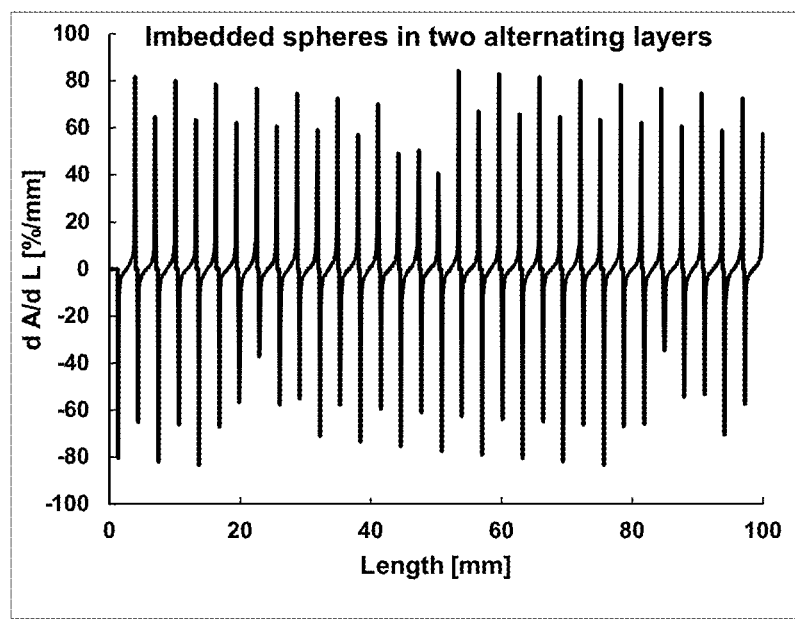
FIG. 6b illustrates the relative change in cross section area per unit length of the embodiment illustrated in FIG. 5.

FIG. 6b illustrates relative change in cross section area per unit length of the embodiment of the macroscopic structure 5 illustrated in FIG. 5. As illustrated, the cross section can change up to 80% within 1 mm of the length of the macroscopic structure 5.

Figure 6C:
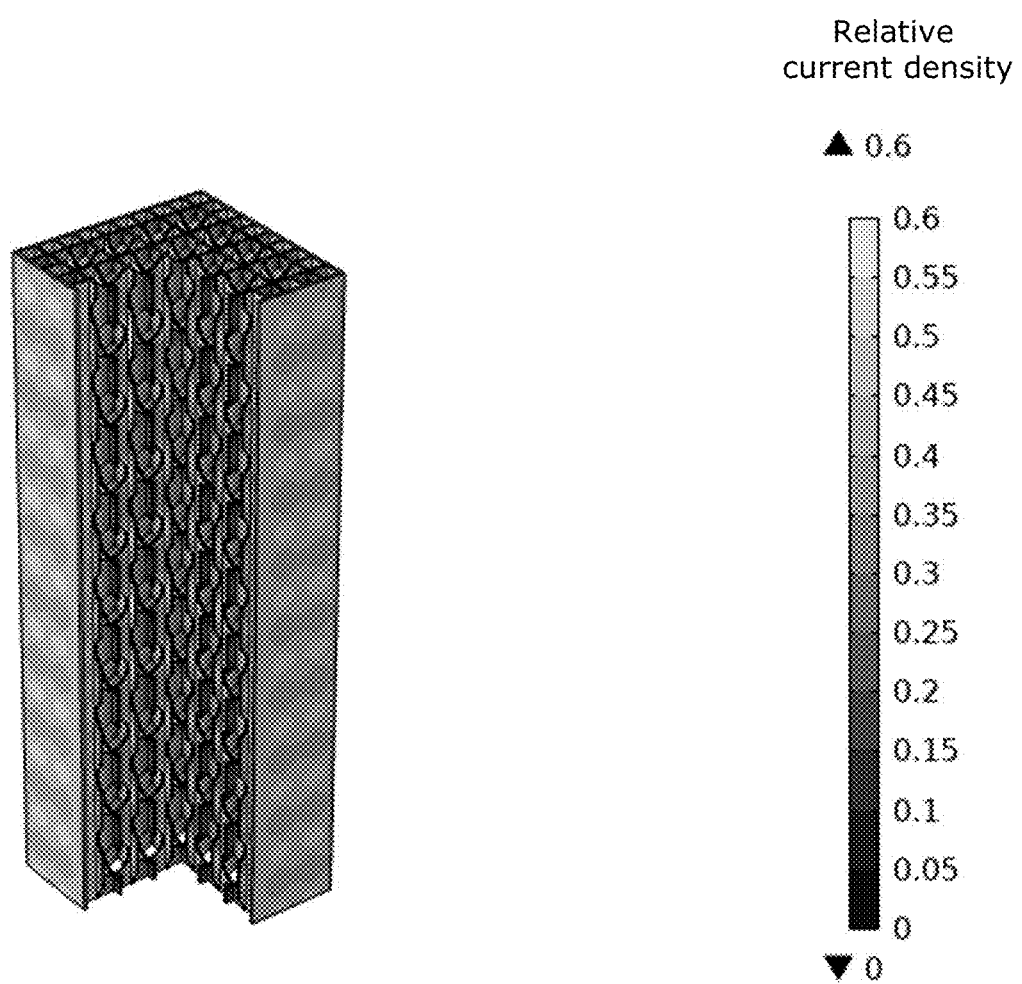
FIG. 6c illustrates the relative current density of the embodiment illustrated in FIG. 5.

FIG. 6c illustrates the current density of the macroscopic structure 5, as simulated by the Comsol software. This shows how the cut-outs 60 force the current density to increase in the remaining part of the network structure 6. The scale of the figure is a relative scale from 1 to 0, using the peak current as normalization.

Figure 7:
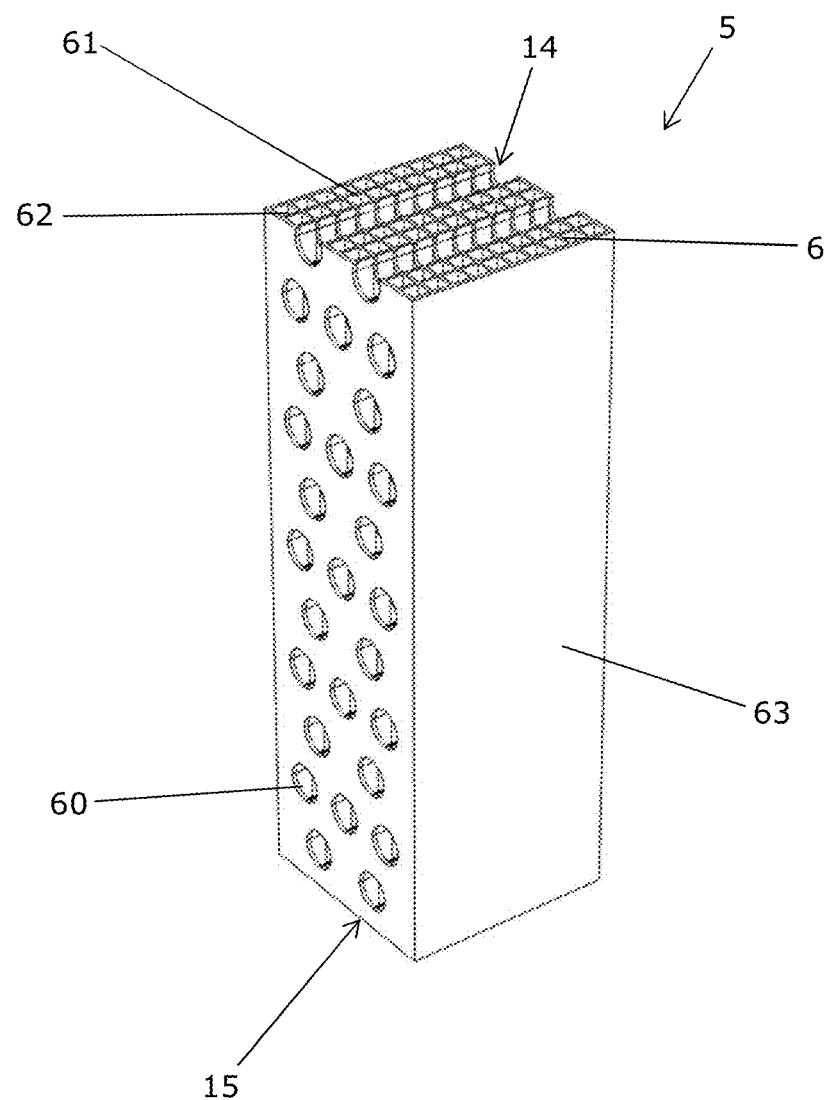
FIG. 7 illustrates an embodiment of a macroscopic structure.

FIG. 7 illustrates an embodiment of a macroscopic structure 5 in which the network structure 6 comprises a plurality of cut-outs 60. The cut-outs 60 are all circular channels located perpendicular to the longitudinal direction of the macroscopic structure. In this embodiment, the cut-outs 60 are voids. During use, the voids 60 (empty cut-out) will be filled with gas flowing through the macroscopic structure 5. The cut-outs 60 intersect the internal walls 61 of the network structure 6. The cut-outs 60 are alternating arranged with rows with two channels and rows with three channels, respectively.

The resistance of the illustrated macroscopic structure 7 is 142% compared to a macroscopic structure with parallel flow channels without cut-outs 60. Calculations have shown that 46% of the total volume of the macroscopic structure exceeds 5% of the average current density, while 30% is below. At the point with peak current, the current density exceeds the total average by 109%.

The internal walls 61 form a plurality of flow channels 62 from the first end 14 to the second end 15. In the illustrated embodiment, the network structure forms a plurality of parallel channels 62. The plurality of internal walls 61 are arranged in the internal space formed by a circumferential wall 63. In the illustrated embodiment, the circumferential wall 63 also comprises cut-outs 60, as the channels 60 extend from one side of the macroscopic structure 5 to the opposite side.

Figure 8A:
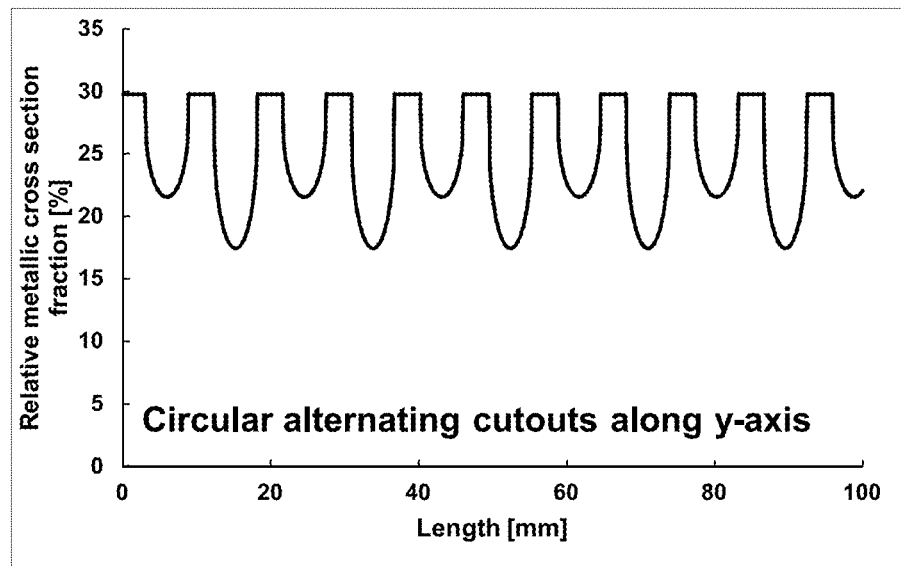
FIG. 8a illustrates the relative metallic cross-section of the embodiment illustrated in FIG. 7.

FIG. 8a illustrates the relative metallic cross-section of the embodiment of a macroscopic structure 5 illustrated in FIG. 7. As illustrated, the fraction is in the range of 17-30% for this embodiment. Along the structure, the fraction has a continuously non-constant behaviour in more than 60% of the longitudinal direction.

Figure 8B:
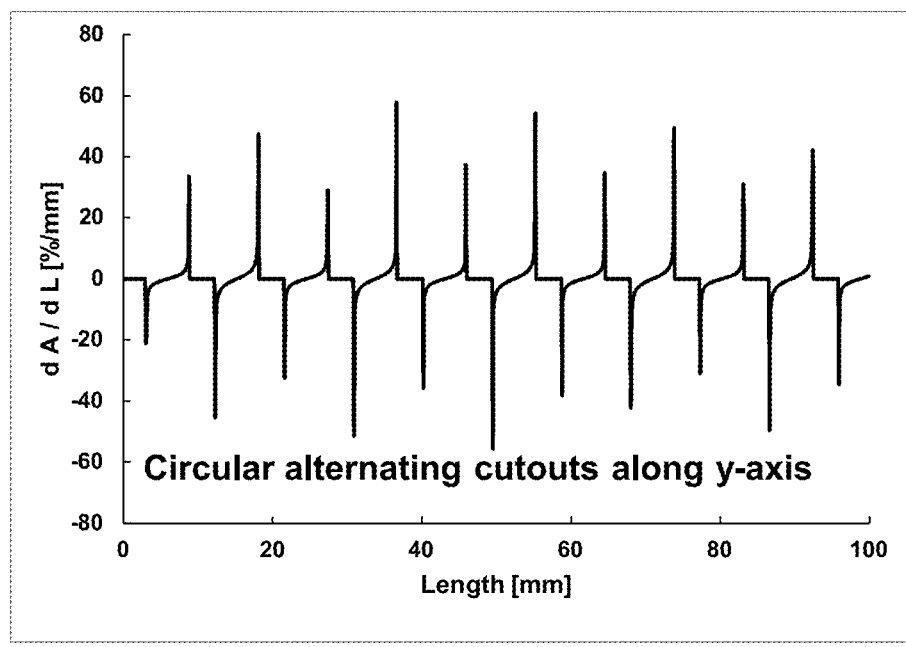
FIG. 8b illustrates the relative change in cross section area per unit length of the embodiment illustrated in FIG. 7.

FIG. 8b illustrates relative change in cross section area per unit length of the embodiment of the macroscopic structure 5 illustrated in FIG. 7. As illustrated the cross section can change up to 60% within 1 mm of the length of the macroscopic structure 5.

Figure 8C:
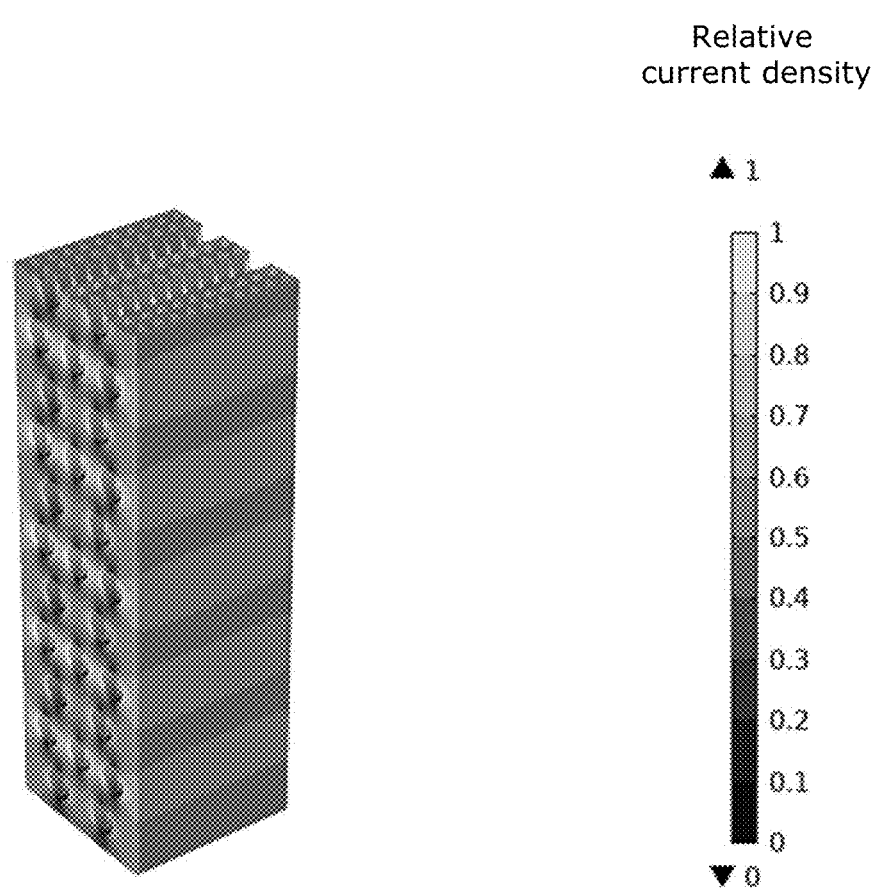
FIG. 8c illustrates the relative current density of the embodiment illustrated in FIG. 7.

FIG. 8c illustrates the current density of the macroscopic structure 5, as simulated by the Comsol software. This shows how the cut-outs 60 force the current density to increase in the remaining part of the network structure 6. The scale of the figure is a relative scale from 1 to 0, using the peak current as normalization.

Figure 9:
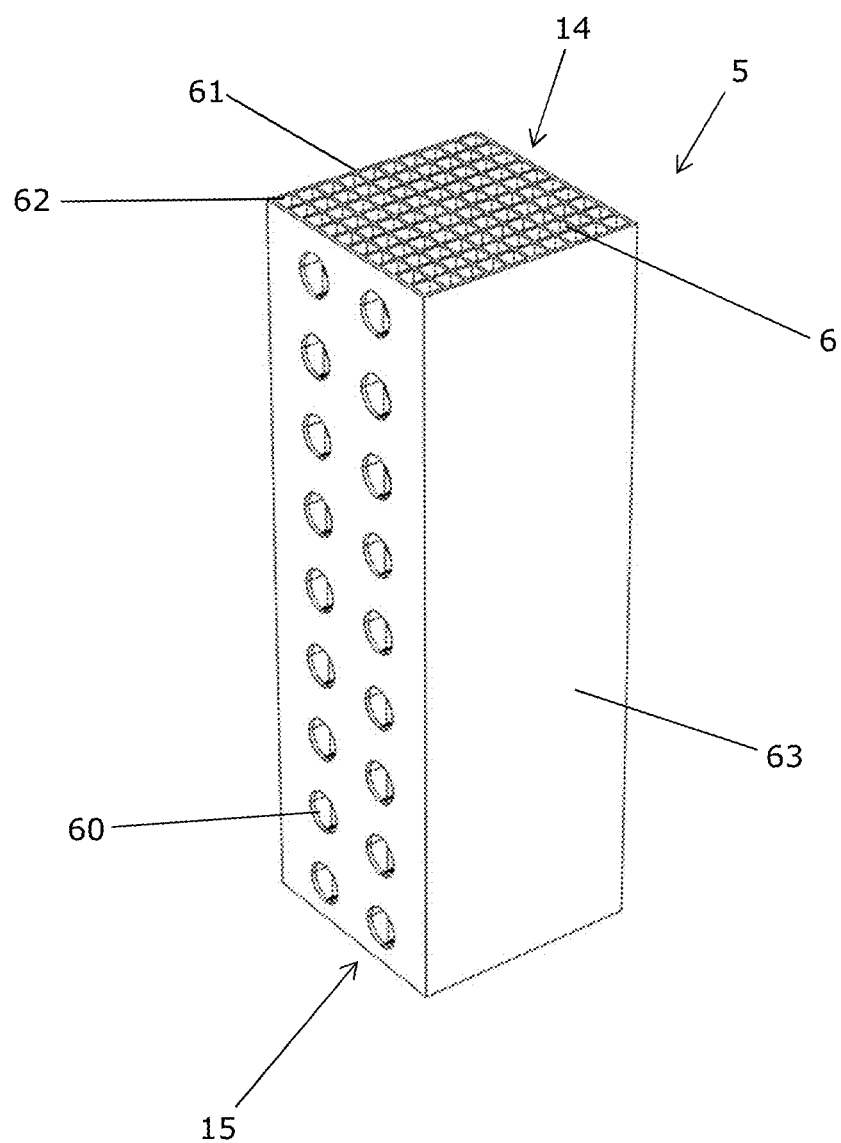
FIG. 9 illustrates an embodiment of a macroscopic structure.

FIG. 9 illustrates an embodiment of a macroscopic structure 5 in which the network structure 6 comprises a plurality of cut-outs 60. The cut-outs 60 are all circular channels located perpendicular to the longitudinal direction of the macroscopic structure. In this embodiment, the cut-outs 60 are voids. The cut-outs 60 intersect the internal walls 61 of the network structure 6. The embodiment is similar to the embodiment of FIG. 7 with the exception, that the cut-outs 60 in this embodiment are all arranged in rows with two channels each.

The resistance of the illustrated macroscopic structure 9 is 125% compared to a macroscopic structure with parallel flow channels without cut-outs 60. Calculations have shown that 63% of the total volume of the macroscopic structure exceeds 5% of the average current density, while 23% is below. At the point with peak current, the current density exceeds the total average by 96%.

The internal walls 61 form a plurality of flow channels 62 from the first end 14 to the second end 15. In the illustrated embodiment, the network structure forms a plurality of parallel channels 62. The plurality of internal walls 61 are arranged in the internal space formed by a circumferential wall 63. In the illustrated embodiment, the circumferential wall 63 also comprises cut-outs 60, as the channels 60 extend from one side of the macroscopic structure 5 to the opposite side.

Figure 10A:
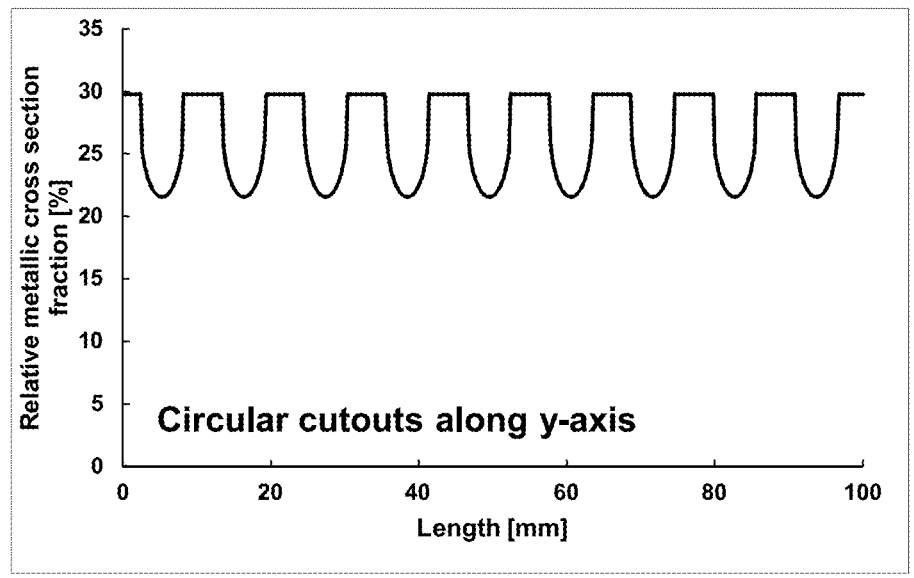
FIG. 10a illustrates the relative metallic cross-section of the embodiment illustrated in FIG. 9.

FIG. 10a illustrates the relative metallic cross-section of the embodiment of a macroscopic structure 5 illustrated in FIG. 9. As illustrated, the fraction is in the range of 21-30% for this embodiment.

Figure 10B:
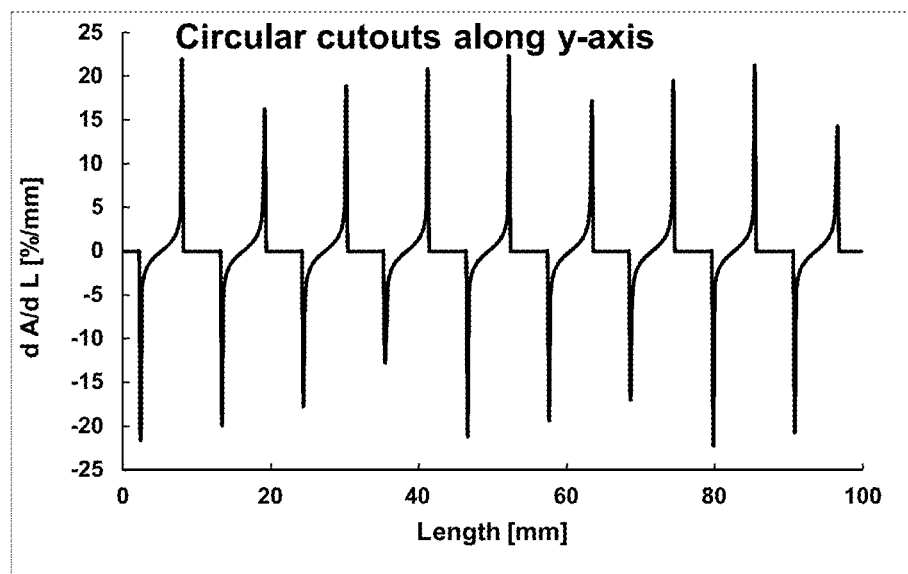
FIG. 10b illustrates the relative change in cross section area per unit length of the embodiment illustrated in FIG. 9.

FIG. 10b illustrates relative change in cross section area per unit length of the embodiment of the macroscopic structure 5 illustrated in FIG. 9. As illustrated the cross section can change up to 20% within 1 mm of the length of the macroscopic structure 5.

Figure 10C:
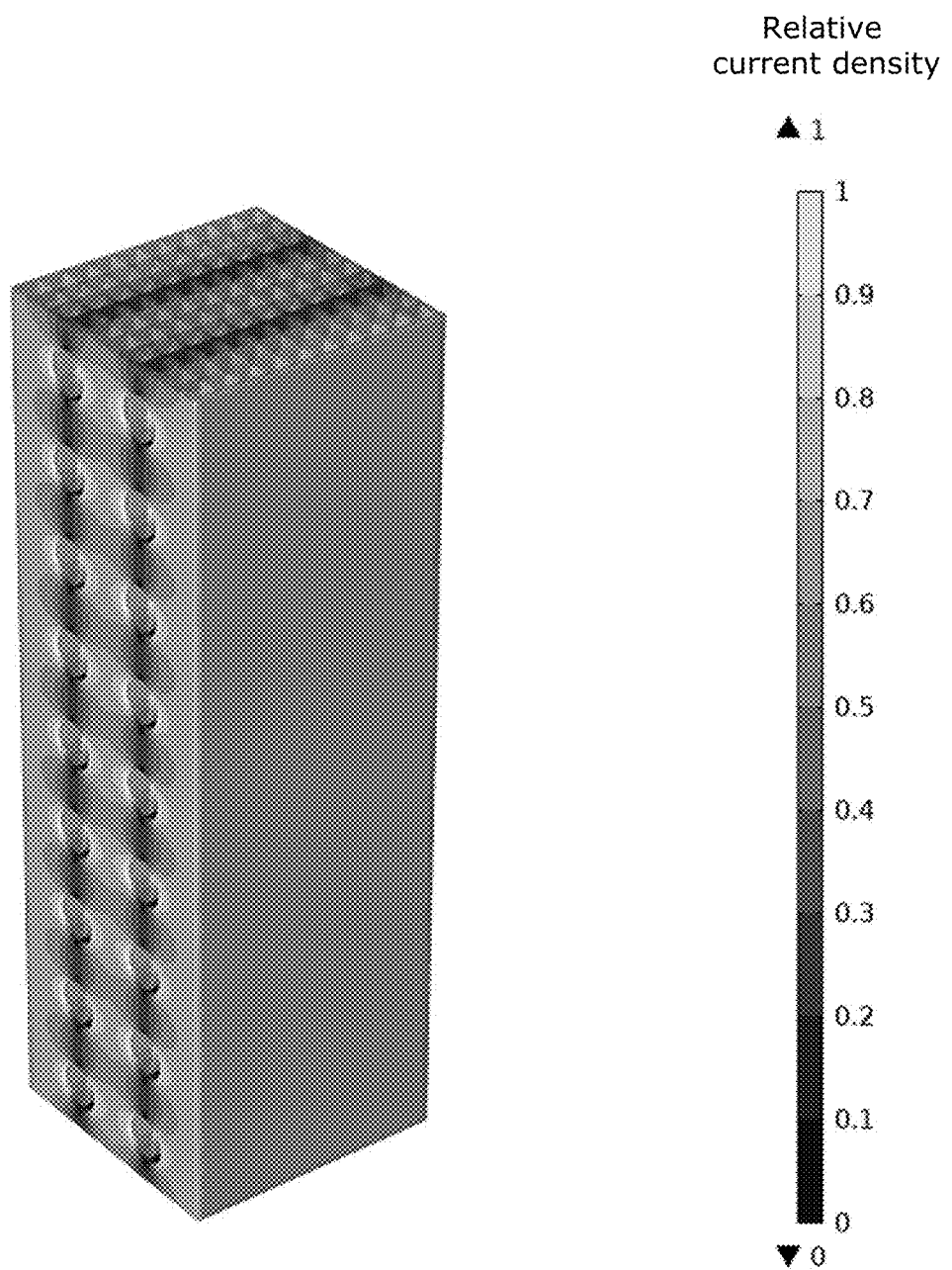
FIG. 10c illustrates the relative current density of the embodiment illustrated in FIG. 9.

FIG. 10c illustrates the current density of the macroscopic structure 5, as simulated by the Comsol software. This shows how the cut-outs 60 force the current density to increase in the remaining part of the network structure 6. The scale of the figure is a relative scale from 1 to 0, using the peak current as normalization.

Figure 11:
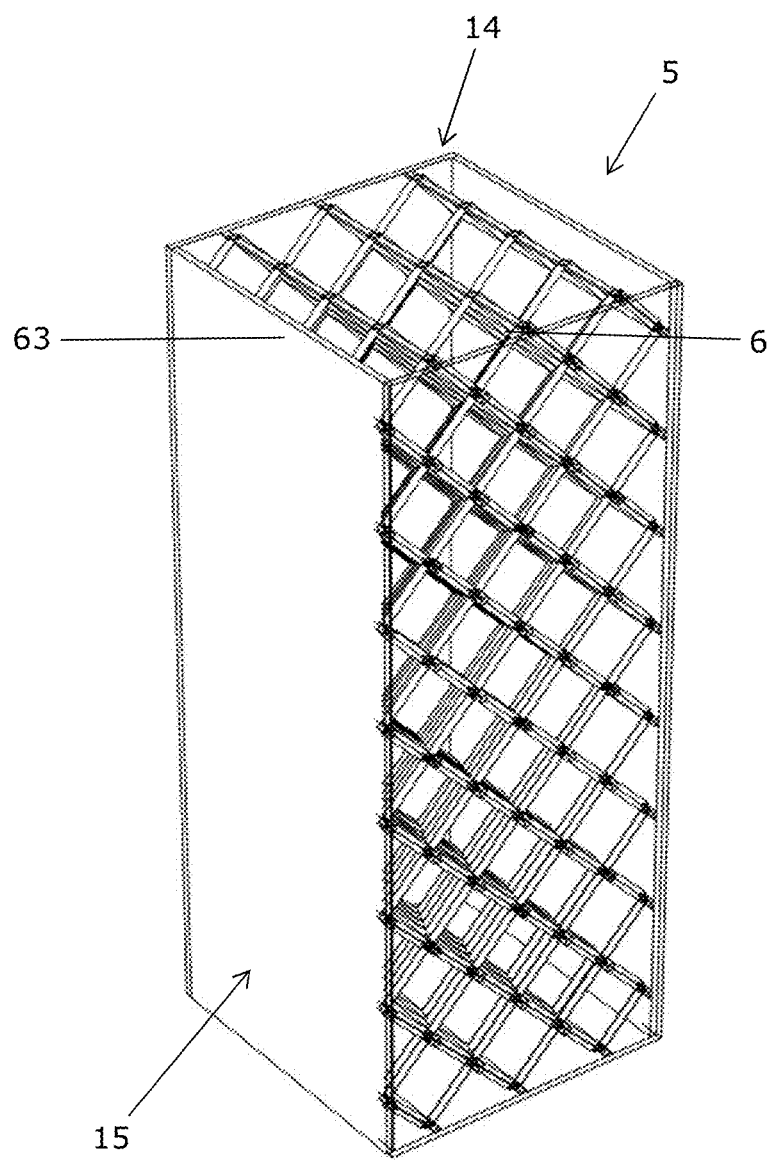
FIG. 11 illustrates an embodiment of a macroscopic structure.

FIG. 11 illustrates an embodiment of a macroscopic structure 5 in which the network structure 6 is formed as a mesh.

The resistance of the illustrated macroscopic structure 11 is 304% compared to a macroscopic structure with parallel flow channels without cut-outs 60. Calculations have shown that 71% of the total volume of the macroscopic structure exceeds 5% of the average current density, while 24% is below. At the point with peak current, the current density exceeds the total average by 389%.

The mesh 6 forms a plurality of flow channels 62 from the first end 14 to the second end 15. The mesh 6 is arranged in the internal space formed by a circumferential wall 63. For illustration purposes, one part of the circumferential wall 63 has been removed.

Figure 12A:
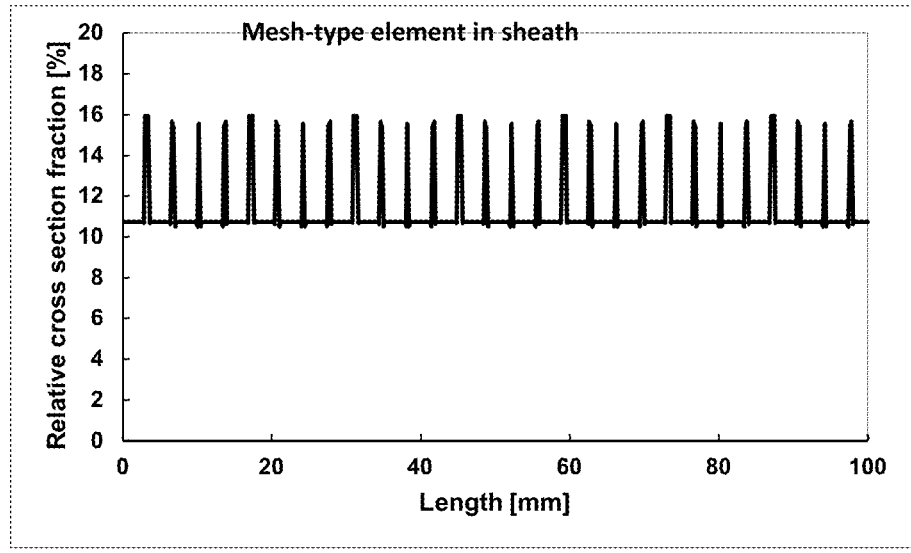
FIG. 12a illustrates the relative metallic cross-section of the embodiment illustrated in FIG. 11.

FIG. 12a illustrates the relative metallic cross-section of the embodiment of a macroscopic structure 5 illustrated in FIG. 11. As illustrated, the fraction is in the range of 10.5-16% for this embodiment.

Figure 12B:
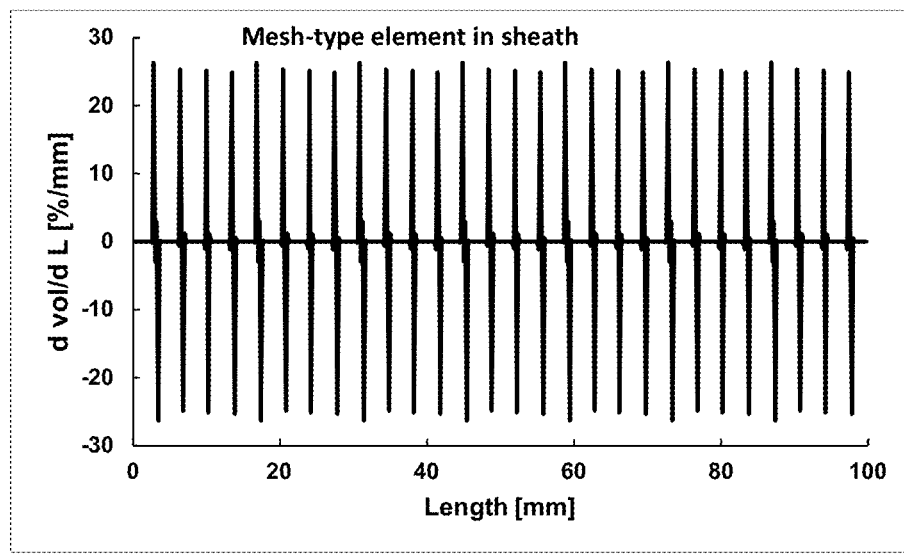
FIG. 12b illustrates the relative change in cross section area per unit length of the embodiment illustrated in FIG. 11.

FIG. 12b illustrates relative change in cross section area per unit length of the embodiment of the macroscopic structure 5 illustrated in FIG. 11. As illustrated the cross section can change up to 25% within 1 mm of the length of the macroscopic structure 5.

Figure 12C:
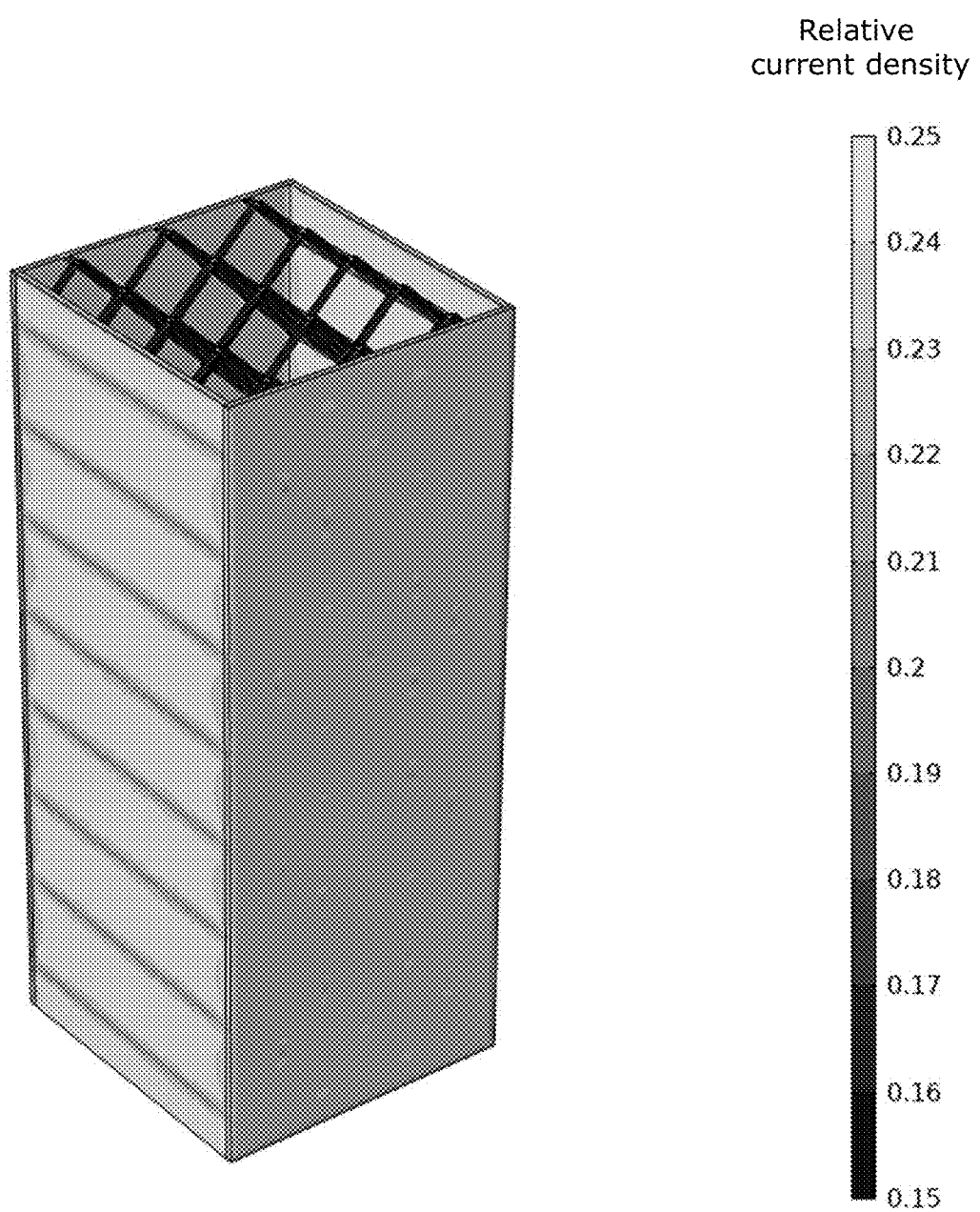
FIG. 12c illustrates the relative current density of the embodiment illustrated in FIG. 11.

FIG. 12c illustrates the current density of the macroscopic structure 5, as simulated by the Comsol software. This shows how the cut-outs 60 force the current density to increase in the remaining part of the network structure 6. The scale of the figure is a relative scale from 1 to 0, using the peak current as normalization.

Figure 13:
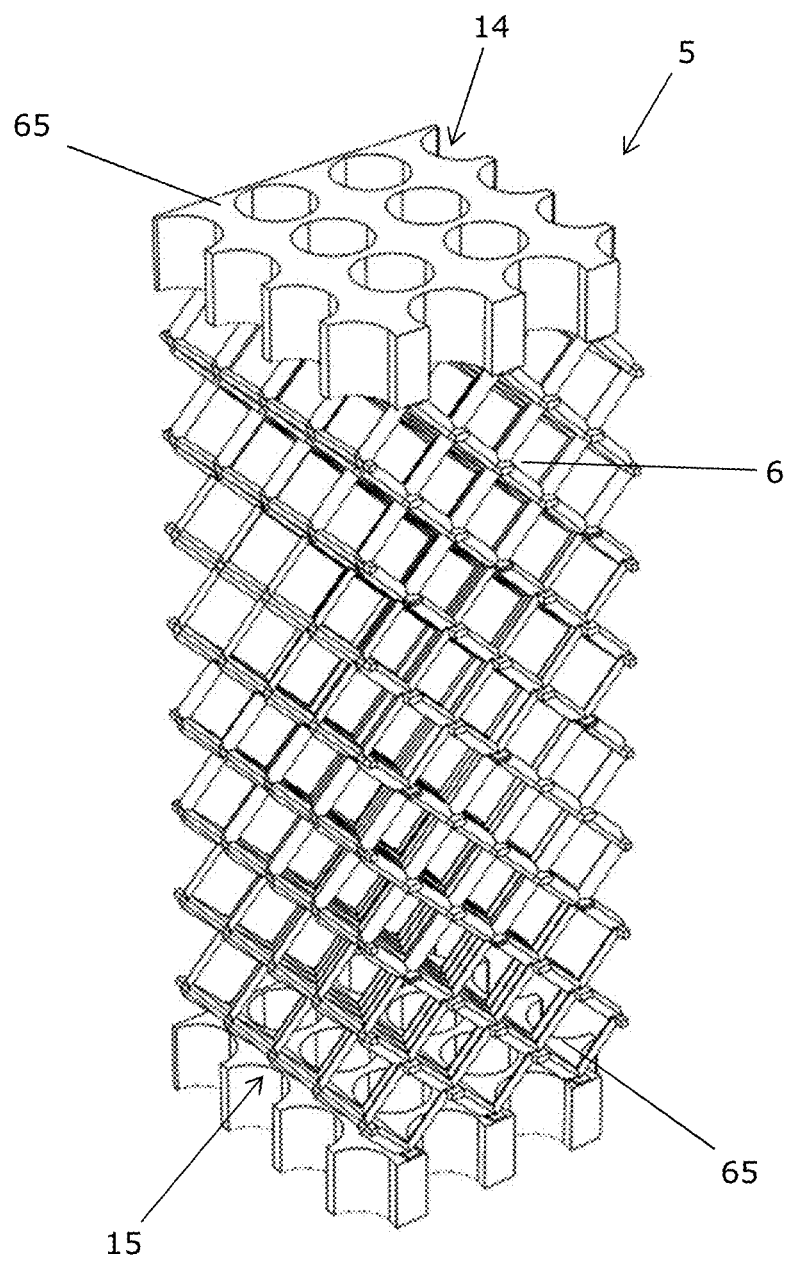
FIG. 13 illustrates an embodiment of a macroscopic structure.

FIG. 13 illustrates an embodiment of a macroscopic structure 5 in which the network structure 6 is formed as a mesh. The mesh 6 forms a plurality of flow channels from the first end 14 to the second end 15. The mesh 6 is attached to a manifold 65 at the first end 14 and at the second end 15. In this embodiment, the macroscopic structure 5 does not comprise a circumferential wall.

The resistance of the illustrated macroscopic structure 13 is 1087% compared to a macroscopic structure with parallel flow channels without cut-outs 60. Calculations have shown that 36% of the total volume of the macroscopic structure exceeds 5% of the average current density, while 55% is below. At the point with peak current, the current density exceeds the total average by 791%.

Figure 14A:
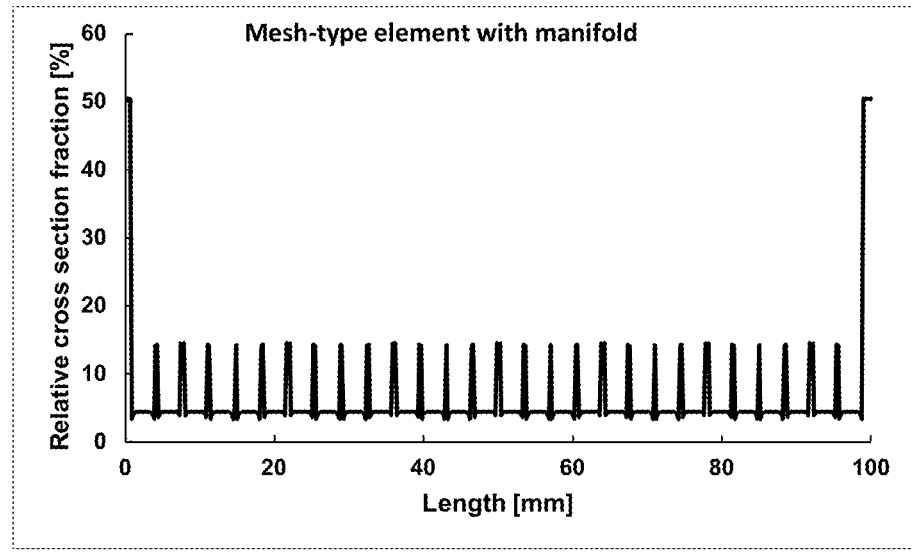
FIG. 14a illustrates the relative metallic cross-section of the embodiment illustrated in FIG. 13.

FIG. 14a illustrates the relative metallic cross-section of the embodiment of a macroscopic structure 5 illustrated in FIG. 13. As illustrated, the fraction is in the range of 4-75% for this embodiment.

Figure 14B:
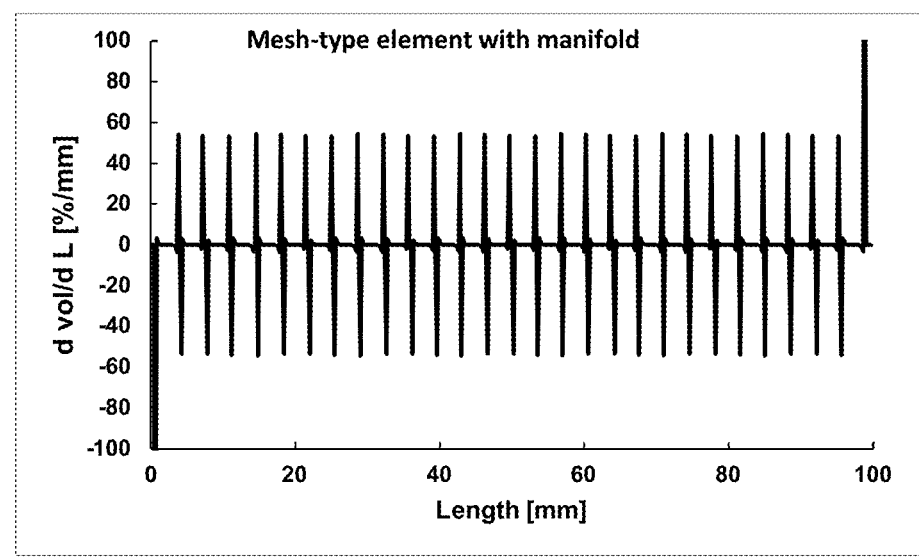
FIG. 14b illustrates the relative change in cross section area per unit length of the embodiment illustrated in FIG. 13.

FIG. 14b illustrates relative change in cross section area per unit length of the embodiment of the macroscopic structure 5 illustrated in FIG. 13. As illustrated the cross section can change up to 50% within 1 mm within the length of mesh 6. The change is more than 100%/mm from the interface between the mesh 6 and manifold 65 at the first end 14 and the interface between the mesh 6 and the manifold 65 at the second end 15.

Figure 14C:
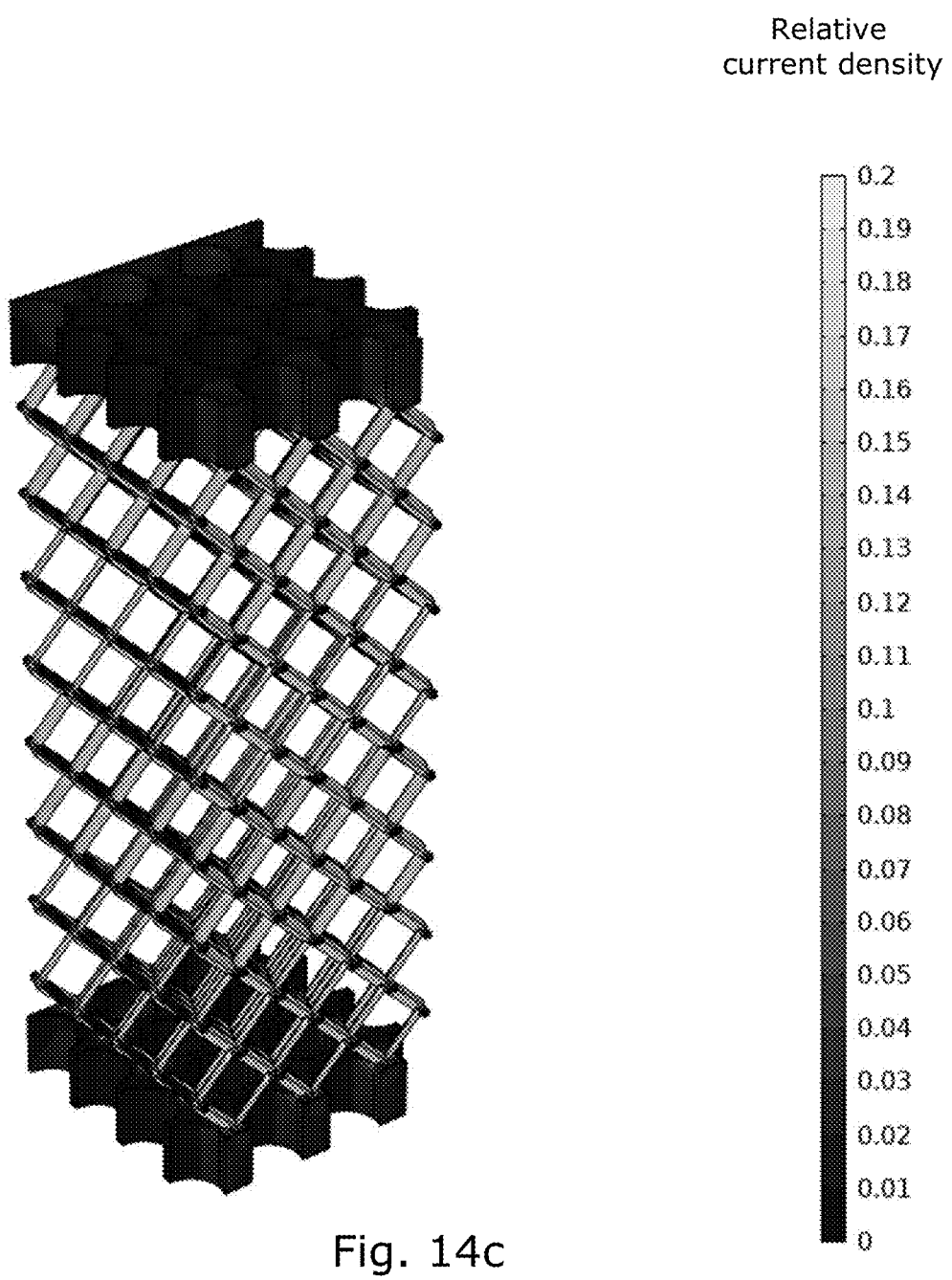
FIG. 14c illustrates the relative current density of the embodiment illustrated in FIG. 13.

FIG. 14c illustrates the current density of the macroscopic structure 5, as simulated by the Comsol software. This shows how the mesh-formed network structure 6 forces the current density to increase in the remaining part of the network structure 6. The scale of the figure is a relative scale from 1 to 0, using the peak current as normalization.

Figure 15:
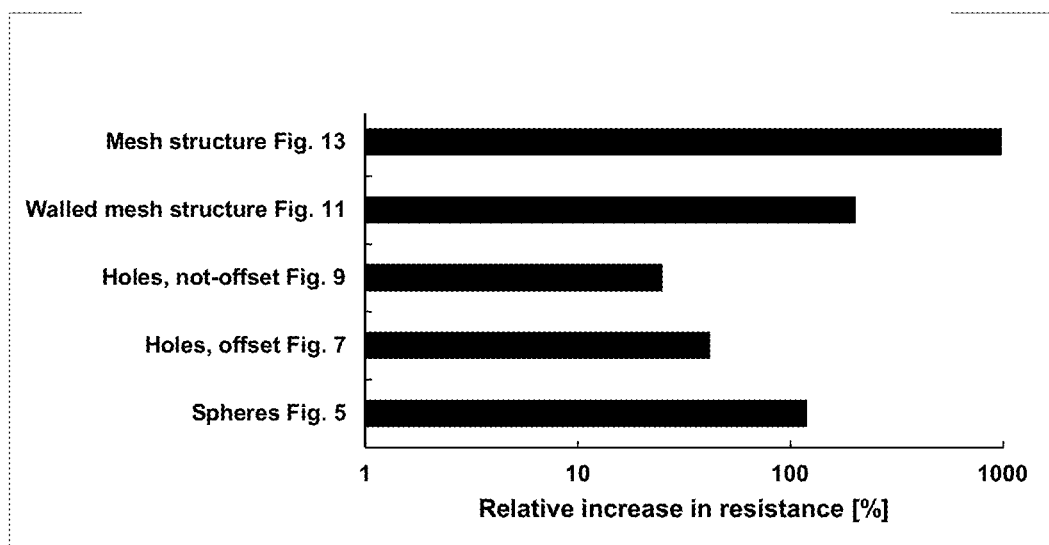
FIG. 15 is a graph illustrating the increase in resistance for the embodiments illustrated in FIGS. 5, 7, 9, 11, and 13.

FIG. 15 shows the relative resistance increase of the presented embodiments in FIGS. 5, 7, 9, 11, and 13 compared to a macroscopic structure with parallel flow channels without a network structure with variations in fractions. Evidently, increased resistances from +25% to +1000% are achieved using the methods of the invention. The resistances are simulated using Comsol. During the simulations, a resistivity of 134 μΩ*cm is used (corresponding to the use of Kanthal).

Figure 16A:
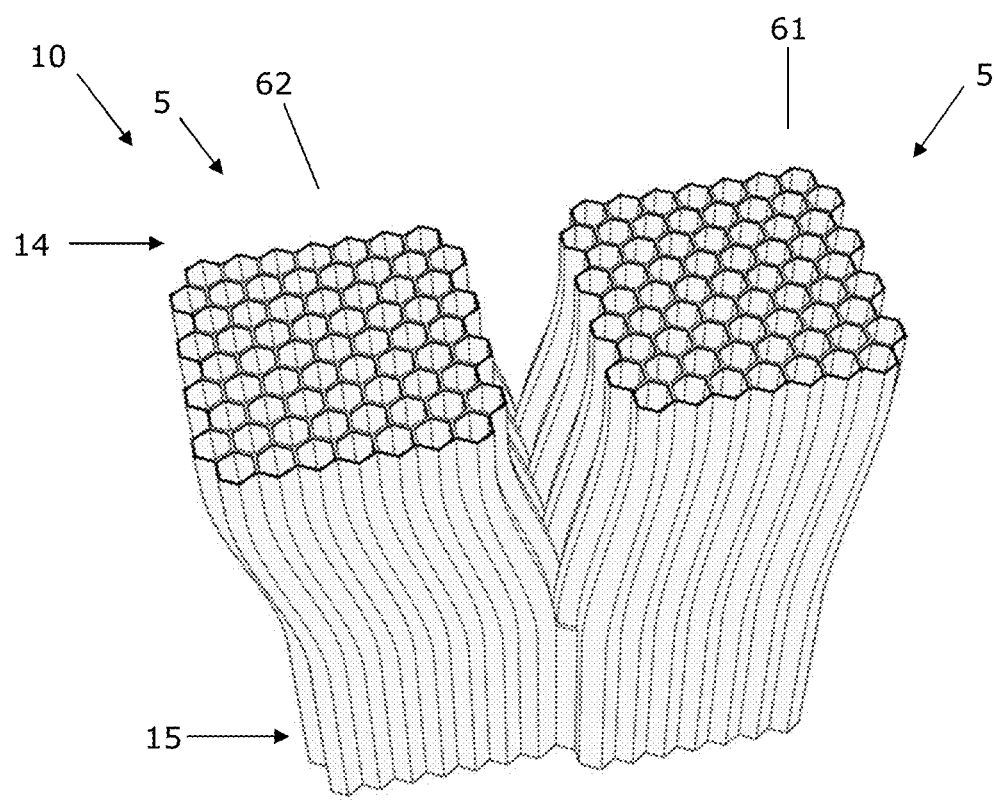
FIGS. 16a and 16b illustrate different views of an embodiment of a structured catalyst.
Figure 16B:
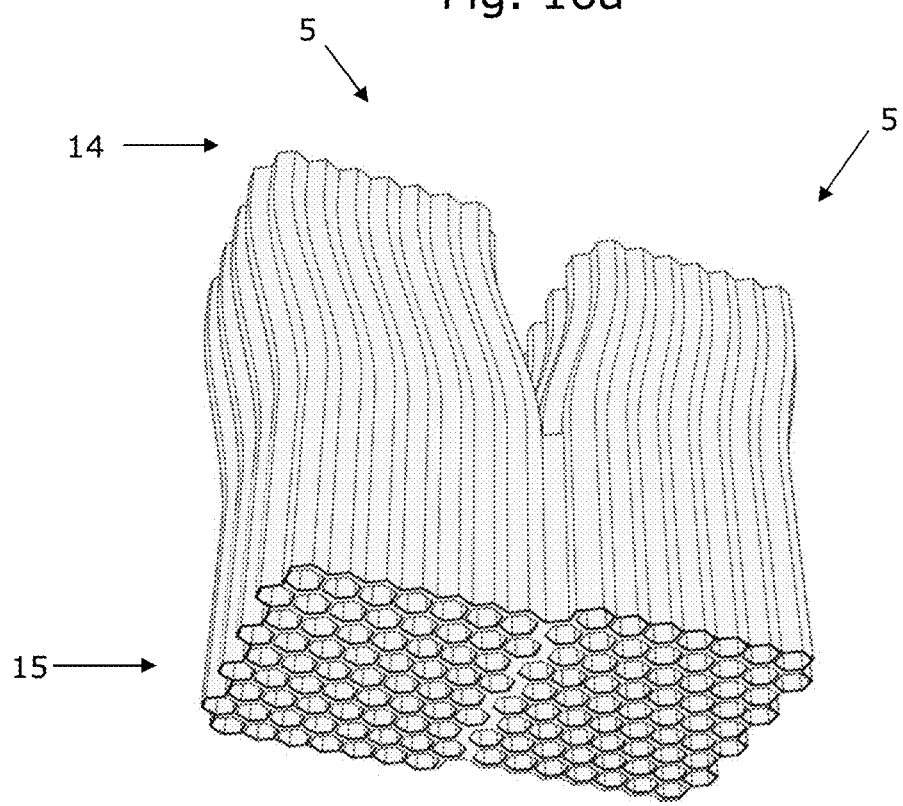

FIGS. 16a and 16b illustrate different views of an embodiment of a structured catalyst 10 comprising two macroscopic structures 5, each comprising network structure 6 which forms a plurality of internal walls 61.

The internal walls 61 form a plurality of flow channels 62 from the first end 14 to the second end 15. FIG. 16a illustrates the channels from above (from the first end 14), whereas FIG. 16b illustrated the channels from below (from the second end 15).

In the illustrated embodiment, the macroscopic structure 5 are connected to each other at the second end 15 without the use of a separate bridge to connect the two macroscopic structures 5, as the macroscopic structures 5 are integrated into each other at the second end 15. As illustrated in FIG. 16b, the internal walls 62 are thicker at the second end than at the first end. These thicker walls are actively cooled by gas flow on both sides hereof in the channels 62.

Figure 17:
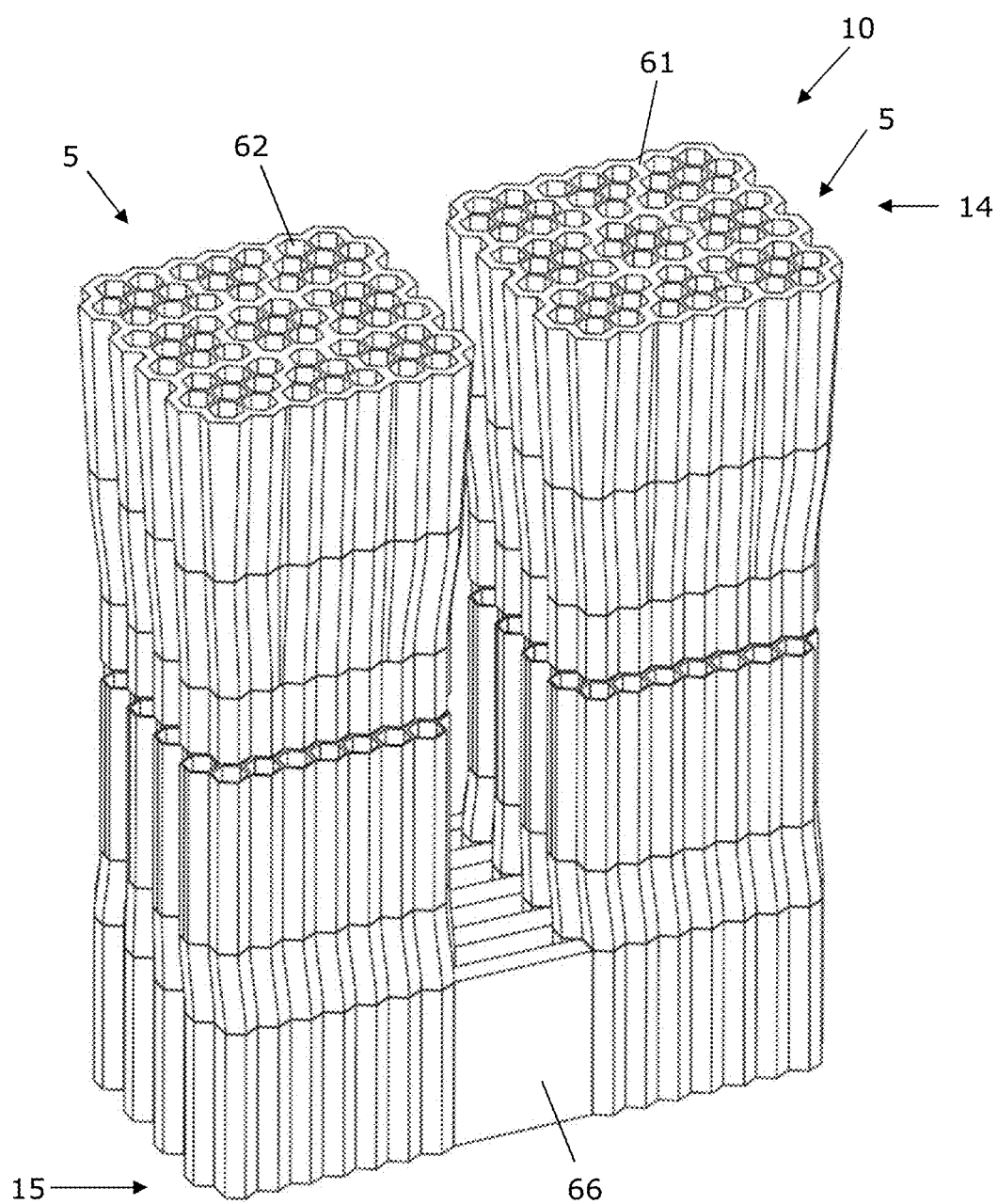
FIG. 17 illustrates an embodiment of a structured catalyst.

FIG. 17 illustrates an embodiment of a structured catalyst 10 comprising two macroscopic structures 5, each comprising network structure 6 which forms a plurality of internal walls 61. The internal walls 61 form a plurality of flow channels 62 from the first end 14 to the second end 15.

In the illustrated embodiment, the macroscopic structure 5 are connected to each other at the second end 15 by use of a plurality of separate bridges 66 connecting a left side of one macroscopic structure 5 with the right side of the adjacent macroscopic structures 5.

In the illustrated embodiment, the flow channels 62 are substantially parallel in some sections along the longitudinal direction, whereas the direction and/or the cross-sectional area of at least some of the flow channels 62 change along the longitudinal direction in other sections. As seen at the top of the macroscopic structures 5, the wall thickness of some of the flow channels are thicker than the wall thickness of other flow channels, thereby providing macroscopic structures 5 having internal walls with an uneven wall thickness. By amending the direction and/or the cross-sectional area of at least some of the internal wall 61, the cross-sectional area of the macroscopic structure can also be varied along the longitudinal direction. The height of the different sections along the longitudinal direction may likewise vary.

Figures 18A, 18B, 18C:
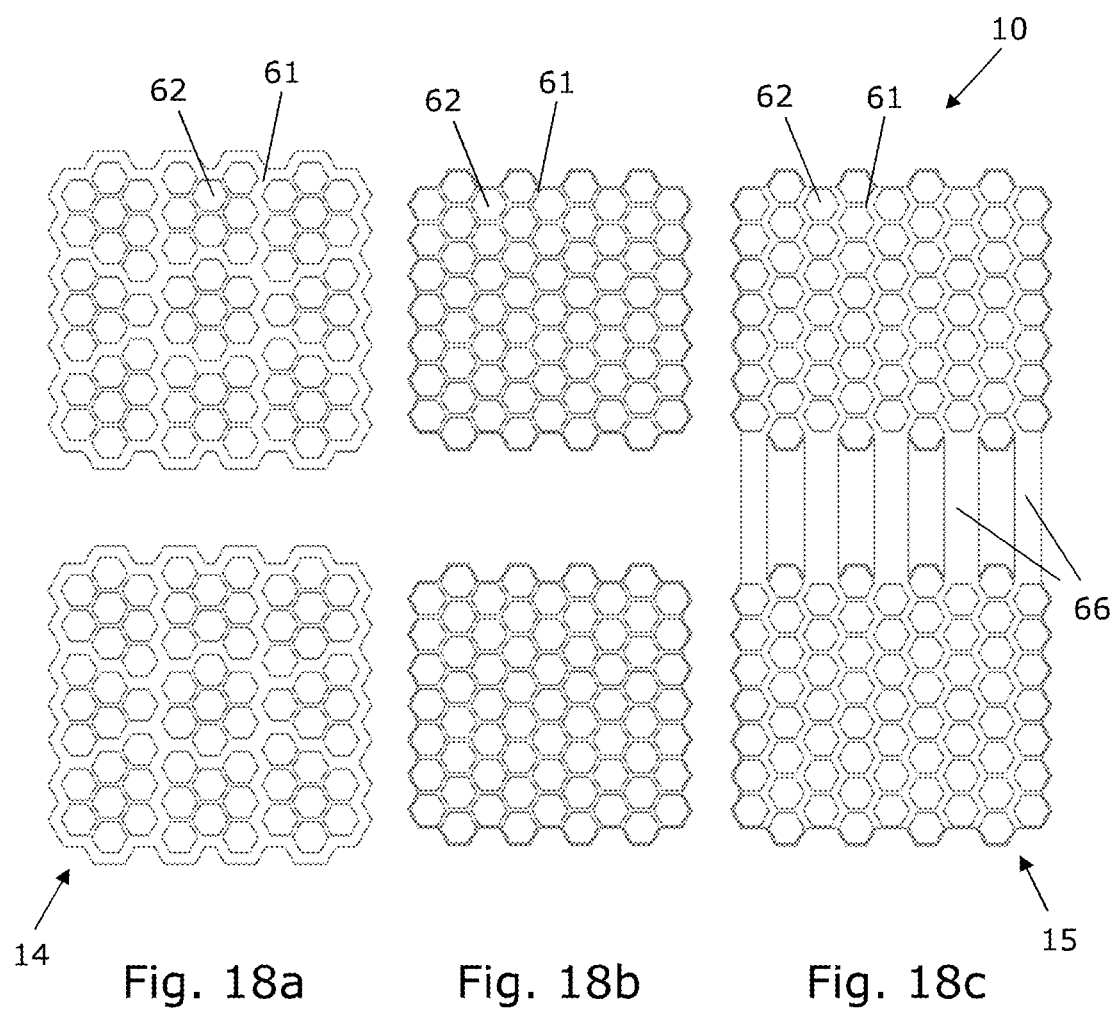
FIGS. 18a-18c illustrate different cross-section through the embodiment illustrated in FIG. 17.

FIGS. 18a-18c illustrate different cross-section through the embodiment illustrated in FIG. 17. FIG. 18a illustrates a cross-section through the structured catalyst at the upper section in the area of the first end 14. The thicker walls 61 may ensure a better current distribution through this section of the macroscopic structure 5. FIG. 18b illustrates a cross-section through the structured catalyst at the middle section. The even wall thickness of the walls 61 in this section may ensure uniform heating in this section of the macroscopic structure 5. FIG. 18c illustrates a cross-section through the structured catalyst at the lower section in the area of the second end 15. The thicker walls 61 may ensure a better current distribution through this section of the macroscopic structure 5.

Figure 18D:
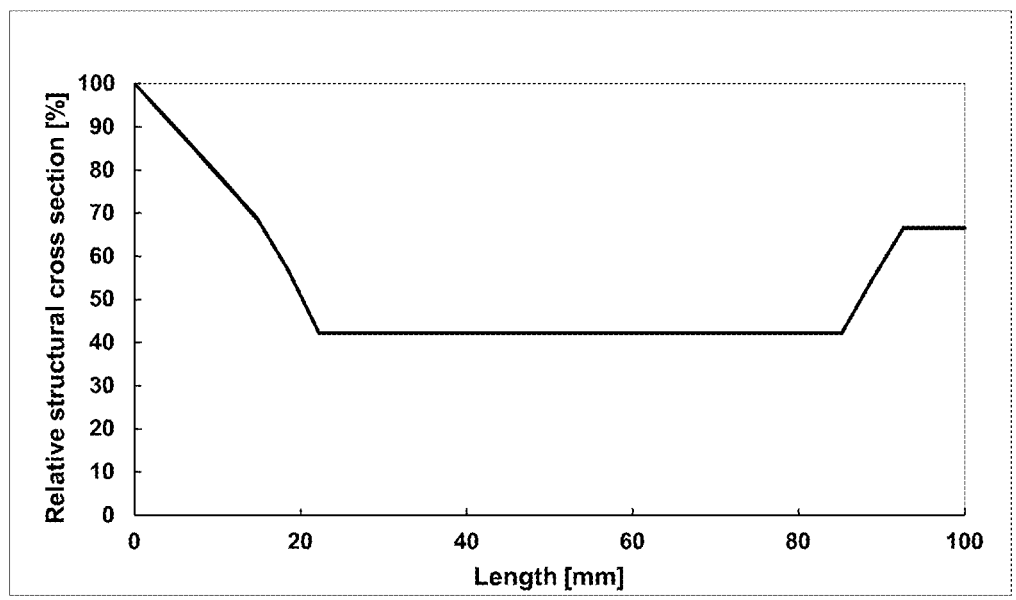
FIG. 18d illustrates the relative metallic cross-section of the embodiment illustrated in FIG. 17.

FIG. 18d illustrates the relative metallic cross-section of the embodiment illustrated in FIG. 17. As illustrated, the fraction is in the range of 42-100% for this embodiment.

In each of FIGS. 19a-22b, the structured catalyst 10 comprises a first macroscopic structure 5A and a second macroscopic structure 5B, each extending in a longitudinal direction from a first end 14 to a second end 15, where the first end 14 forms an inlet to the macroscopic structure 10 for a feed gas, and where the second end 15 forms an outlet for product gas.

The first and second macroscopic structure 5A, 5B comprise a three-dimensional network structure (see FIG. 19a), where the network structure forms flow paths allowing the feed gas to flow from the first end 14 to the second end 15. As illustrated in the left part of FIG. 19a, at least a part of the network structure forms a plurality of parallel flow channels 62. It should, however, be understood that at least some of the channels may be non-parallel.

Figure 19A:
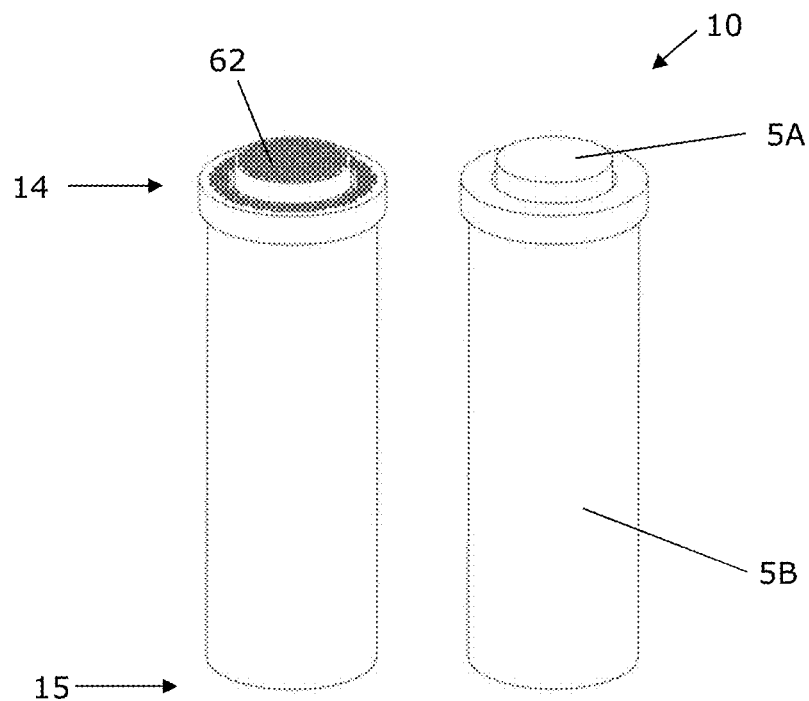
FIG. 19a illustrates an embodiment of a structured catalyst.

The flow channels 62 are only shown in the left side of FIG. 19a. In the remaining parts of FIGS. 19a-30b, the openings, such as flow channels, cut-outs, slit, etc, of the network structure are omitted.

The second macroscopic structure 5B is arranged circumferentially around the first macroscopic structure 5A, and the first and second macroscopic structures 5A, 5B are electrically connected at the second end 15. The structured catalyst 10 is configured to direct an electrical current to run through the first macroscopic structure 5A from the first end 14 to the second end 15, then through the second macroscopic structure 5B from the second end 15 to the first end 14 by electrically connecting the first and second macroscopic structures 5A, 5B at the second end 15.

In the illustrated embodiments, the second macroscopic structure 5B is an elongated structure extending in the longitudinal direction from the first end 14 to the second end 15. The second macroscopic structure 5B is hollow and thereby fully surrounds the first macroscopic structure 5A, whereby an inner surface of the second macroscopic structure 5B faces an outer surface of the first macroscopic structure 5A.

It should be understood, that the second macroscopic structure in an alternative embodiment (not illustrated) may be arranged partly circumferentially around the first macroscopic structure, whereby a part of an inner surface of the second faces a part of an outer surface of the first macroscopic structure.

The first and second macroscopic structures 5A, 5B at least partly support a ceramic coating which supports a catalytically active material.

In FIG. 19a the structured catalyst 10 comprises a first macroscopic structure 5A and a second macroscopic structure 5B, each extending in a longitudinal direction from a first end 14 to a second end 15. The first and second macroscopic structures 5A, 5B each forms a circular outer shape in a cross-section perpendicular to the longitudinal direction.

Figure 19B:
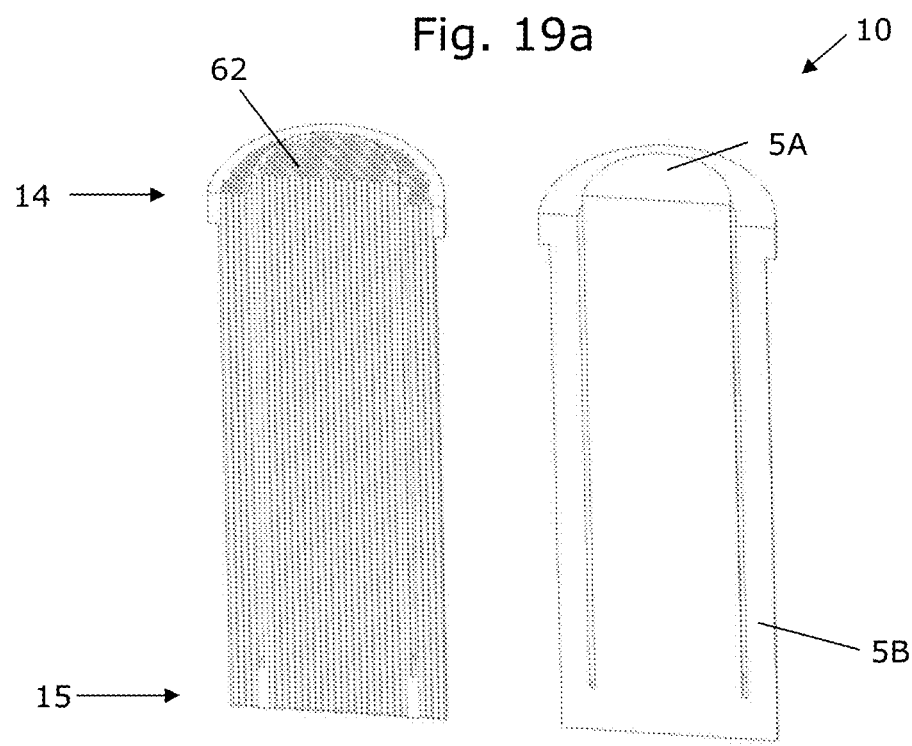

FIG. 19b illustrates a cross-section through the embodiment of a structured catalyst 10 illustrated in FIG. 19a. The flow channels 62 are clearly shown in the cross-section to the left. Furthermore, the cross-sections clearly illustrate that the first and second macroscopic structures 5A, 5B are connected at the second end 15.

Figure 20:
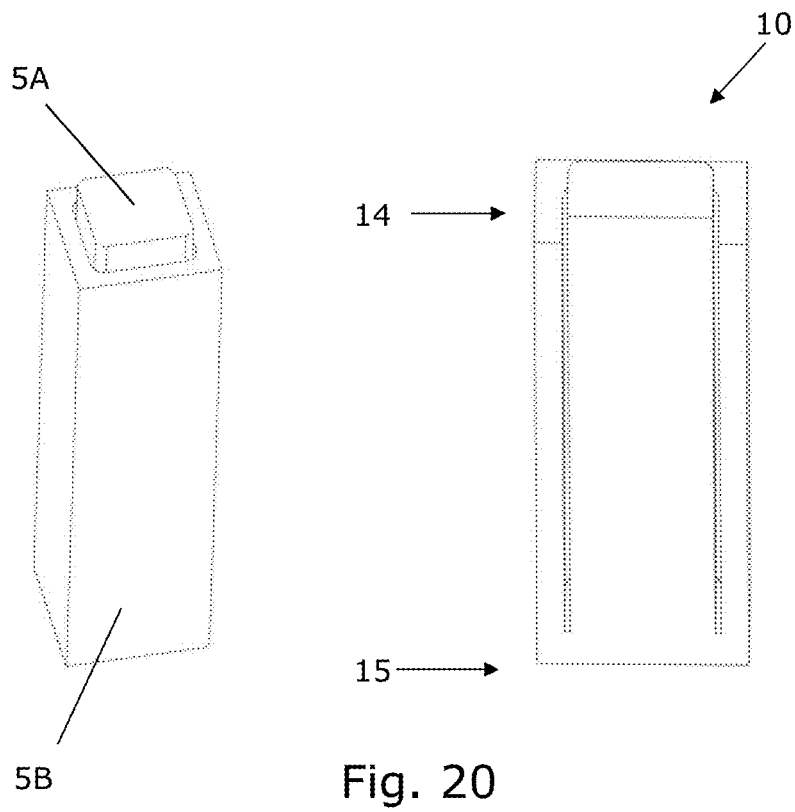
FIG. 20 illustrates an embodiment of a structured catalyst.

In FIG. 20 the structured catalyst 10 comprises a first macroscopic structure 5A and a second macroscopic structure 5B, each extending in a longitudinal direction from a first end 14 to a second end 15. The first and second macroscopic structures 5A, 5B each forms a square shaped outer shape in a cross-section perpendicular to the longitudinal direction. In the cross-section to the right, it is clearly illustrated that the first and second macroscopic structures 5A, 5B are connected at the second end 15.

Figure 21:
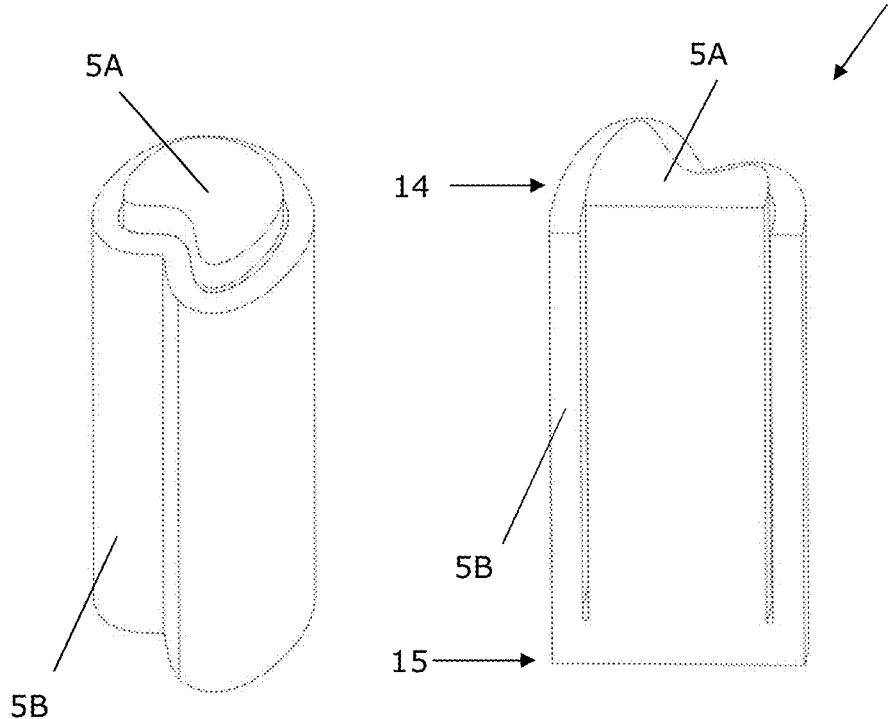
FIG. 21 illustrates an embodiment of a structured catalyst.

In FIG. 21 the structured catalyst 10 comprises a first macroscopic structure 5A and a second macroscopic structure 5B, each extending in a longitudinal direction from a first end 14 to a second end 15. The first and second macroscopic structures 5A, 5B each forms an organic outer shape in a cross-section perpendicular to the longitudinal direction. In the cross-section to the right, it is clearly illustrated that the first and second macroscopic structures 5A, 5B are connected at the second end 15.

Figure 22A:
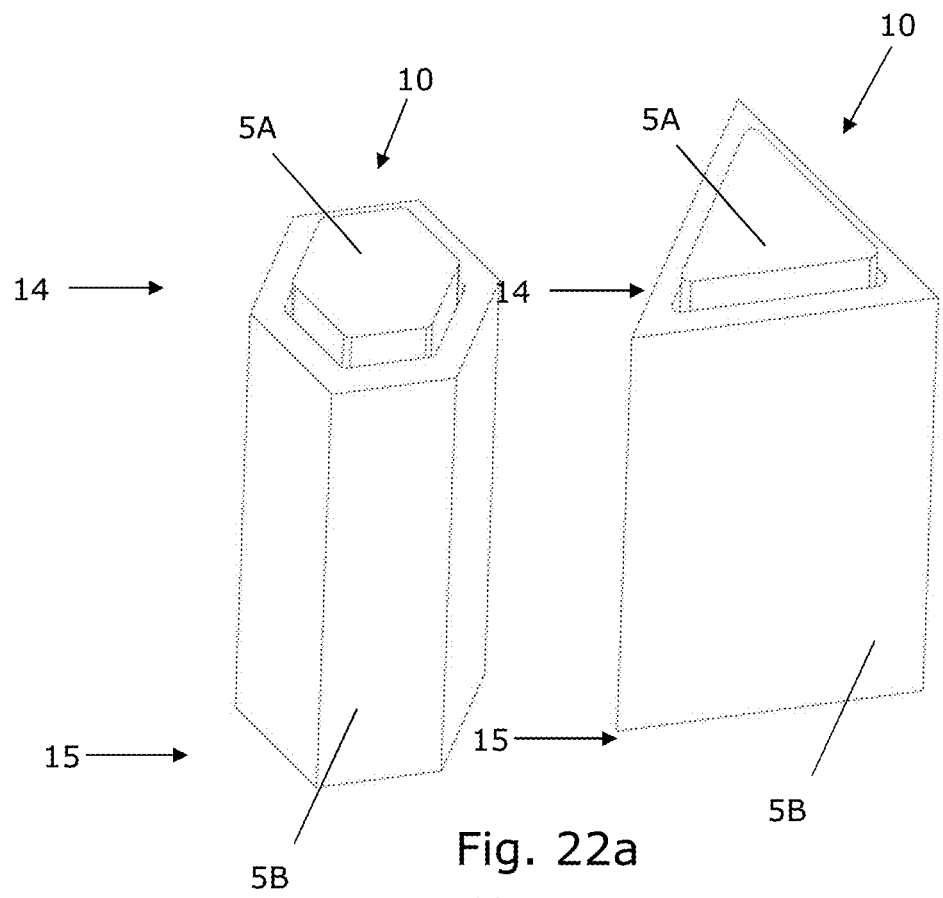
FIG. 22a illustrates two embodiments of a structured catalyst.

FIG. 22a illustrates two different embodiments of a structured catalyst 10, each comprising a first macroscopic structure 5A and a second macroscopic structure 5B which each extends in a longitudinal direction from a first end 14 to a second end 15. The first and second macroscopic structures 5A, 5B to the left each forms a hexagonal shaped outer shape in a cross-section perpendicular to the longitudinal direction, whereas the first and second macroscopic structures 5A, 5B to the right each forms a triangular outer shape in a cross-section perpendicular to the longitudinal direction.

Figure 22B:
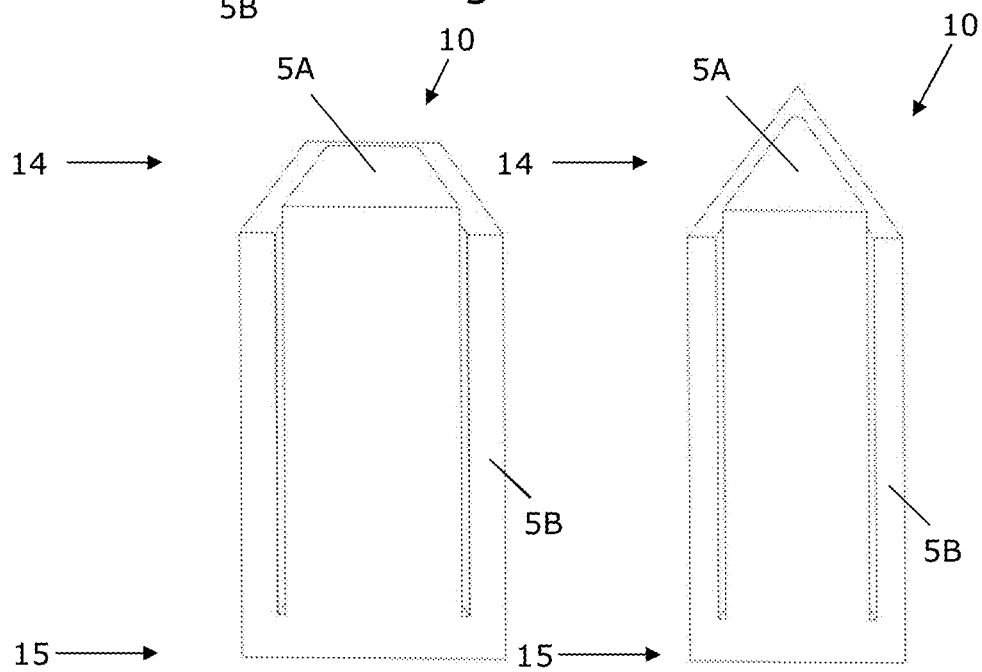

FIG. 22b illustrates cross-sections through the embodiments of a structured catalyst 10 illustrated in FIG. 22a. The cross-sections clearly illustrate that the first and second macroscopic structures 5A, 5B are connected at the second end 15.

Figures 23A, 23B:
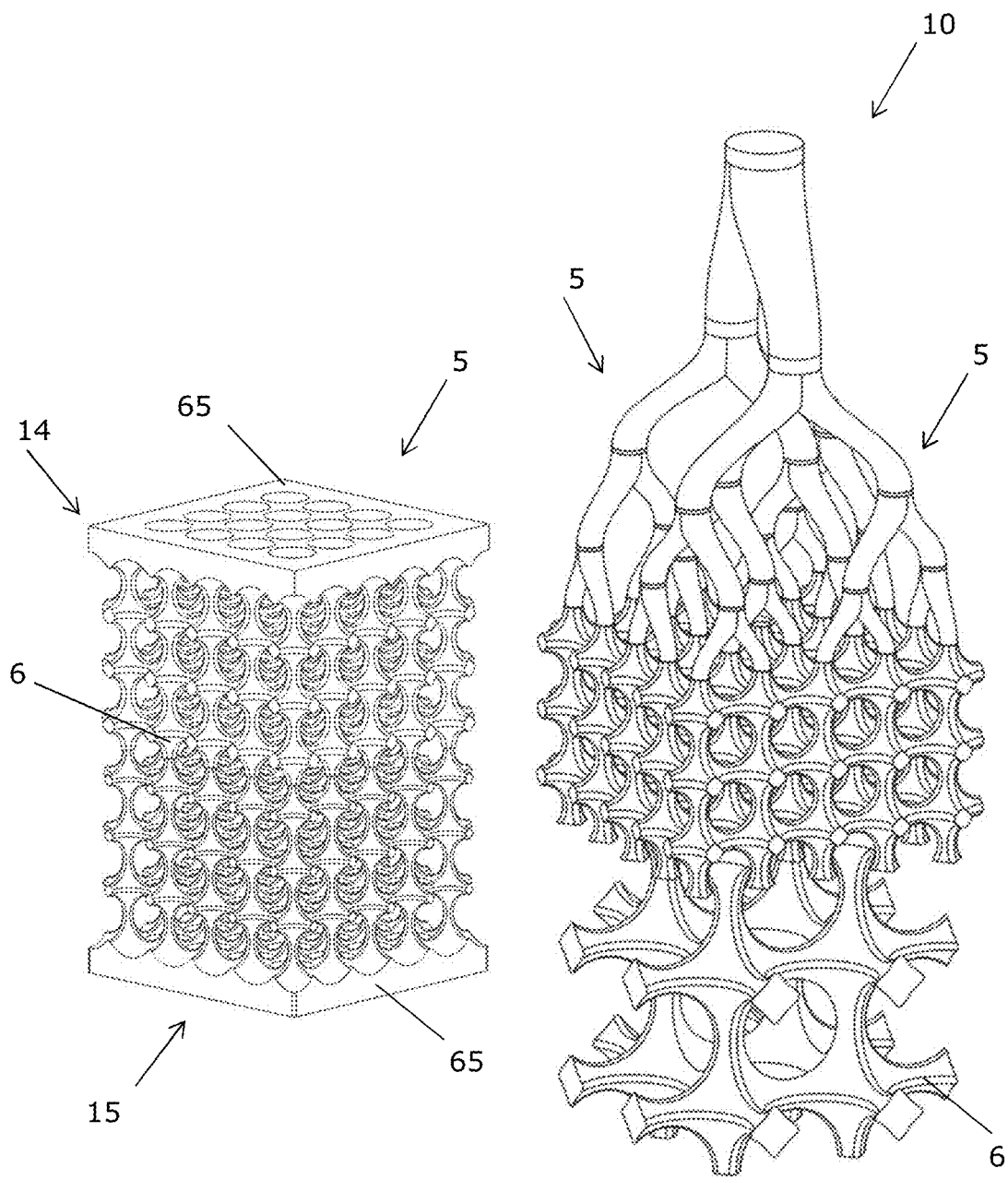
FIG. 23a illustrates an embodiment of a macroscopic structure.
FIG. 23b illustrates an embodiment of a structured catalyst.

FIG. 23a illustrates an embodiment of a macroscopic structure 5 in which the network structure 6 is formed as a mesh. The mesh 6 forms a plurality of flow channels from the first end 14 to the second end 15. The mesh 6 is attached to a manifold 65 at the first end 14 and at the second end 15. In this embodiment, the macroscopic structure 5 does not comprise a circumferential wall. The illustrated embodiment is similar to the embodiment illustrated in FIG. 13, with a denser mesh 6.

FIG. 23b illustrates an embodiment of structured catalyst 10 comprising two macroscopic structures 5 being connected at the first end 14 to form a U-shaped structured catalyst 10. The network structure 6 of each of the macroscopic structures 5 are formed as a mesh. The mesh 6 forms a plurality of flow channels from the first end 14 to the second end 15. The radial and axial dimension of the network structure 6 change along the longitudinal direction of the structured catalyst 10. In the middle section of each of the macroscopic structures 5, the mesh 6 is similar to the mesh of the embodiment illustrated in FIG. 23a. By changing the network structure 6 in the axial and radial directions, the current flow in the network structures 6 can be effectively controlled.

Figure 24:
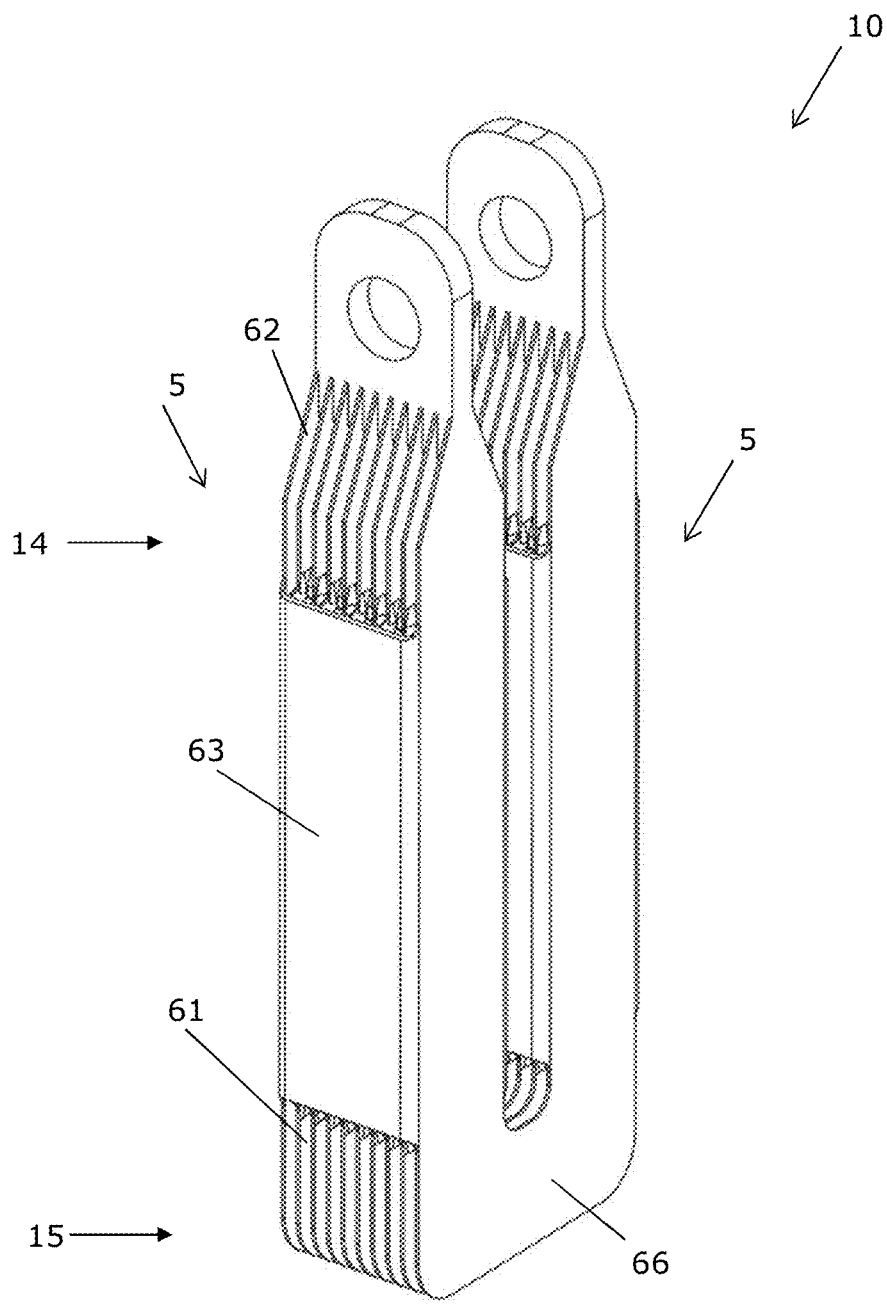
FIG. 24 illustrates an embodiment of a structured catalyst.

FIG. 24 illustrates an embodiment of a structured catalyst 10 comprising two macroscopic structures 5 connected at the second end 15 by an integrated bridge part 66. The macroscopic structures 5 each comprise a network structure 6 which forms a plurality of internal walls 61. The internal walls 61 form a plurality of substantially parallel flow channels 62 from the first end 14 to the second end 15. The flow channels 62 are arranged in the internal space formed by a circumferential wall 63.

The circumferential wall 63 does not extend to the bottom of the macroscopic structures 5 to thereby minimize the current density at the second end (the bottom end) and to facilitate cooling hereof. At the first end (the upper end) the structured catalyst 10 comprises two conductors 40 enabling connection to a power supply.

Figure 25:
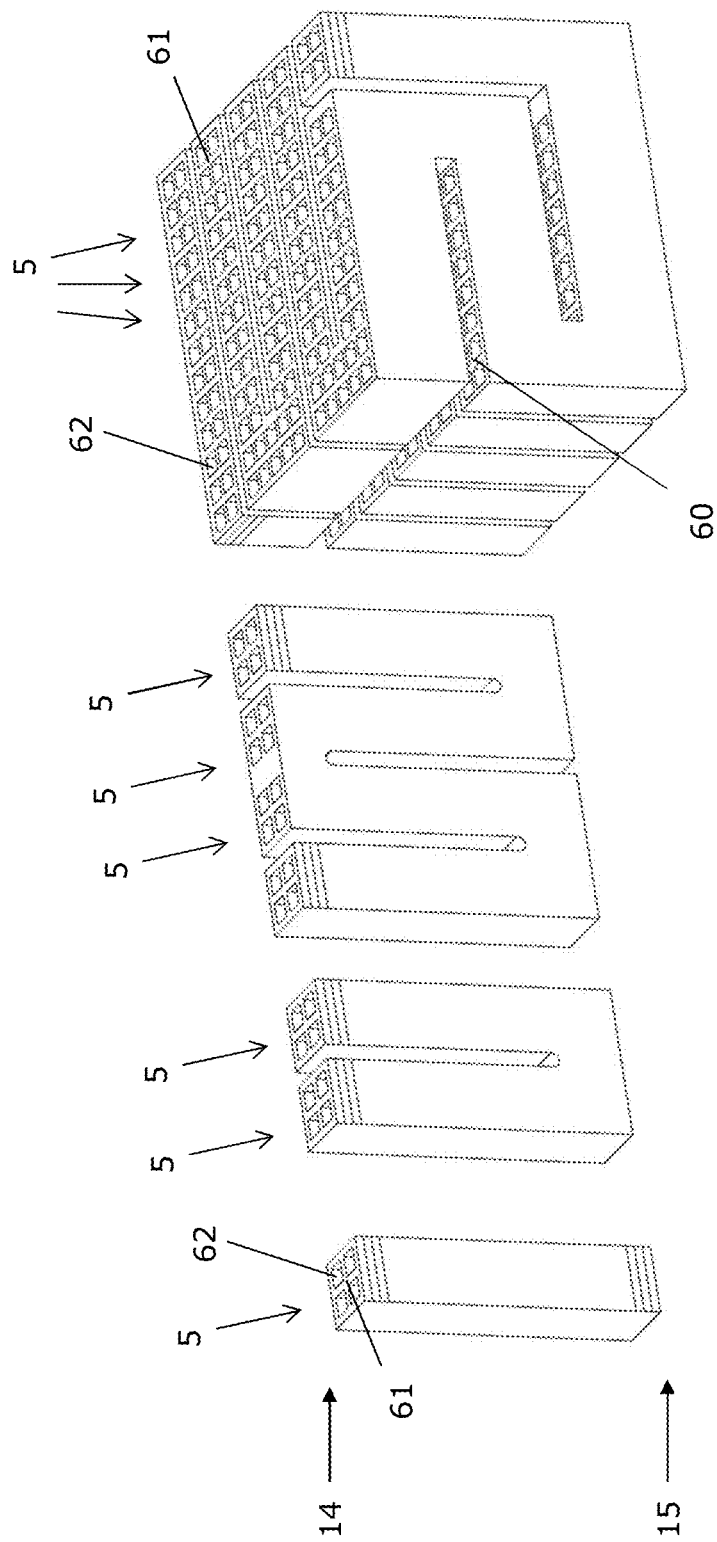
FIG. 25 illustrates an embodiment of a macroscopic structure, and a plurality of arrays of macroscopic structures.

FIG. 25 illustrates an embodiment of a macroscopic structure 5, and a plurality of arrays of macroscopic structures 5. Each of the macroscopic structures 5 extends from a first end 14 to a second end 15. The macroscopic structures 5 each comprises a network structure 6 which forms a plurality of internal walls 61. The internal walls 61 form a plurality of substantially parallel flow channels 62 from the first end 14 to the second end 15. The flow channels 62 are arranged in the internal space formed by a circumferential wall 63.

In the first embodiment from left, a single macroscopic structure 5 is illustrated.

In the second embodiment, two macroscopic structures 5 are connected to each other at the second end 15, whereby a current may flow from the first end 14 to the second end 15 of one of the macroscopic structures 5 and subsequently from the second end 15 to the first end 15 of other macroscopic structure 5.

In the third embodiment, the array comprises four macroscopic structures 5 similar to the other macroscopic structures 5 illustrated in the first and second embodiment in FIG. 25. The second macroscopic structure 5 is connected to the third macroscopic structure 5 at the first end 14, and the third macroscopic structure 5 is connected to the fourth macroscopic structure 5 at the second end 15.

In the fourth embodiment, the array comprises plurality of macroscopic structures 5 arranged in a block structure. Some of the macroscopic structures 5 are connected to a neighbouring macroscopic structure 5 at the first end 14, whereas some macroscopic structures 5 are connected to a neighbouring macroscopic structure 5 at the second end 15. The fourth embodiment further comprises a plurality of cut-outs 60 in the form of slits.

In all four embodiments, the gas flow is in the longitudinal direction from the first end 14 to the second end 15.

Figure 26:
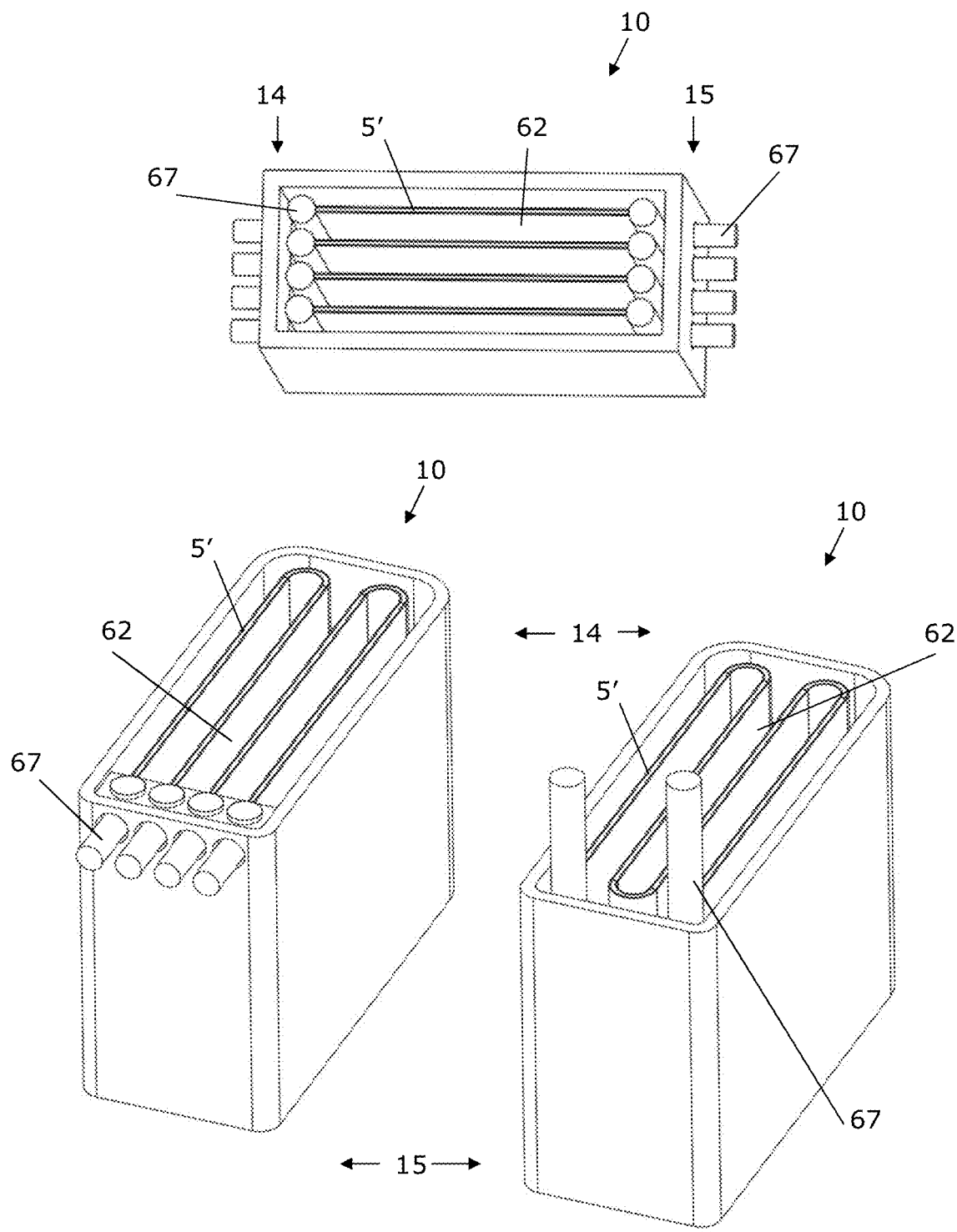
FIG. 26 illustrates different embodiments of a structured catalyst.

FIG. 26 illustrates different embodiments of a structured catalyst 10. The structured catalyst 10 comprises a macroscopic structure 5 in the form of a plurality of plate-shaped elements 5', thereby forming a network structure 6 which forms a plurality of internal walls 61. The internal walls 61 form a plurality of flow channels 62 from the first end 14 to the second end 15.

In the upper embodiment, the plate-shaped elements 5' are each connected to rod-shaped electrically conducting elements 67 which elements 67 are connected to electrically conducting elements 67 extending out of the internal space allowing for connection to a neighbouring structured catalyst to form an array.

In the two lower embodiments, the macroscopic structure 5 is in the form of a plate-shaped element 5' being bended to thereby form a plurality of internal walls 61.

In the lower left embodiment, the plate-shaped element 5' is connected to rod-shaped electrically conducting elements 67 extending out of the internal space through the bottom allowing for connection to a structured catalyst to form an array. In the lower right embodiment, the plate-shaped element 5' is connected to rod-shaped electrically conducting elements 67 extending out of the internal space in a direction transverse to the longitudinal direction allowing for connection to a neighbouring structured catalyst to form an array.

Figure 28:
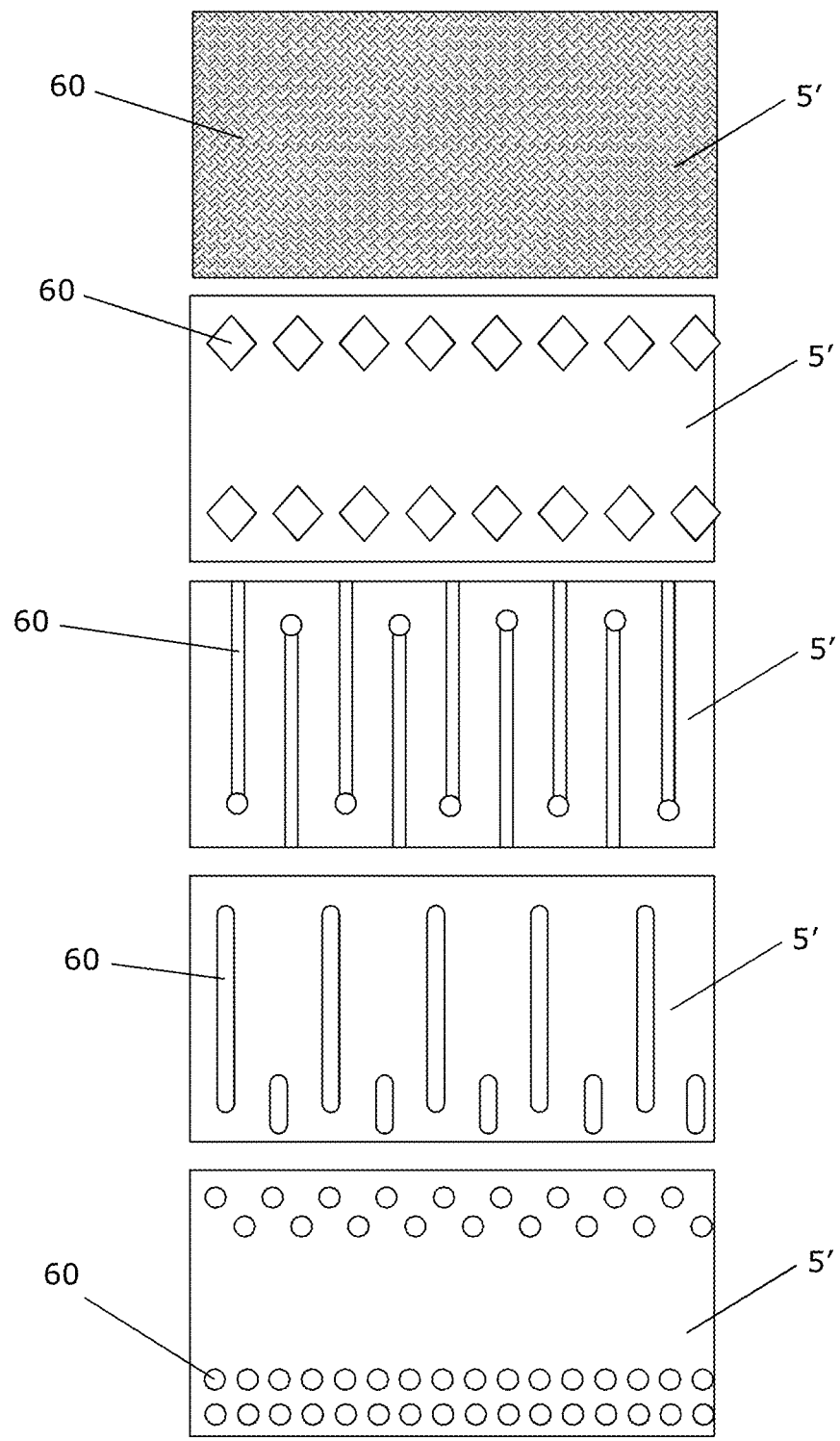
FIG. 28 illustrates different parts for embodiments of a macroscopic structure.

One or more cut-outs, such as slits and/or through-holes in different forms may be formed in the plate-shaped elements (see FIG. 28).

Figure 27:
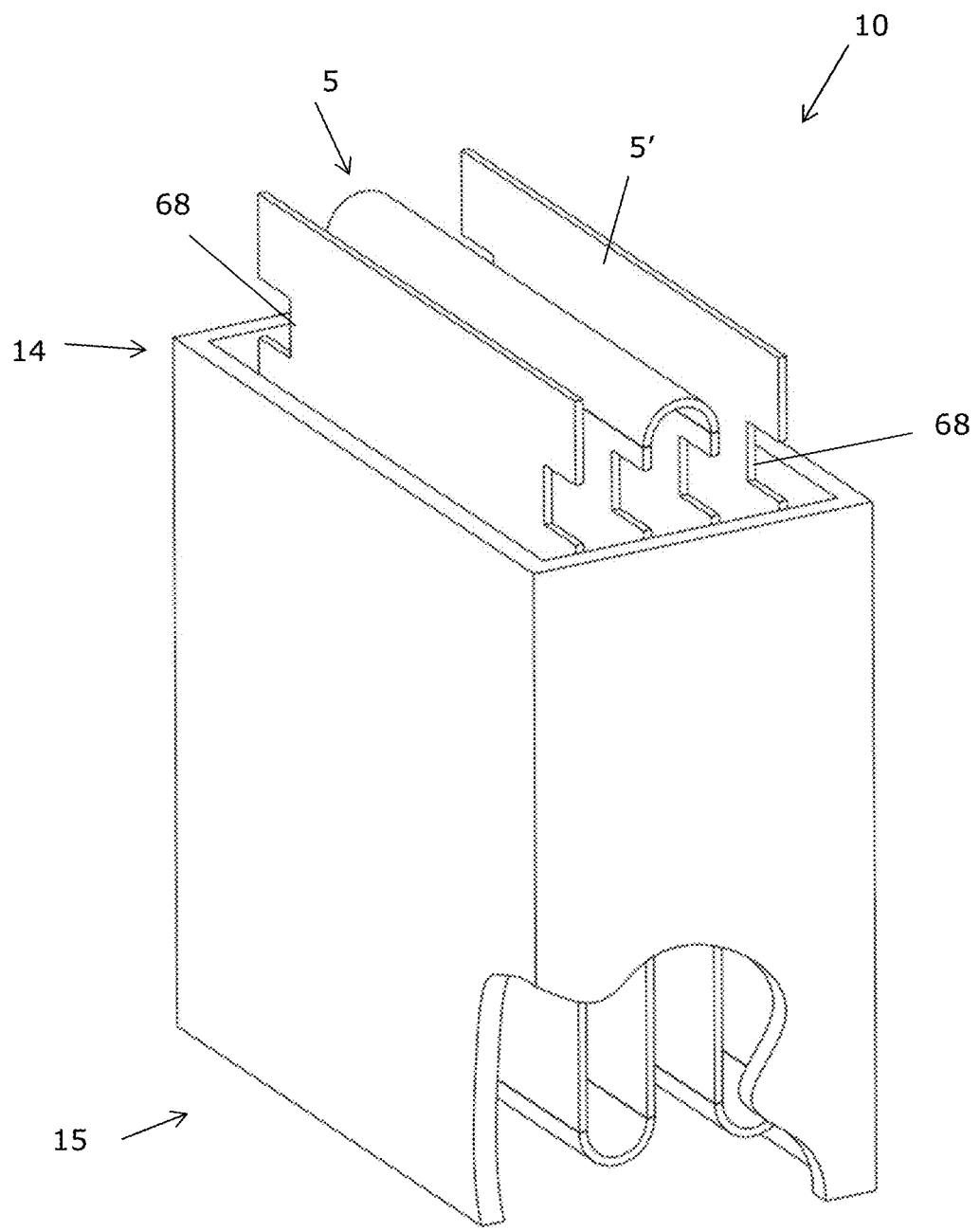
FIG. 27 illustrates an embodiment of a structured catalyst.

FIG. 27 illustrates an embodiment of a structured catalyst 10. The structured catalyst 10 is similar to the embodiments illustrated in FIG. 26 comprising a macroscopic structure 5 in the form of a plurality of plate-shaped element 5'. One or more cut-outs may be formed in the plate-shaped elements (see FIG. 28).

The bended plate-shaped element 5' comprises an indentation 68 at opposite edges to facilitate mounting of the structured catalyst 10 in a reactor (see e.g. FIG. 1*a*).

FIG. 28 illustrates different plate-shaped element 5' which may be used as the macroscopic structure 5 or parts of the macroscopic structure in structured catalysts according to the disclosure. The plate-shaped elements 5' may be arranged as plates extending substantially from the first end to the second end (see e.g. the upper embodiment illustrated in FIG. 26). Alternatively, the plate-shaped elements 5' may be bended, where the bended element may extend substantially from the first end to the second end (see e.g. the lower embodiments illustrated in FIG. 26 or the embodiment illustrated in FIG. 27).

As illustrated, the plate-shaped elements 5' may comprise one or more cut-outs 60, such as slits and/or through-holes in different forms. In the upper embodiments, the cut-outs are provided as small through-holes to form a fine mesh. In the second embodiment, the cut-outs formed as two rows of identical diamond-shaped through-holes. In the third embodiment, the cut-outs are formed as slits extending alternating from opposite edges of the plate-shaped element 5', where the slits terminate in a circular through-hole. In the fourth embodiment, the cut-outs are formed as two rows of elongated though-holes, where the length of the throughholes are different, as the first row comprises longer throughholes than the second row. In the fifth embodiment, the cut-outs are provided as circular through-holes of identical size. The cut-outs are provided in two substantially parallel rows, and in a zig-zag pattern.

It should be understood, that the size and shape of the cut-out may vary and that the illustrated embodiments are examples. The different cut-outs illustrated in the five different embodiments may be combined to form at plateshaped element 5' with cut-outs in an alternative form, e.g. the diamond-shaped cut-out may be combined with slits and/or circular cut-out.

Additionally, it should be understood, that upper embodiment of FIG. 26 may as an example comprises a plurality of plate-shaped element 5' being identical or a plurality of plate-shaped elements where at least two are different.

Figure 29A:
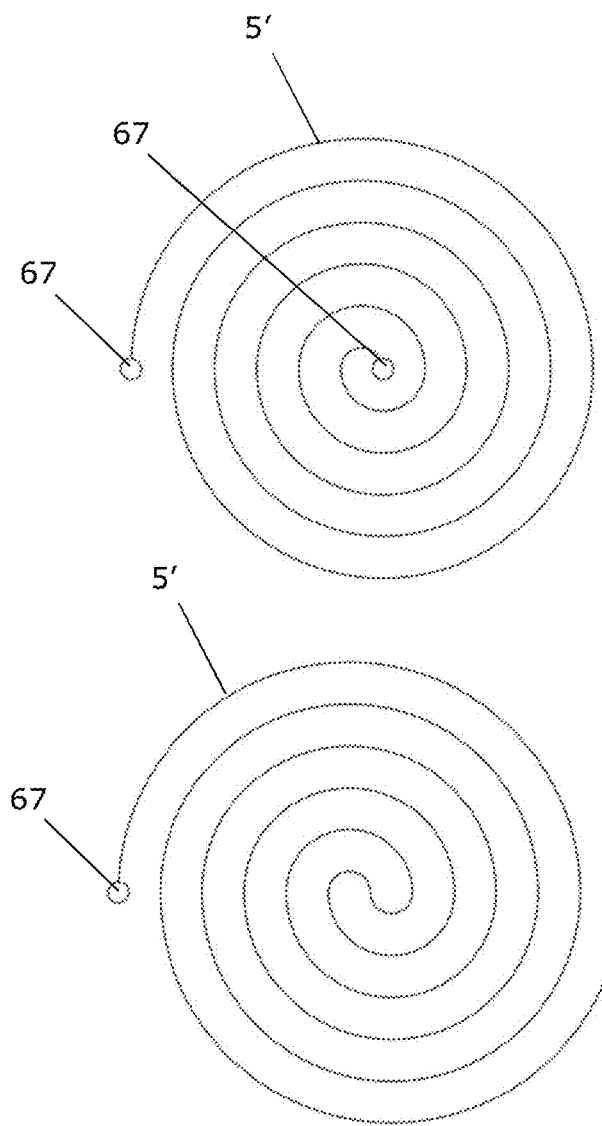
FIG. 29a illustrates different part for embodiments of a macroscopic structure.
Figure 29B:
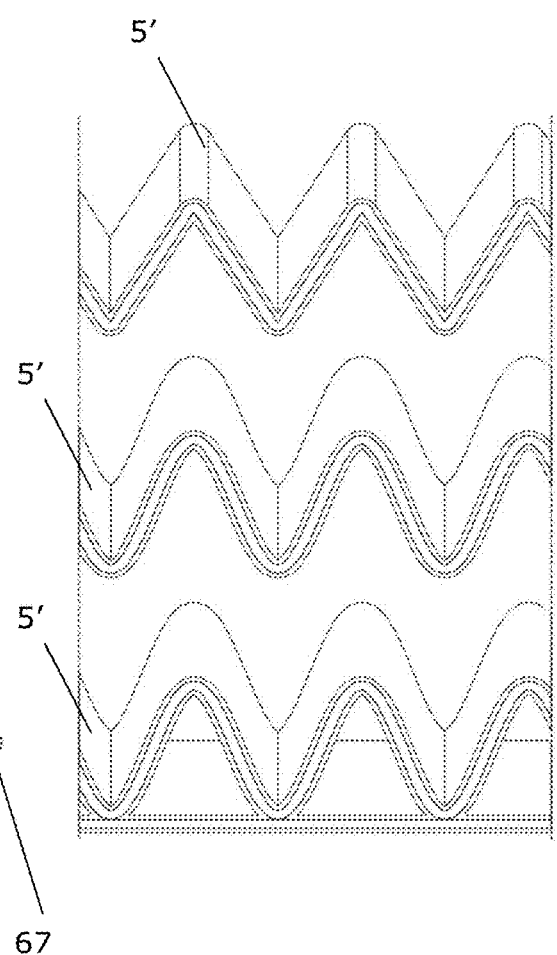
FIG. 29b illustrates different part for embodiments of a macroscopic structure.

FIGS. 29*a* and 29*b* illustrate different plate-shaped element 5' which may be used as the macroscopic structure 5 or parts of the macroscopic structure in structured catalysts according to the disclosure. The plate-shaped element 5' may comprise cut-outs, as e.g. illustrated in FIG. 28.

FIG. 29*a* illustrates a cross-section transverse to the longitudinal direction of plate-shaped elements 5' being coiled. The plate-shape elements 5' are connected to rodshaped electrically conducting elements 67 allowing for connection to a power supply.

FIG. 29*b* illustrated a cross-section along the longitudinal direction of plate-shaped elements 5' being corrugated. In the upper embodiment the corrugations are sharper angled than the embodiment in the middle. The lower embodiment is similar to the embodiment in the middle with the addition of a plane element being attached to the corrugated element.

These corrugated elements 5' may as an example be used in the embodiments illustrated in FIGS. 26 and 27. It should further be understood, that the coiled elements 5' in FIG. 29*a* may also be corrugated; i.e. that the embodiment illustrated in FIG. 29*a* is formed by one of the embodiments illustrated in FIG. 29*b*. By corrugation the coiled element 5', the electrically conductive material may form a larger crosssectional area.

Figure 30A:
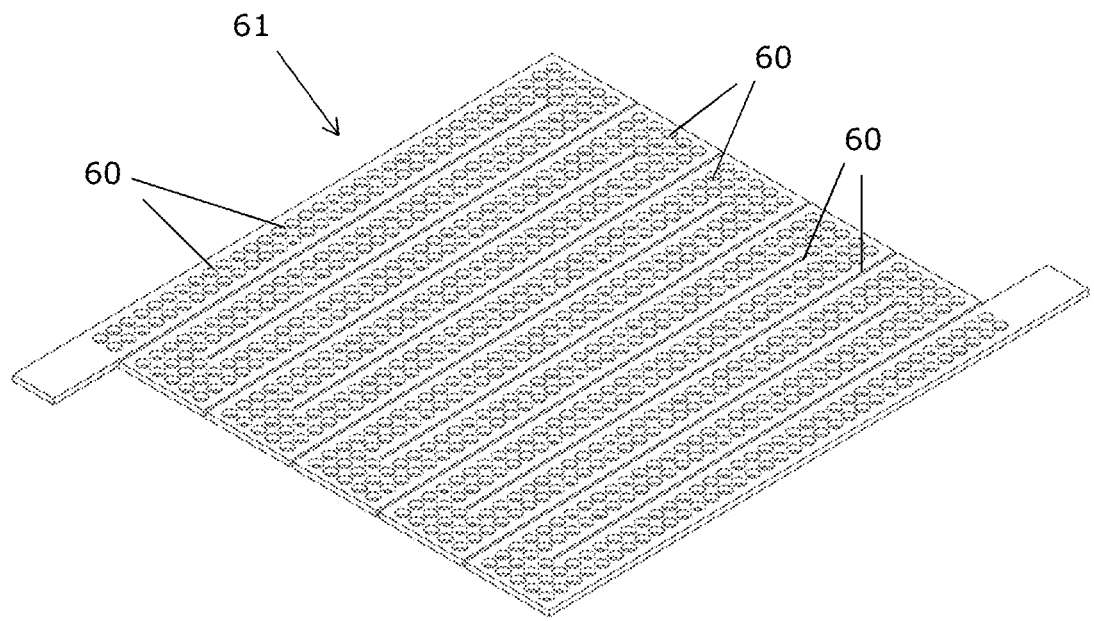
FIG. 30a illustrates a part for an embodiment of a macroscopic structure.

FIG. 30*a* illustrates an internal wall 61 for use as part of a macroscopic structure 5. The internal wall 61 comprises a plurality of cut-outs 60 in the form of slits extending from opposite edges and a plurality of circular through-holes, where the cut-outs 60 constitute 4-75% of the cross-sectional area of the internal wall.

Figure 30B:
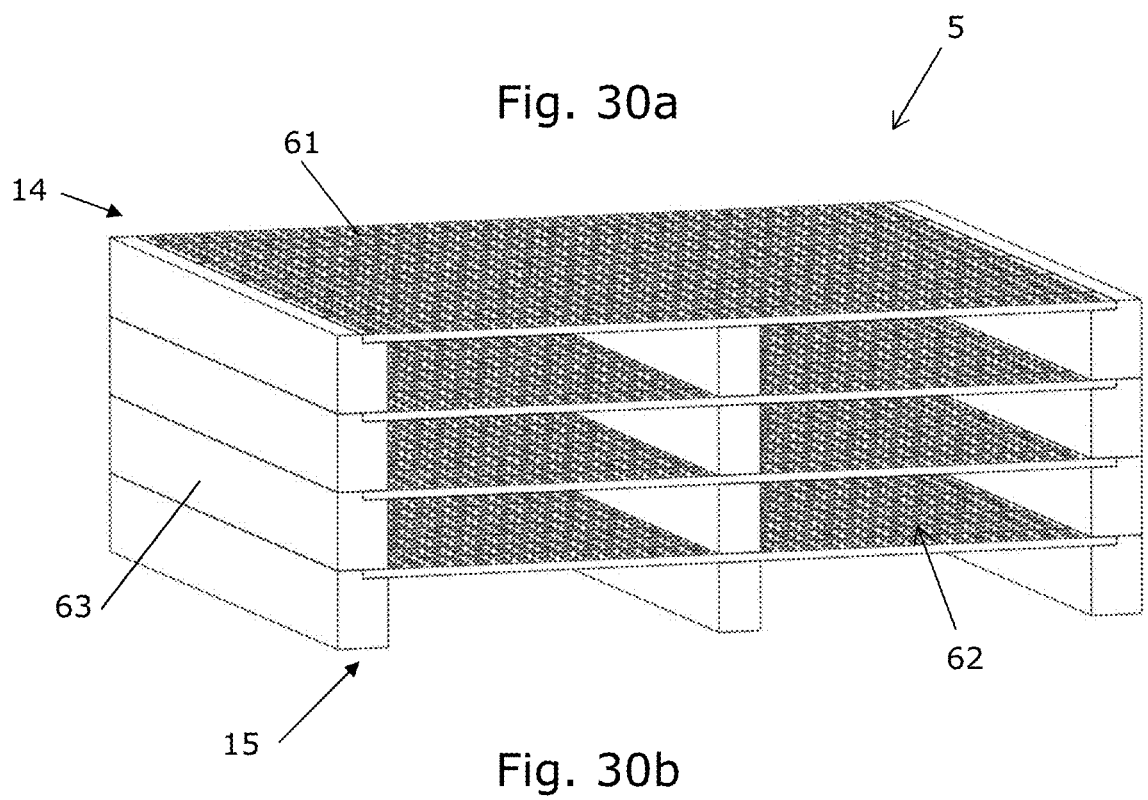
FIG. 30b illustrates the part illustrated in FIG. 30a in an assembled element.

FIG. 30*b* illustrates four internal walls 61 as illustrated in FIG. 30*a*, where the internal walls 61 are attached to the circumferential wall 63. The internal walls 61 form a plurality of substantially parallel flow channels 62 from the first end 14 to the second end 15. The flow channels 62 are arranged in the internal space formed by a circumferential wall 63. At least 3 of the internal walls 61 have different cross-sectional areas.

The following numbered items are provided:

Item 1. A structured catalyst for catalyzing an endothermic reaction of a feed gas to convert it to a product gas, said structured catalyst comprising at least one macroscopic structure extending in a longitudinal direction from a first end to a second end, where said first end forms an inlet to said macroscopic structure for said feed gas and said second end forms an outlet for said product gas, said macroscopic structure comprising a three-dimensional network structure, wherein the network structure forms flow paths allowing the feed gas to flow from said first end to said second end, wherein the network structure is formed by a metallic material being electrically conductive and at least partly support a ceramic coating, the ceramic coating supporting a catalytically active material, wherein the network structure in a cross-section transverse to the longitudinal direction constitutes a fraction of a cross section of the macroscopic structure, the fraction being in the range of 4-75%, and wherein the network structure in at least three different cross-sections in the longitudinal direction constitute different fractions.

Item 2. A structured catalyst according to item 1, wherein the macroscopic structure further comprises a circumferential wall forming an internal space, the circumferential wall being formed by a metallic material being electrically conductive, and wherein the network structure is arranged in the internal space.

Item 3. A structured catalyst according to item 1, wherein the macroscopic structure further comprises a circumferential wall forming an internal space, the circumferential wall being formed by a non-conductive material, and wherein the network structure is arranged in the internal space.

Item 4. A catalyst according to any of the preceding items, wherein the cross-section of the network structure constitutes at least 4, preferably 5, more preferably 6, more preferably 7, more preferably 8, more preferably 9, more preferably 10, more preferably 11, and most preferably 12 fractions in the longitudinal direction.

Item 5. A catalyst according to any of the preceding items, wherein the cross-section of the network structure is continuously non-constant over a combined distance of at least 10%, preferably 20%, more preferably 30%, more preferably 40%, more preferably 50%, more preferably 60%, more preferably 70%, more preferably 80%, and most preferably 90% of the length of the macroscopic structure in the longitudinal direction.

Item 6. A catalyst according to any of the preceding items, wherein a cross-section of the network structure is continuously non-constant over a combined distance of at least 10%, preferably 20%, more preferably 30%, more preferably 40%, more preferably 50%, more preferably 60%, more preferably 70%, more preferably 80%, and most preferably 90% of the length of the macroscopic structure in a direction transverse to the longitudinal direction.

Item 7. A catalyst according to any of the preceding items, wherein the network structure comprises a plurality of cut-outs.

Item 8. A catalyst according to item 7, wherein the cut-outs are filled with a cut-out material having a lower conductivity than that of the metallic material.

Item 9. A catalyst according to item 7 or 8, wherein the cut-out material is a solid material.

Item 10. The structured catalyst according to item 9, wherein the solid material has thermo-mechanical properties being substantially equivalent to thermo-mechanical properties of the metallic material forming the network structure.

Item 11. A catalyst according to item 7, wherein a first subgroup of cut-outs is filled with air, and wherein a second sub-group of cut-outs is filled with a solid material.

Item 12. Catalyst according to any of the preceding items, wherein at least a part of the network structure forms a plurality of parallel flow channels.

Item 13. The structured catalyst according to any of the preceding items, wherein a change of the fraction is less than 500% per mm in the longitudinal direction, preferably less than 100%/mm, and even more preferably less than 50%/mm.

Item 14. The structured catalyst according to any of the preceding items, wherein the macroscopic structure(s) are produced by 3D printing.

Item 15. The structured catalyst according to any of items 1-3, wherein the macroscopic structure(s) are produced by bending, cutting and/or welding sheet metal.

Item 16. The structured catalyst according to any of items 2-15, wherein the circumferential wall does not comprise openings transverse to the longitudinal direction.

Item 17. The structured catalyst according to any of the preceding items, comprising two or more macroscopic structures, wherein the at least two macroscopic structures are electrically connected.

Item 18. The structured catalyst according to any of the preceding items, wherein two neighbouring macroscopic structures are produced as a single piece by 3D printing to form an electrical connection between the two macroscopic structures closest to either the first or the second end of these.

Item 19. The structured catalyst according to any of item 17-18, wherein a second macroscopic structure is arranged at least partly circumferentially around a first macroscopic structure.

Item 20. The structured catalyst according to item 19, wherein the first and second macroscopic structures are electrically connected at the second end.

Item 21. The structured catalyst according to any items 19-20, wherein an outer surface of the first macroscopic structure has a shape matching an inner surface of the second macroscopic structure.

Item 22. The structured catalyst according to item 21, wherein the outer surface of the first macroscopic structure in a cross-section transverse to the longitudinal direction is substantially circular.

Item 23. The structured catalyst according to any of items 19-22, wherein the first and second macroscopic structures are arranged substantially co-axially.

Item 24. The structured catalyst according to any of the preceding items, wherein at least one macroscopic structure comprises flow guides to ensure flow distribution, wherein these flow guides are 3D printed as one piece with the macroscopic structure.

Item 25. The structured catalyst according to any of the preceding items, wherein at least one macroscopic structure comprises an attachment section to allow direct attachment of an electrical connection, wherein this attachment section is 3D printed in one piece with the macroscopic structure.

Item 26. The structured catalyst according to any of the preceding items comprising at least two macroscopic structures, wherein two macroscopic structures comprise concurrent outer sections to enable a geometric joint in the longitudinal direction or in a direction being transverse to the longitudinal direction.

Item 27. The structured catalyst according to item 26, wherein said two macroscopic structures are held together by welding, soldering, or mechanical pressing.

Item 28. The structured catalyst according to any of items 7-27, wherein at least one of the cut-outs has a shape selected from the group consisting of a sphere, a disc, an ellipsoid, a droplet, a spiral, and a polyhedron, such as a box, a pyramid, a diamond, and a rhombus.

Item 29. The structures catalyst according to any of items 7-28, wherein at least two of the cut-outs are of different form and/or shape.

Item 30. The structured catalyst according to any of item 2-29 comprising at least two macroscopic structures, wherein a thickness of the circumferential wall in a section providing electrical connection to a second macroscopic structure is 25%, preferably 50%, even more preferably 100%, and even more preferably 200% higher than the average thickness of the circumferential wall.

Item 31. The structured catalyst according to any of the preceding items, wherein the metallic material is an alloy comprising one or more substances selected from the group consisting of Fe, Cr, Al, Co, Ni, Zr, Cu, Ti, Mn, and Si.

Item 32. The structured catalyst according to any of the preceding items, wherein the catalyst comprises one or more arrays each comprising a first and a second macroscopic structure, wherein:
- a) the first and second macroscopic structure comprises a three-dimensional network structure;
- b) the array comprises at least a first and a second conductor electrically connected to said first and second macroscopic structure, respectively, and to an electrical power supply, wherein said electrical power supply is dimensioned to heat at least part of said first and second macroscopic structure to a temperature of at least 500° C. by passing an electrical current through said macroscopic structure, and wherein the conductors are connected at positions on the macroscopic structure closer to said first end than to said second end,
- c) said first and second macroscopic structures are electrically connected by a bridge of an electrically conductive material, and
- d) the array is configured to direct an electrical current to run from the first conductor through the first macroscopic structure to said second end, then through the bridge, and then through the second macroscopic structure to the second conductor.

Item 33. The structured catalyst according to item 32, wherein the second conductor is indirectly electrically connected to the second macroscopic structure.

Item 34. The structured catalyst according to item 33, wherein the array further comprises (i) one or more juxtaposed additional intermediate macroscopic structures and (ii) one end macroscopic structure, wherein each additional intermediate macroscopic structure is connected to at least two juxtaposed macroscopic structure by a bridge of an electrically conductive material, and wherein the end macroscopic structure is connected to at least one juxtaposed macroscopic structure, and wherein the second conductor is connected to the end macroscopic structure at a position on the end macroscopic structure closer to said first end than to said second end.

Item 35. The structured catalyst according to any of items 32-34, wherein at least two juxtaposed macroscopic structures have different progress of the fraction along the longitudinal direction of them.

Item 36. A reactor system for carrying out an endothermic reaction of a feed gas, said reactor system comprising:
- a) a structured catalyst of any of items 1-35;
- b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
- c) a heat insulation layer between said structured catalyst and said pressure shell.

Item 37. Use of the structured catalyst according to any of items 1-35 or the reactor according to item 36, wherein the endothermic reaction is selected from the group consisting of steam methane reforming, hydrogen cyanide formation, methanol cracking, ammonia cracking, reverse water gas shift and dehydrogenation.

The invention claimed is:

1. A structured catalyst for catalyzing an endothermic reaction of a feed gas to convert it to a product gas, said structured catalyst comprising at least one macroscopic structure extending in a longitudinal direction from a first end to a second end, where said first end forms an inlet to said macroscopic structure for said feed gas and said second end forms an outlet for said product gas, said macroscopic structure comprising a three-dimensional network structure, wherein the network structure forms flow paths allowing the feed gas to flow from said first end to said second end, wherein the network structure is formed by a metallic material being electrically conductive and at least partly support a ceramic coating, the ceramic coating supporting a catalytically active material, wherein the network structure in a cross-section transverse to the longitudinal direction constitutes a fraction of a cross section of the macroscopic structure, the fraction being in the range of 4-75%, and wherein the network structure in at least three different cross-sections in the longitudinal direction constitute different fractions.

2. A structured catalyst according to claim 1, wherein the macroscopic structure further comprises a circumferential wall forming an internal space, the circumferential wall being formed by a metallic material being electrically conductive, and wherein the network structure is arranged in the internal space.

3. A catalyst according to claim 1, wherein the cross-section of the network structure constitutes at least 4.

4. A catalyst according to claim 1, wherein the cross-section of the network structure is continuously non-constant over a combined distance of at least 10% of the length of the macroscopic structure in the longitudinal direction.

5. A catalyst according to claim 1, wherein the network structure comprises a plurality of cut-outs.

6. A catalyst according to claim 5, wherein the cut-outs are filled with a cut-out material having a lower conductivity than that of the metallic material.

7. A catalyst according to claim 5, wherein the cut-out material is a solid material.

8. Catalyst according to claim 1, wherein at least a part of the network structure forms a plurality of parallel flow channels.

9. The structured catalyst according to claim 1, wherein a change of the fraction is less than 500% per mm in the longitudinal direction.

10. The structured catalyst according to claim 1, wherein the macroscopic structure(s) are produced by 3D printing.

11. The structured catalyst according to claim 1, wherein the macroscopic structure(s) are produced by bending, cutting and/or welding sheet metal.

12. The structured catalyst according to claim 2, wherein the circumferential wall does not comprise openings transverse to the longitudinal direction.

13. The structured catalyst according to claim 1, comprising two or more macroscopic structures, wherein the at least two macroscopic structures are electrically connected.

14. The structured catalyst according to claim 13, wherein a second macroscopic structure is arranged at least partly circumferentially around a first macroscopic structure.

15. The structured catalyst according to claim 14, wherein the first and second macroscopic structures are electrically connected at the second end.

16. The structured catalyst according to claim 14, wherein the first and second macroscopic structures are arranged substantially co-axially.

17. The structured catalyst according to claim 5, wherein at least two of the cut-outs are of different form and/or shape.

18. The structured catalyst according to claim 1, wherein the catalyst comprises one or more arrays each comprising a first and a second macroscopic structure, wherein:
- a) the first and second macroscopic structure comprises a three-dimensional network structure;
- b) the array comprises at least a first and a second conductor electrically connected to said first and second macroscopic structure, respectively, and to an electrical power supply, wherein said electrical power supply is dimensioned to heat at least part of said first and second macroscopic structure to a temperature of at least 500° C. by passing an electrical current through said macroscopic structure, and wherein the conductors are connected at positions on the macroscopic structure closer to said first end than to said second end,
- c) said first and second macroscopic structures are electrically connected by a bridge of an electrically conductive material, and
- d) the array is configured to direct an electrical current to run from the first conductor through the first macroscopic structure to said second end, then through the bridge, and then through the second macroscopic structure to the second conductor.

19. A reactor system for carrying out an endothermic reaction of a feed gas, said reactor system comprising:
- a) a structured catalyst of claim 1;
- b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
- c) a heat insulation layer between said structured catalyst and said pressure shell.

20. A method comprising using the structured catalyst according to claim 1 in a reactor system for carrying out an endothermic reaction of a feed gas, said reactor system comprising:
- a) the structured catalyst;
- b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
- c) a heat insulation layer between said structured catalyst and said pressure shell wherein the endothermic reaction is selected from the group consisting of steam methane reforming, hydrogen cyanide formation, methanol cracking, ammonia cracking, reverse water gas shift and dehydrogenation.

\* \* \* \* \*